(12) United States Patent
Sudhindra et al.

(10) Patent No.: US 7,680,753 B2
(45) Date of Patent: Mar. 16, 2010

(54) SYSTEM AND METHOD FOR FAULT IDENTIFICATION IN AN ELECTRONIC SYSTEM BASED ON CONTEXT-BASED ALARM ANALYSIS

(75) Inventors: Veena Sudhindra, Bangalore (IN); Gangadharapali Sridhar, Bangalore (IN); Varadarajan Sridhar, Bangalore (IN); K. Kalyana Rao, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 0 days.

(21) Appl. No.: 11/365,927

(22) Filed: Mar. 2, 2006

(65) Prior Publication Data

US 2006/0149990 A1 Jul. 6, 2006

Related U.S. Application Data

(63) Continuation-in-part of application No. 10/191,077, filed on Jul. 10, 2002, now abandoned.

(51) Int. Cl.
*G06N 5/00* (2006.01)
(52) U.S. Cl. .............................. 706/45; 706/14; 706/46; 706/47; 714/2; 714/4; 714/25; 714/26
(58) Field of Classification Search .............. 706/45–50, 706/61, 14, 15, 911; 714/2, 4, 5, 25, 26, 714/30–31, 37–39, 48–49
See application file for complete search history.

(56) References Cited

U.S. PATENT DOCUMENTS

| 4,812,819 | A | | 3/1989 | Corsberg |
| 4,866,635 | A | * | 9/1989 | Kahn et al. .................... 706/46 |
| 5,107,500 | A | | 4/1992 | Wakamoto et al. |
| 5,388,189 | A | * | 2/1995 | Kung ........................... 706/45 |
| 5,664,093 | A | | 9/1997 | Barnett et al. |
| 5,751,933 | A | | 5/1998 | Dev et al. |
| 6,012,152 | A | * | 1/2000 | Douik et al. ................... 714/26 |
| 6,076,083 | A | | 6/2000 | Baker |
| 6,249,755 | B1 | | 6/2001 | Yemini |
| 6,356,885 | B2 | | 3/2002 | Ross |
| 7,043,661 | B2 | * | 5/2006 | Valadarsky et al. ............. 714/4 |
| 2001/0014886 | A1 | * | 8/2001 | Ross et al. ..................... 706/45 |
| 2004/0168100 | A1 | * | 8/2004 | Thottan et al. .................. 714/4 |

OTHER PUBLICATIONS

U.S. Appl. No. 10/433,459, filed Aug. 2004, Thottan, et al.

(Continued)

*Primary Examiner*—David R Vincent
*Assistant Examiner*—Omar F Fernandez Rivas
(74) *Attorney, Agent, or Firm*—Merek, Blackmon & Voorhees LLC; Catherine M. Voorhees

(57) ABSTRACT

A fault identification system analyzes alarm information and the associated contextual information to identify the occurred faults. The contextual information is based on usecases, transactions, and functions associated with the electronic system under consideration. Multiple detectors that form part of knowledge repositories are used in the process of fault identification.

17 Claims, 48 Drawing Sheets

OTHER PUBLICATIONS

Rissland, E., Daniels, J., Rubinstein, B., and Skalak, D., "Case-Based Diagnostic Analysis in a Blackboard Architecture", in the Proceedings of the Eleventh National Conference on Artificial Intelligence, pp. 66-72, Washington, 1993).

Marina Thottan and Chuanyi Ji, "Adaptive Thresholding for Proactive Network Problem Detection" Proceedings IEEE Internation Workshop on Systems Management, pp. 108-116, Newport, Rhode Island, Apr. 1998).

Franz Lackinger and Wolfgang Nejdl, Diamon: a model-based troubleshooter based on qualitative reasoning: in IEEE Expert 8(1): 33-40, Feb. 1993).

* cited by examiner

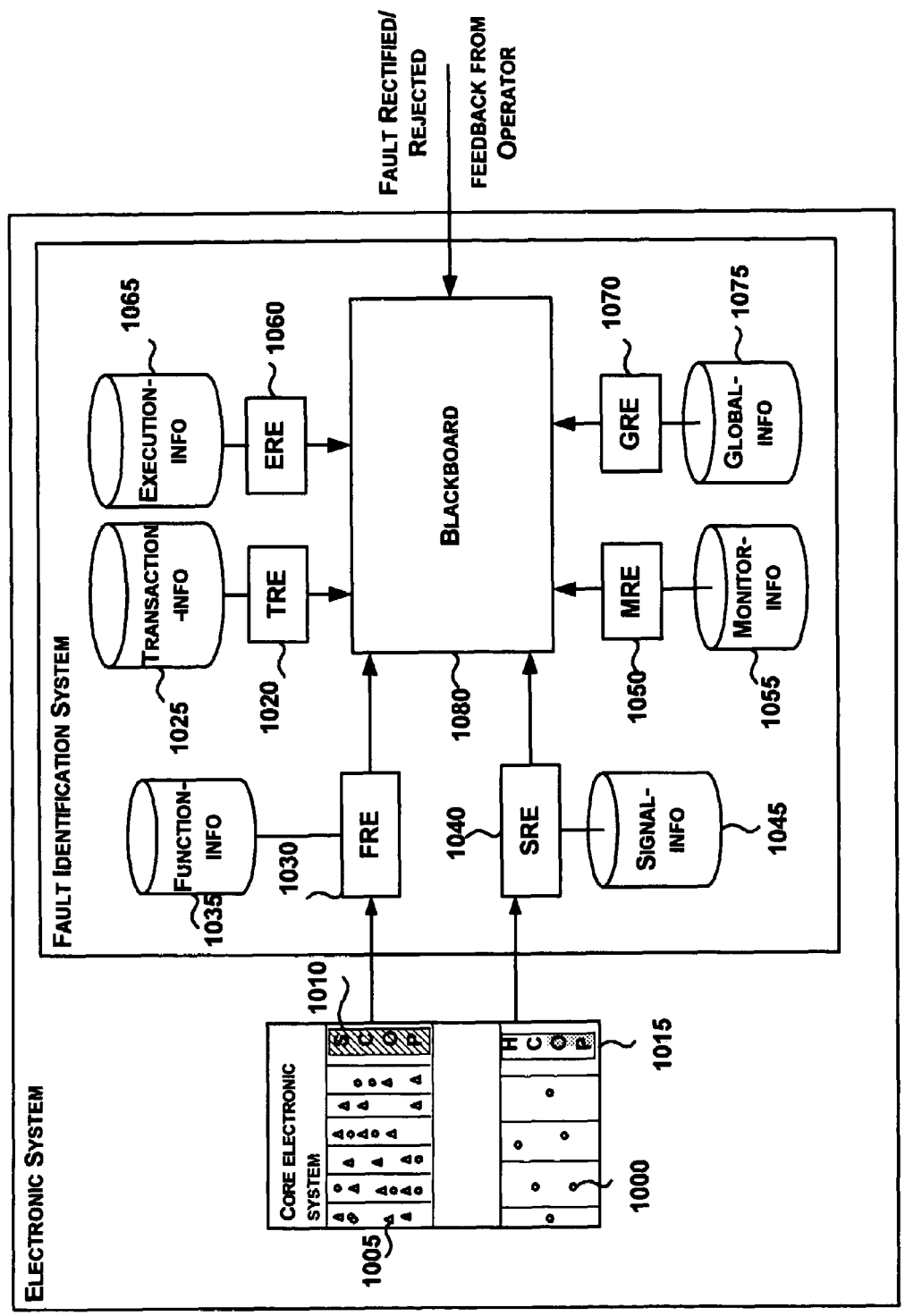
Fig. 1A: Blackboard Architecture of FIS

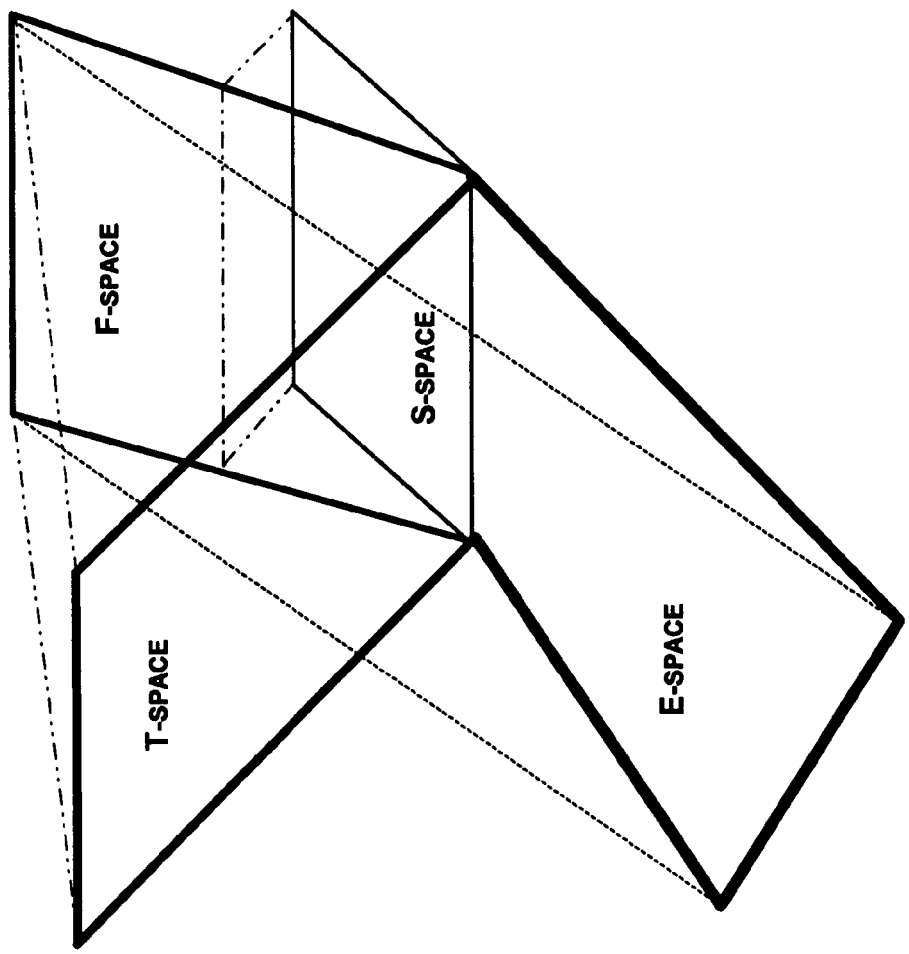
FIG. 1B: SPACE MAPPINGS

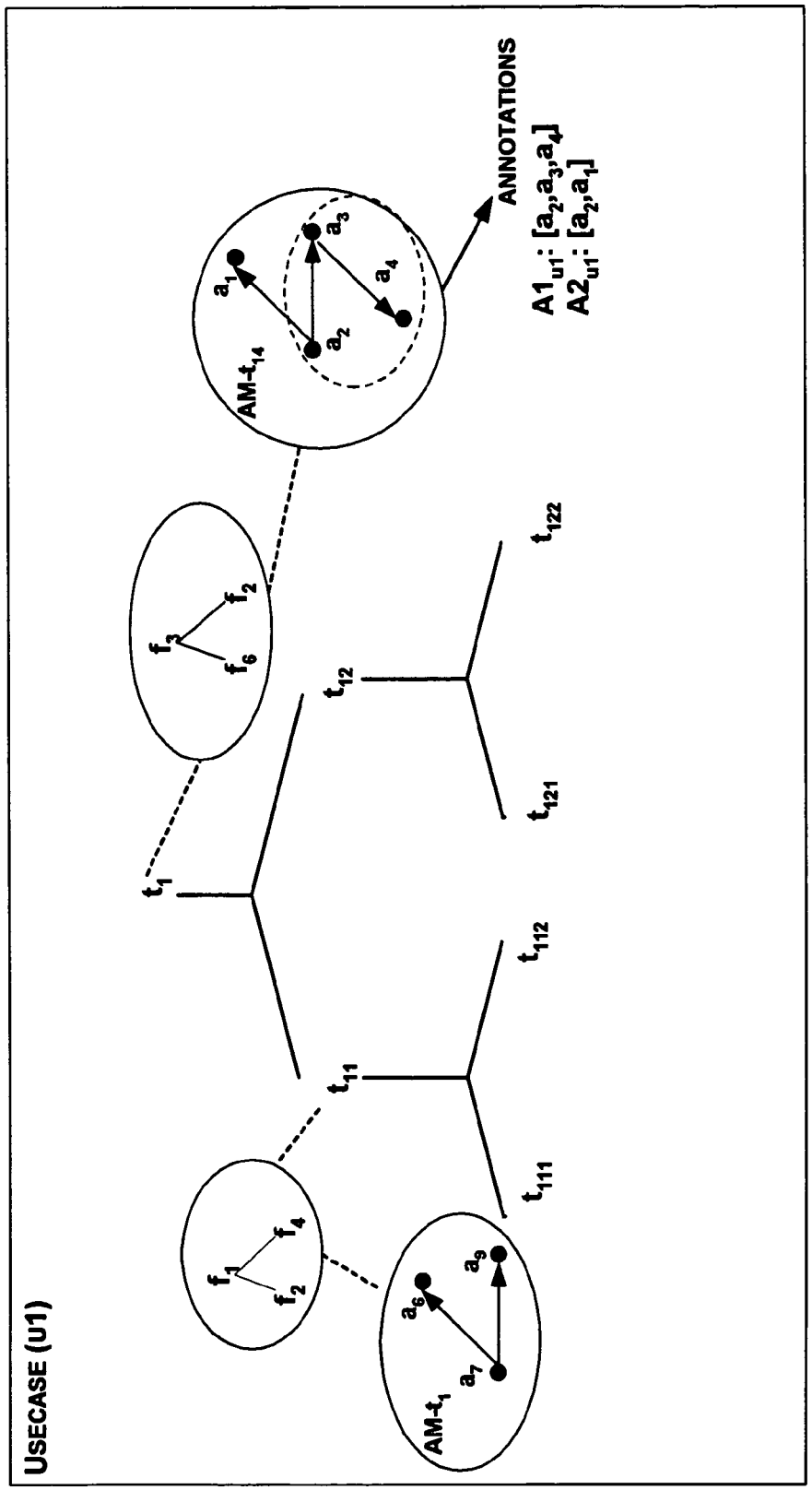
FIG. 1C: INTER-RELATION BETWEEN USECASE, TRANSACTION, ALARM MAP AND ANNOTATION

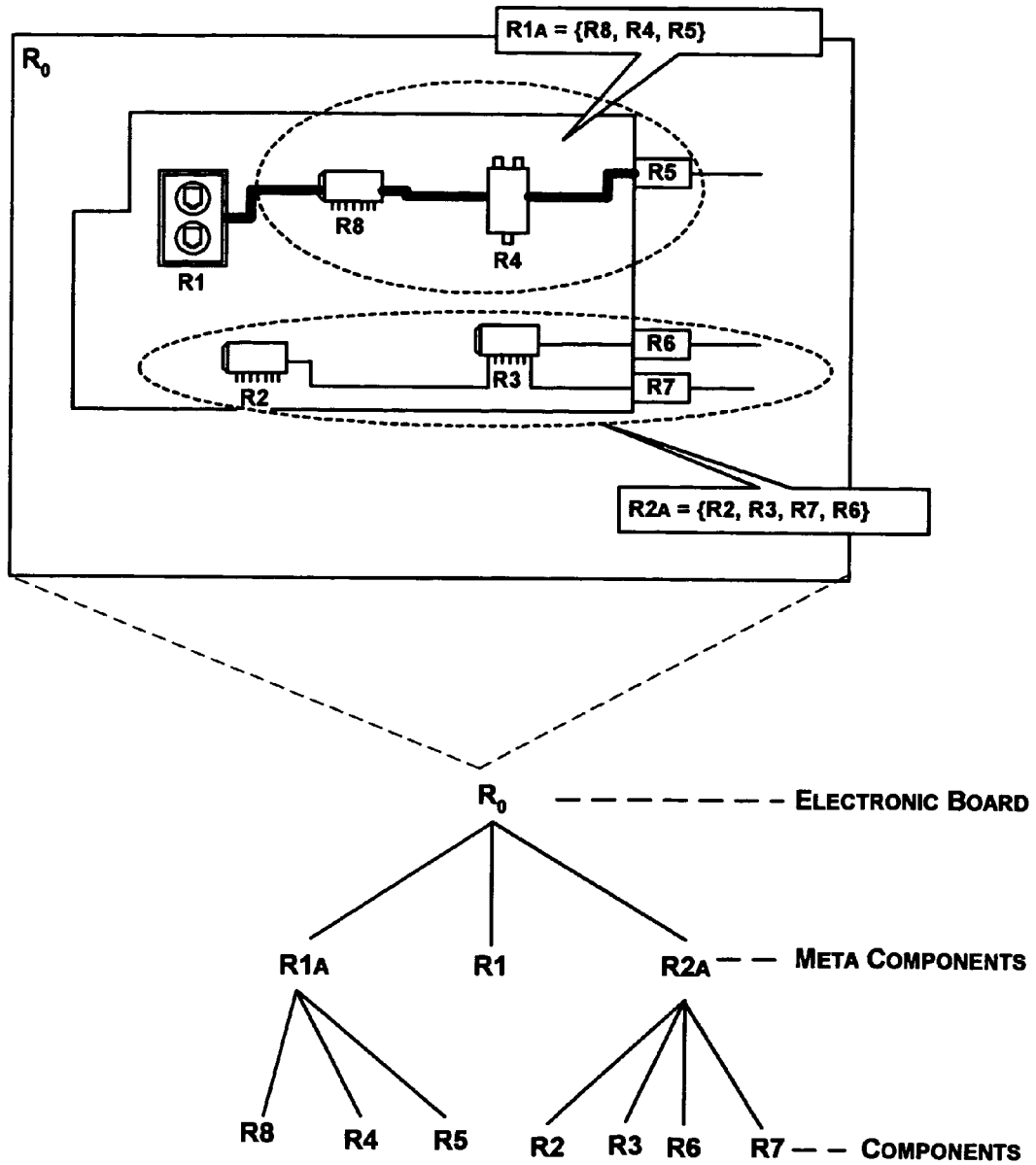
FIG. 1D: RESOURCE HIERARCHY

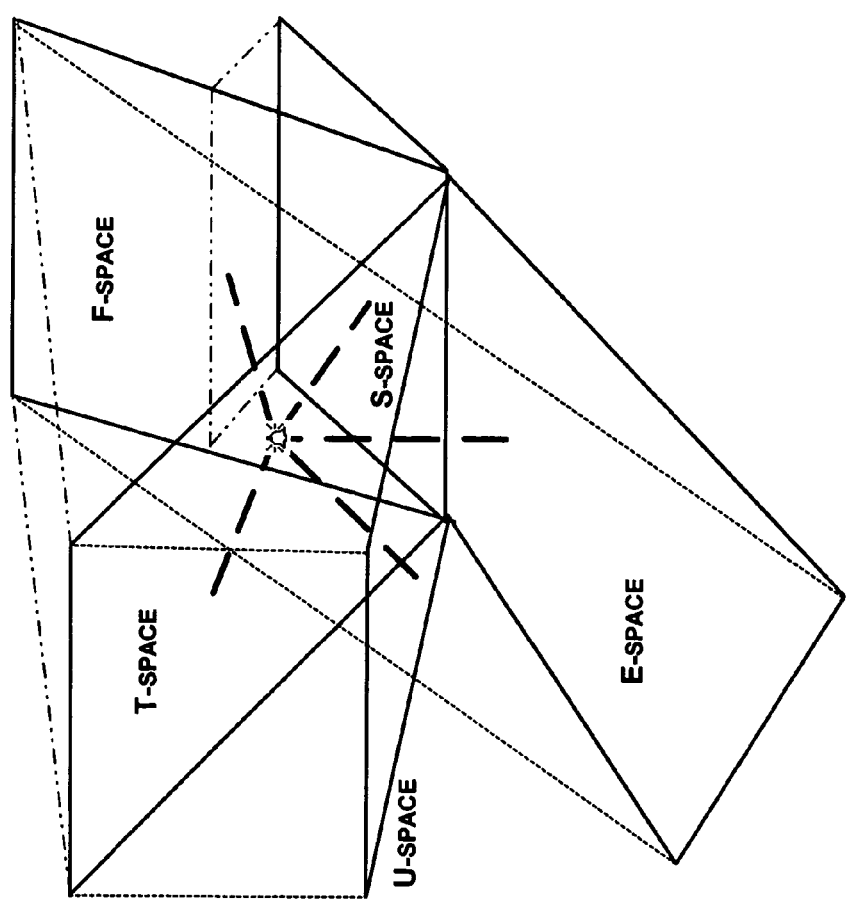
FIG. 1E: CONTEXT ASSOCIATION WITH ALARM

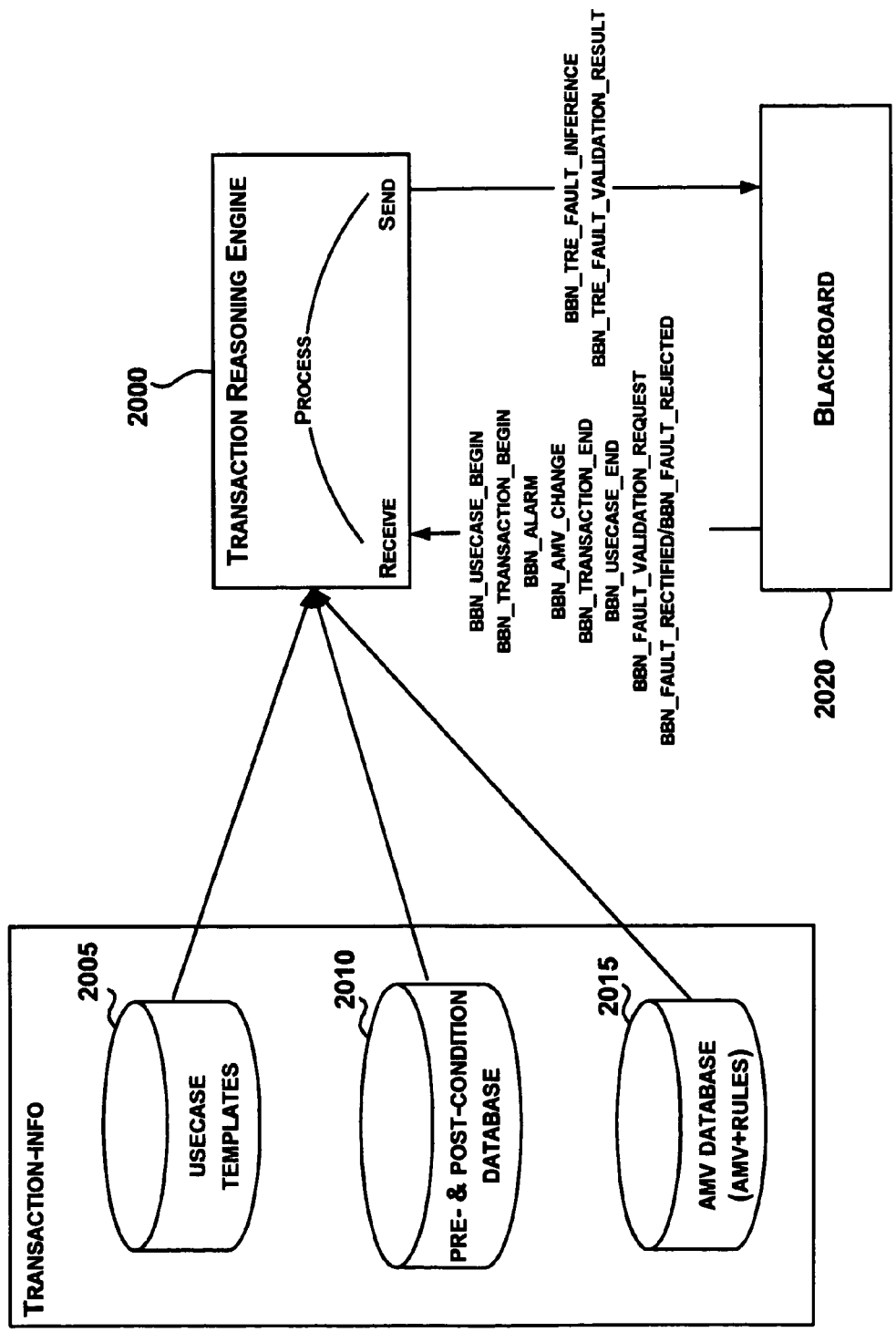
FIG. 2A: TRE ARCHITECTURE

Usecase Templates

| Usecase ID | Transaction Hierarchy | List of Resources |
|---|---|---|
| | | |

Pre-condition and Post-condition Database

| Rule_ID | Pre-condition | Annotation_ID | Post-condition | Post-Action (Annotation / Fault) |
|---|---|---|---|---|
| | | | | |

AMV Database

| AMV_ID | Signature Trend | List of Alarms | Historical Data |
|---|---|---|---|
| | | | |

| Transaction ID | List of Annotations | List of Resources |
|---|---|---|
| | | |

FIG. 2A-1: TRANSACTION-INFO (KR)

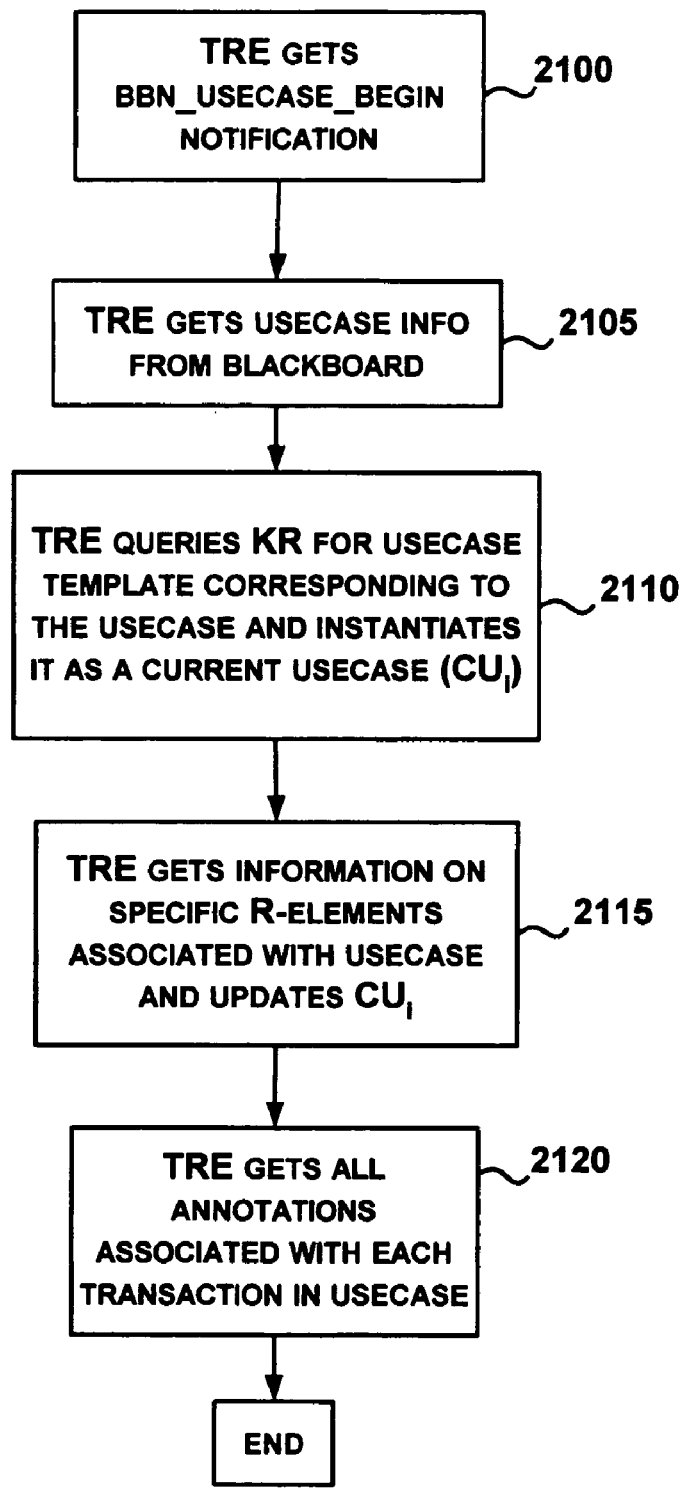
FIG. 2B: PROCESSING OF BBN_USECASE_BEGIN NOTIFICATION BY TRE

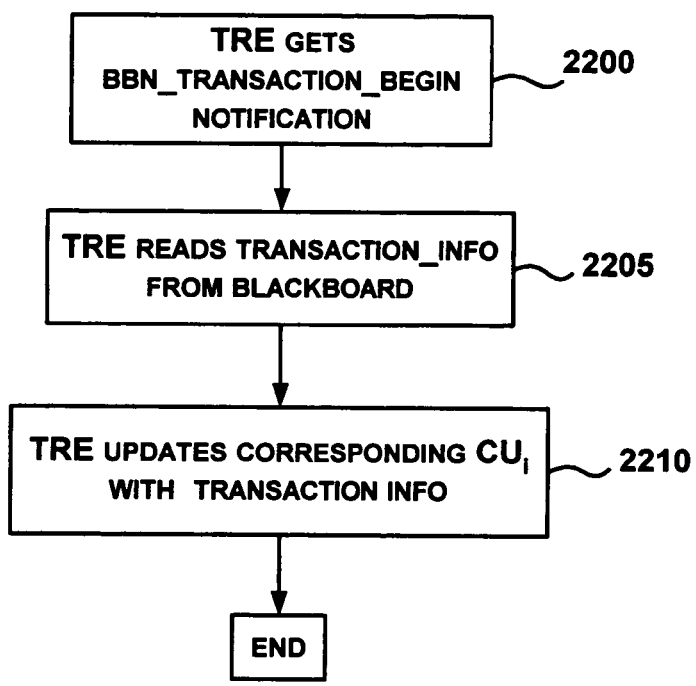
FIG. 2C: PROCESSING OF BBN_TRANSACTION_BEGIN NOTIFICATION BY TRE

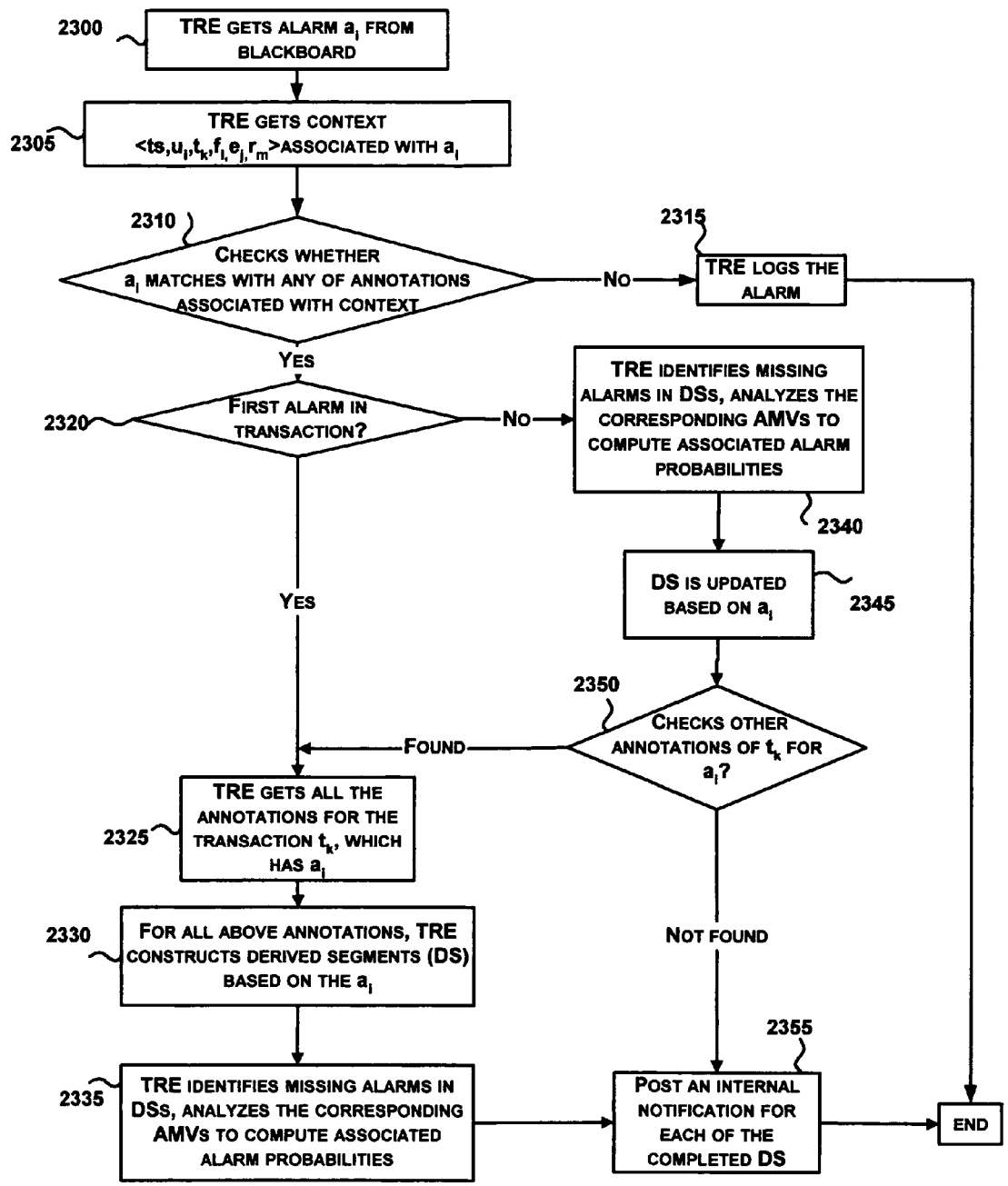
FIG. 2D: PROCESSING OF BBN_ALARM BY TRE

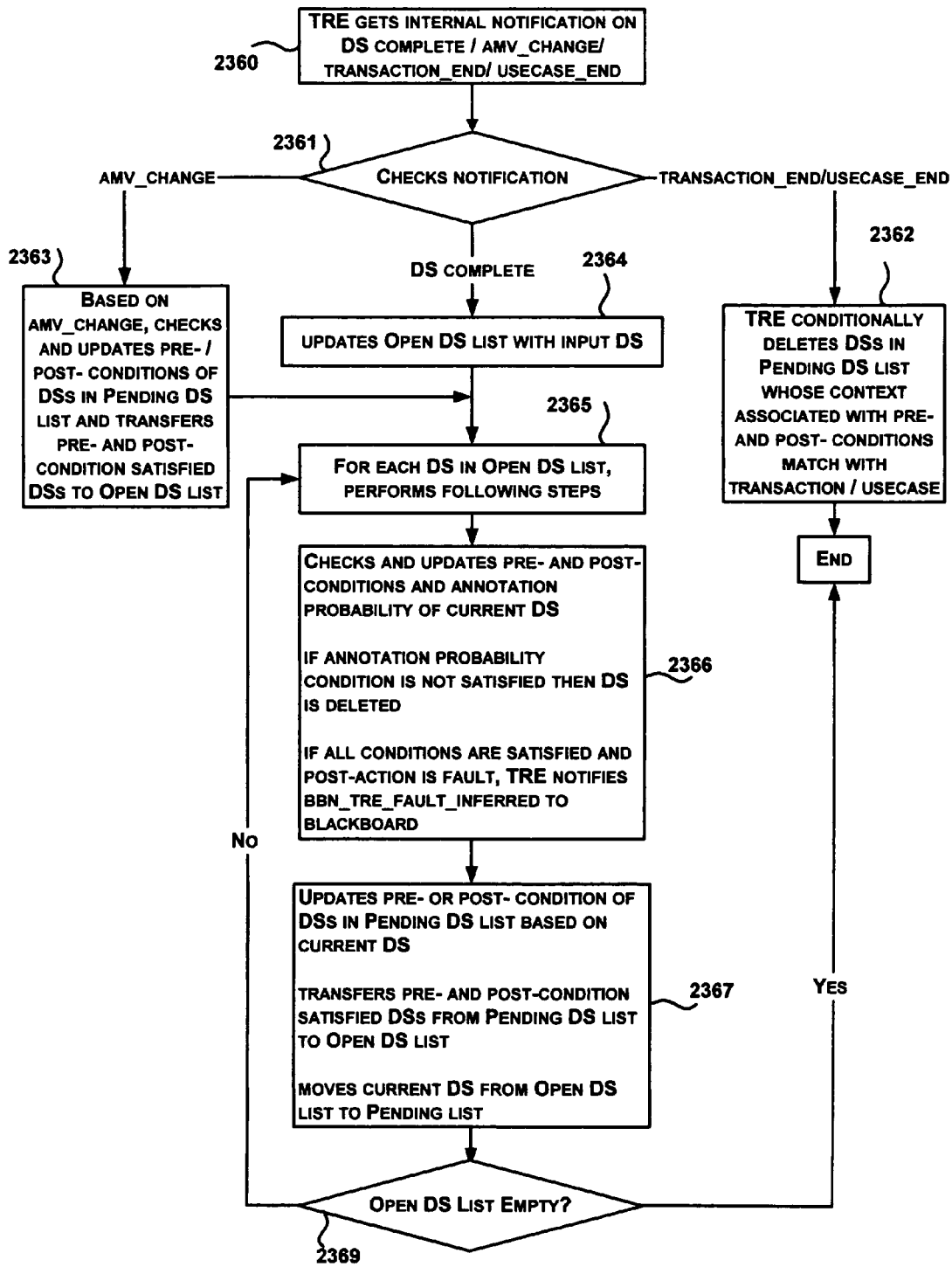
FIG. 2D-1: PROCESSING OF DSs BY TRE

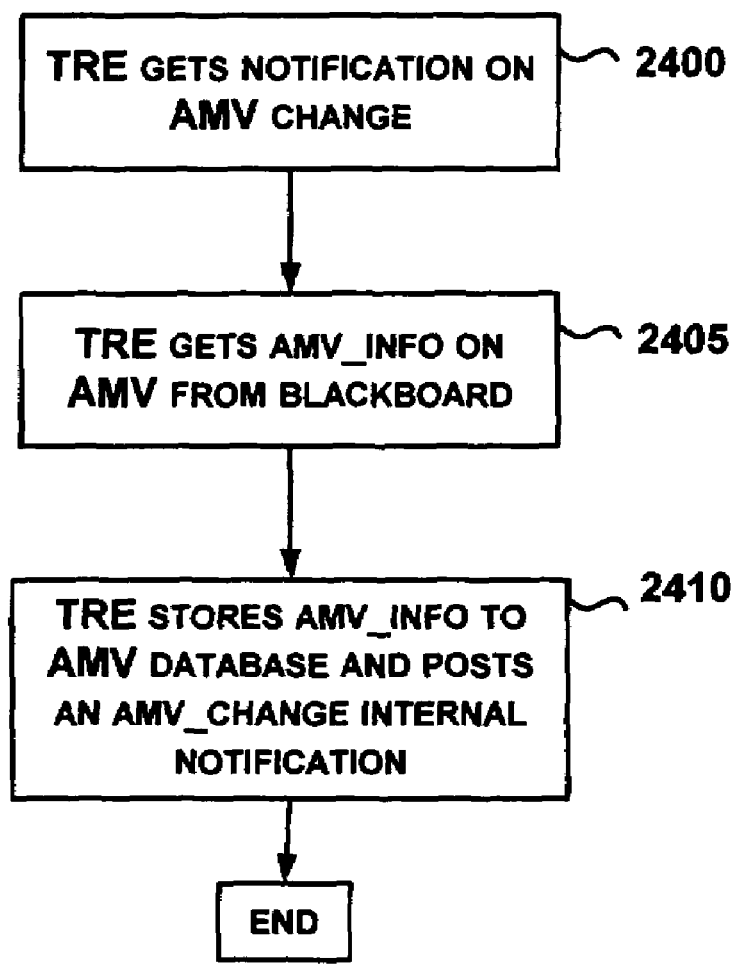
FIG. 2E: PROCESSING OF BBN_AMV_CHANGE BY TRE

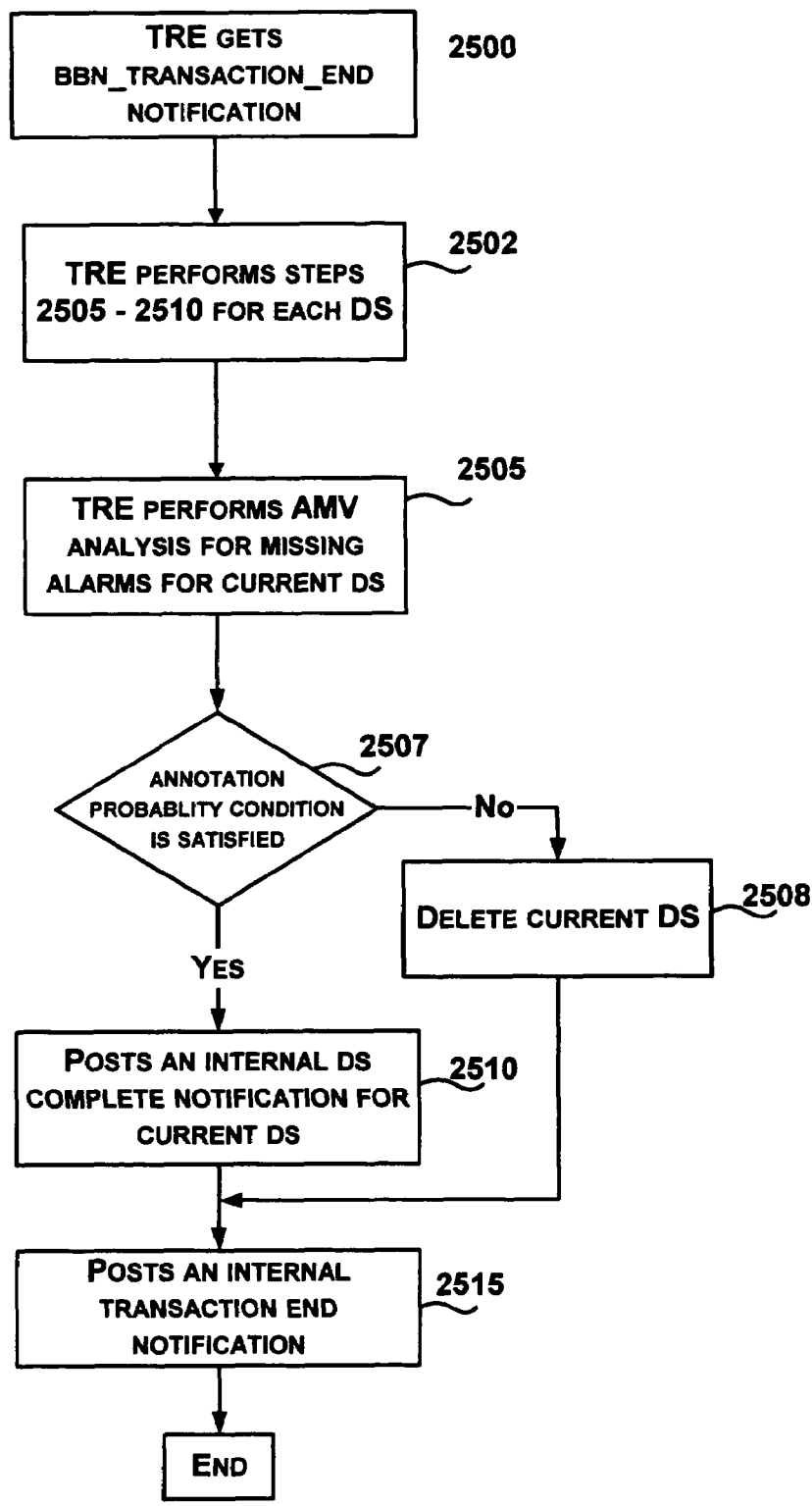
FIG. 2F: PROCESSING OF BBN_TRANSACTION_END BY TRE

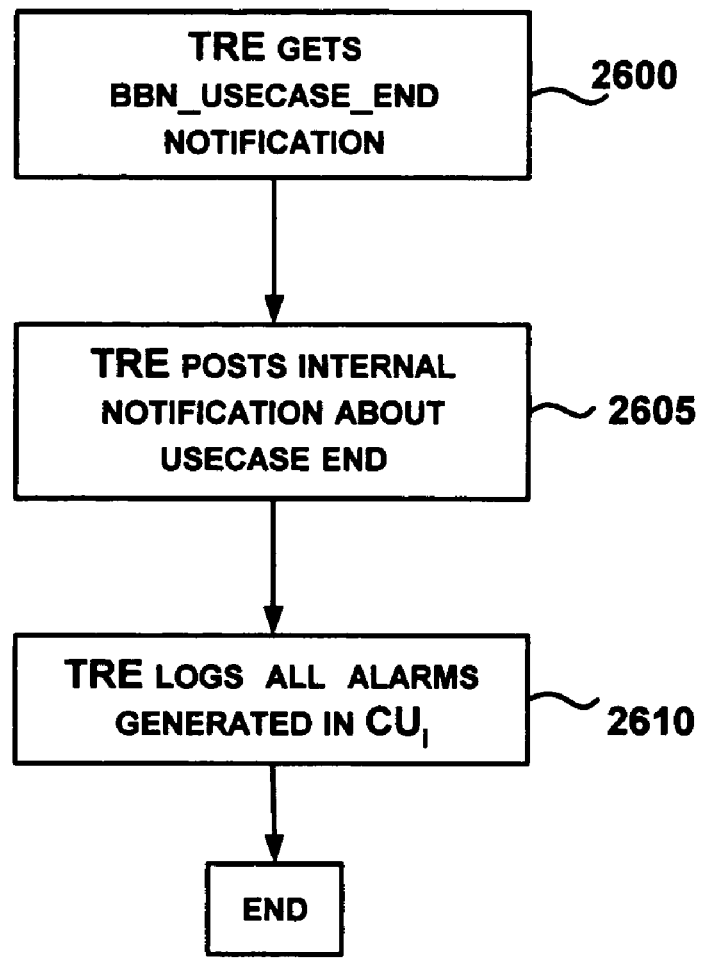
FIG. 2G: PROCESSING OF BBN_USECASE_END BY TRE

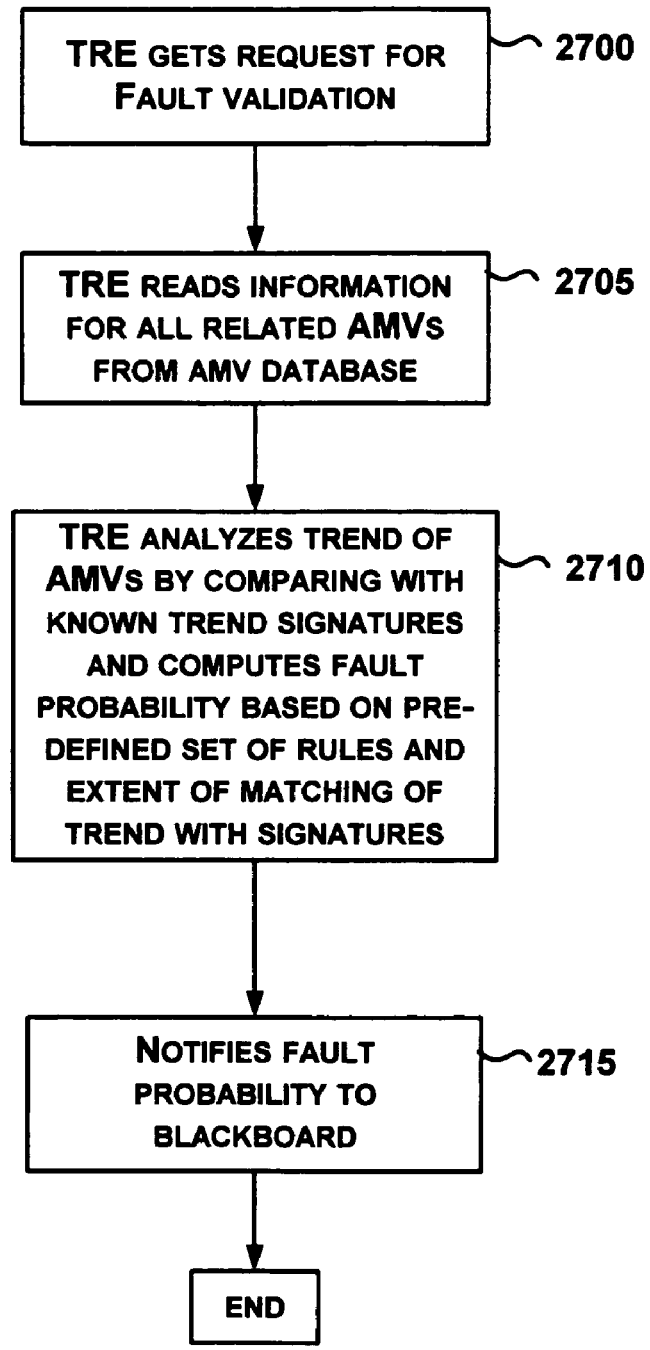
FIG. 2H: PROCESSING OF BBN_FAULT_VALIDATION_REQUEST BY TRE

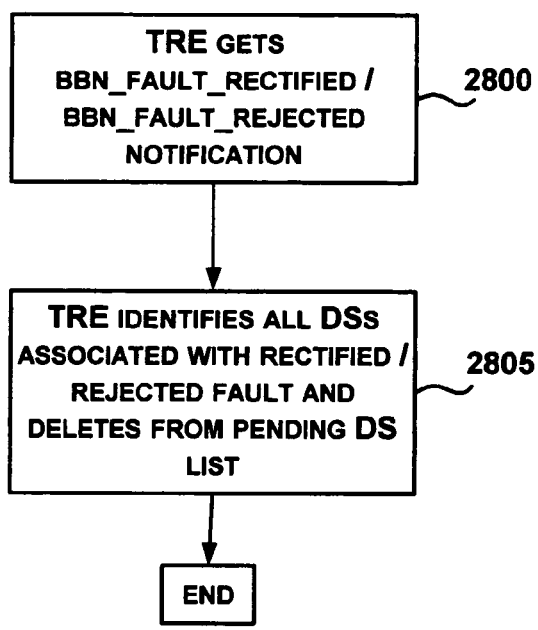
FIG. 2I: PROCESSING OF BBN_FAULT_RECTIFIED / BBN_FAULT_REJECTED BY TRE

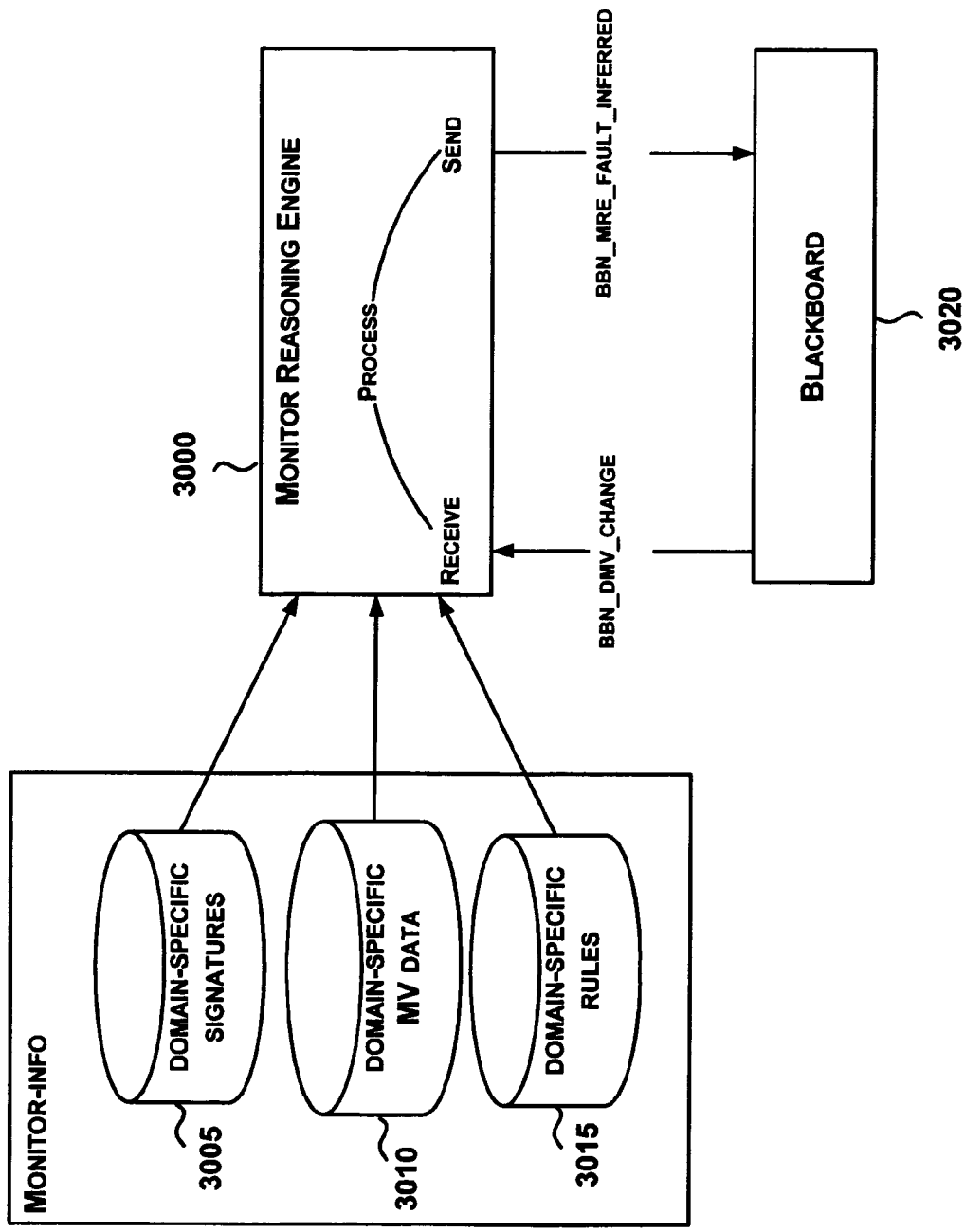
FIG. 3A: MRE ARCHITECTURE

Domain-specific Signatures

| DMV_ID | Signature |
|--------|-----------|
|        |           |

Domain-specific MV Data

| DMV_ID | DMV_Value | Timestamp |
|--------|-----------|-----------|
|        |           |           |

Domain-specific Rules

| Rule_ID | Condition | Inference |
|---------|-----------|-----------|
|         |           |           |

FIG. 3A-1: MONITOR-INFO (KR)

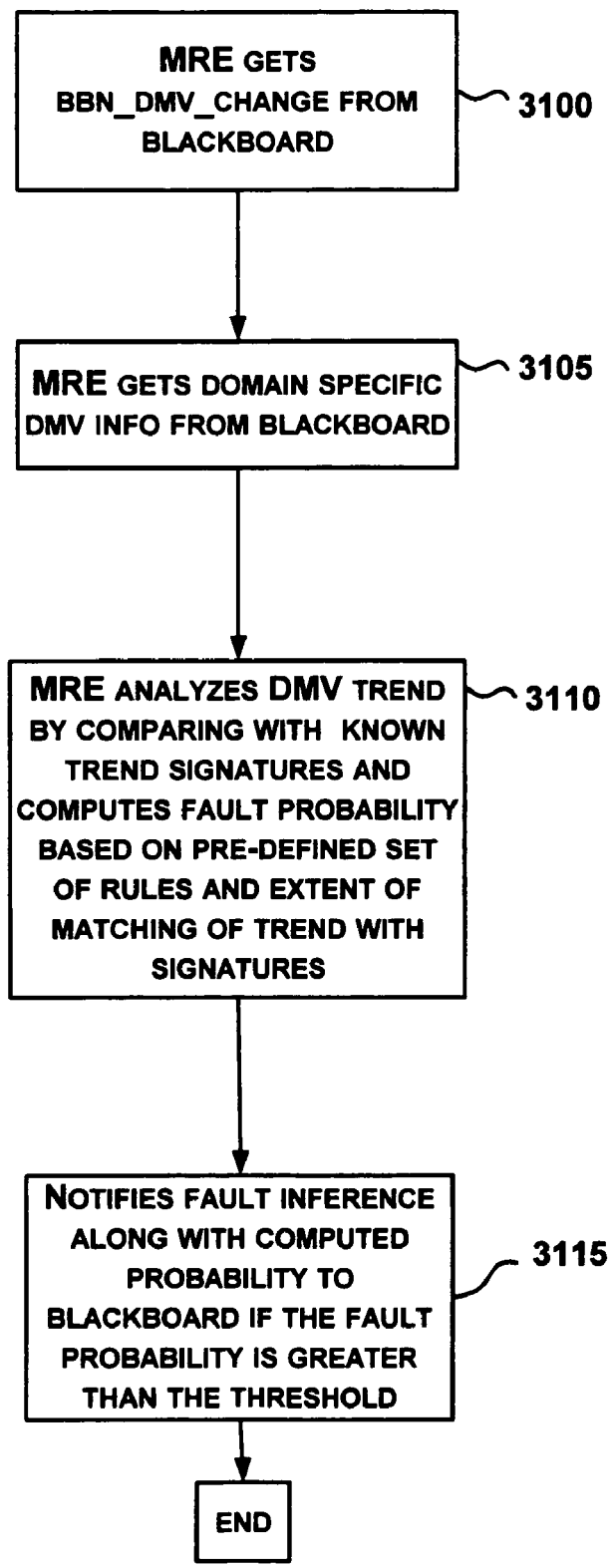
FIG. 3B: PROCESSING OF BBN_DMV_CHANGE BY MRE

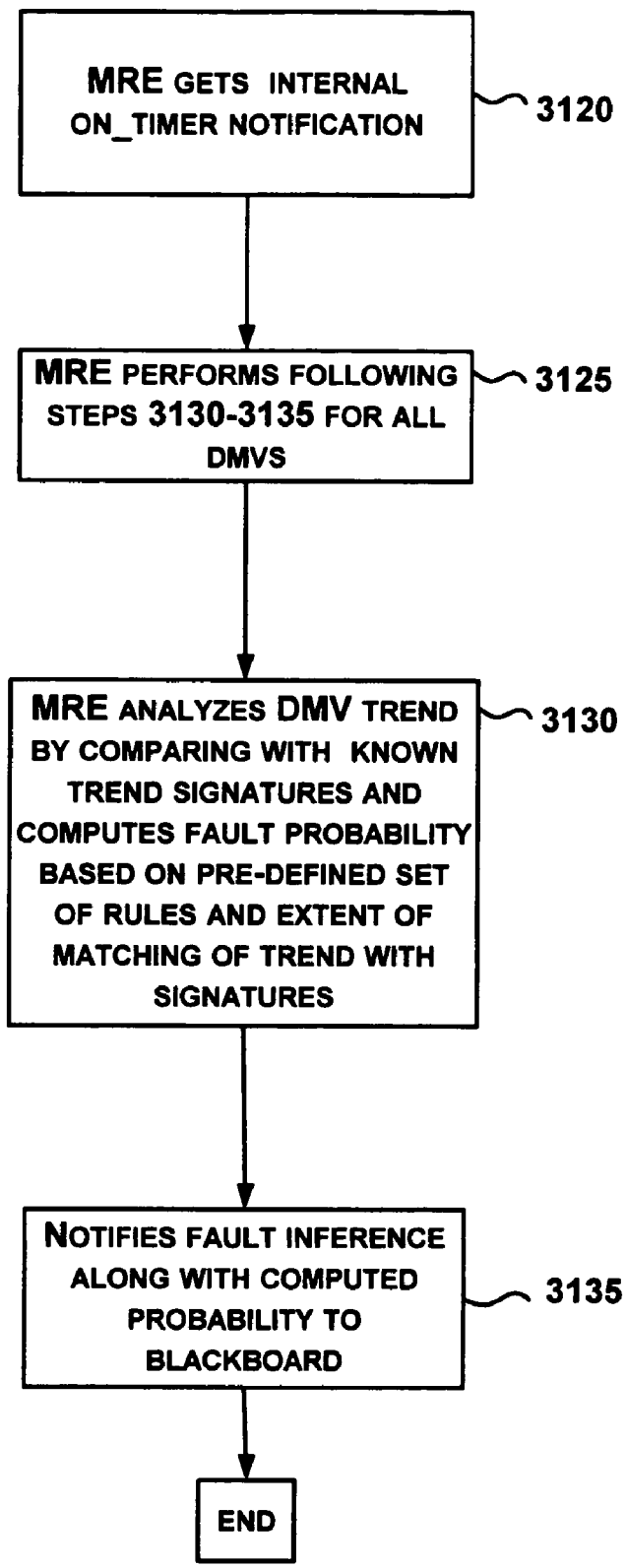
FIG. 3B - 1: PROCESSING OF ON_TIMER BY MRE

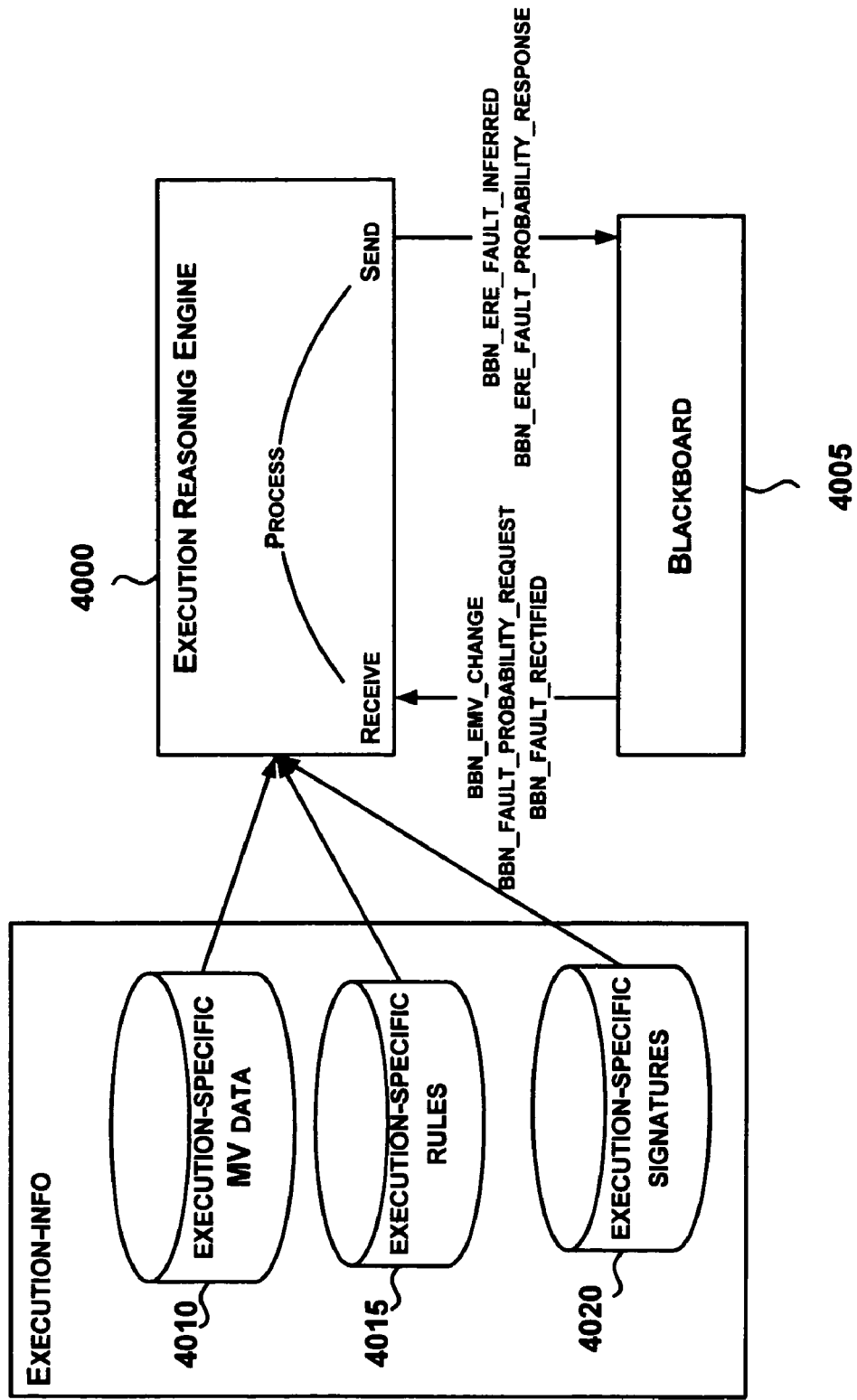
FIG. 4A: ERE ARCHITECTURE

EXECUTION-SPECIFIC SIGNATURES

| EMV_ID | LIST OF RULE-IDS | LEARNED SIGNATURE |
|--------|------------------|-------------------|
|        |                  |                   |

EXECUTION-SPECIFIC MV DATA

| EMV_ID | EMV_VALUE | TIMESTAMP |
|--------|-----------|-----------|
|        |           |           |

EXECUTION-SPECIFIC RULES

| RULE_ID | CONDITION | INFERENCE |
|---------|-----------|-----------|
|         |           |           |

FIG. 4A-1: EXECUTION-INFO (KR)

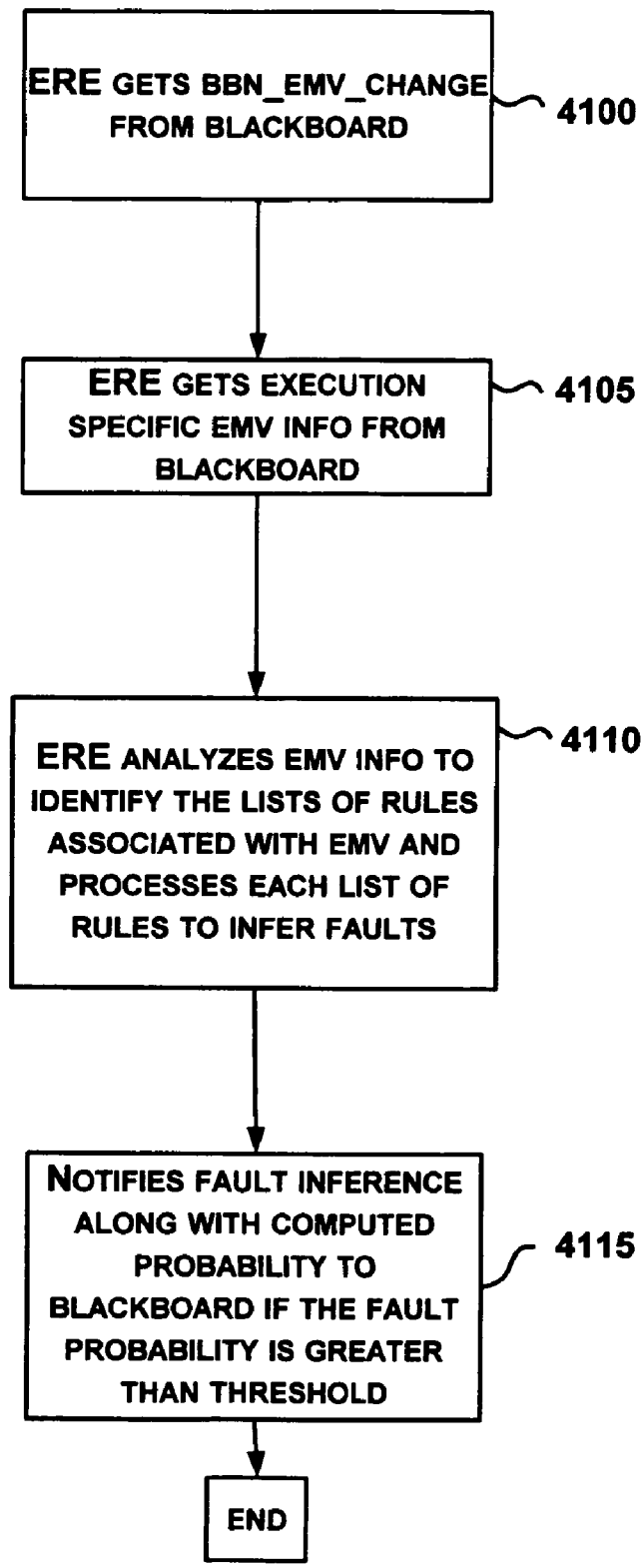
FIG. 4B: PROCESSING OF BBN_EMV_CHANGE BY ERE

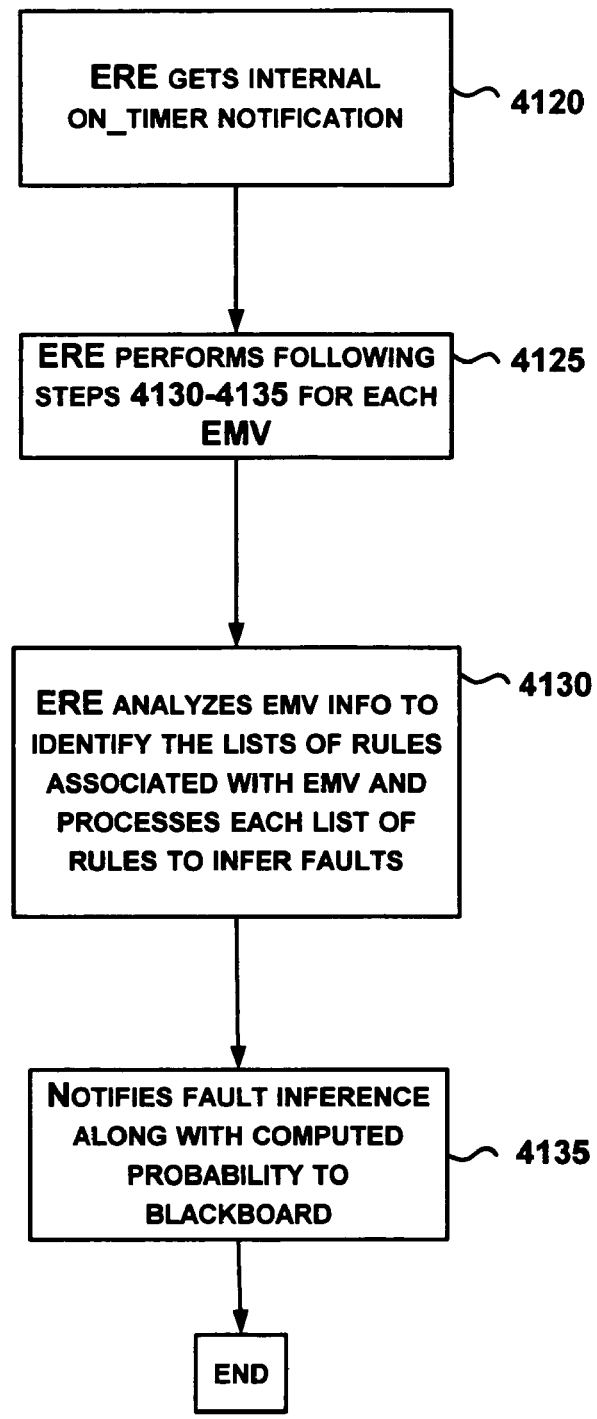
FIG. 4B-1: PROCESSING OF ON_TIMER BY ERE

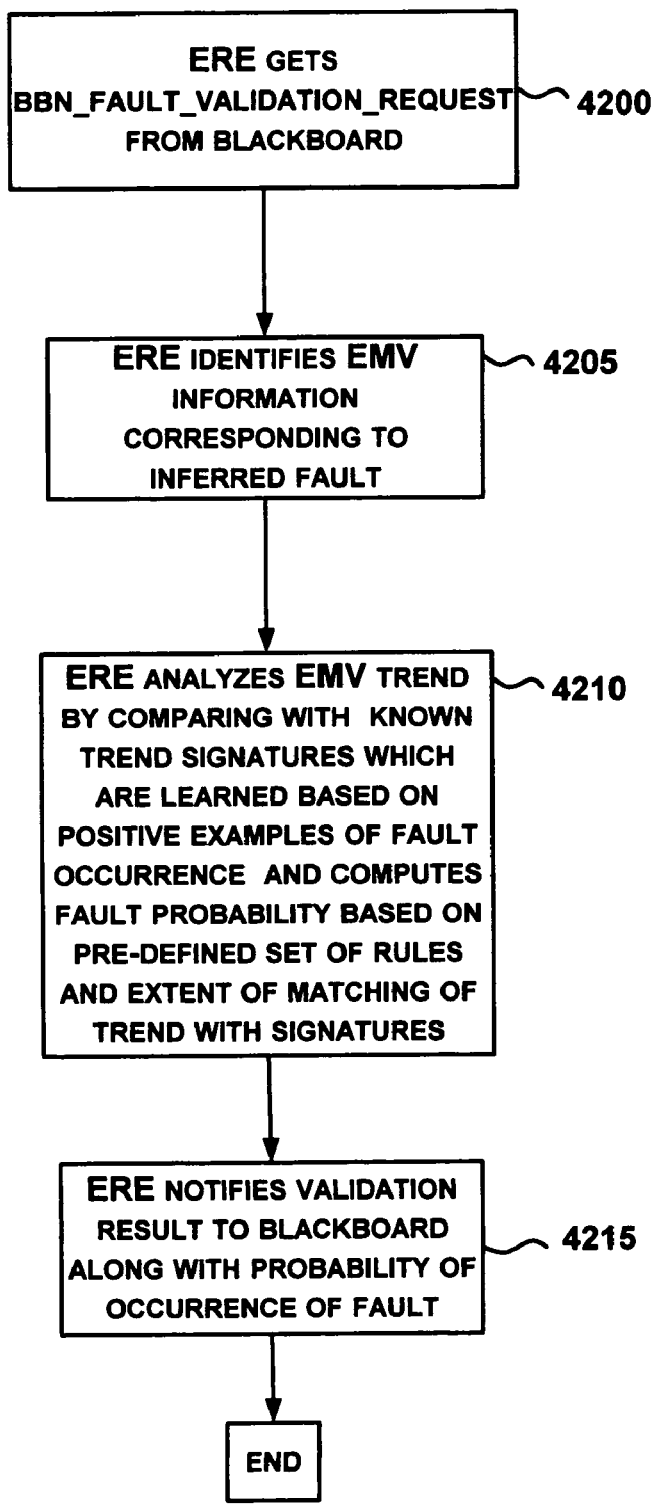
FIG. 4C: PROCESSING OF BBN_FAULT_VALIDATION_REQUEST BY ERE

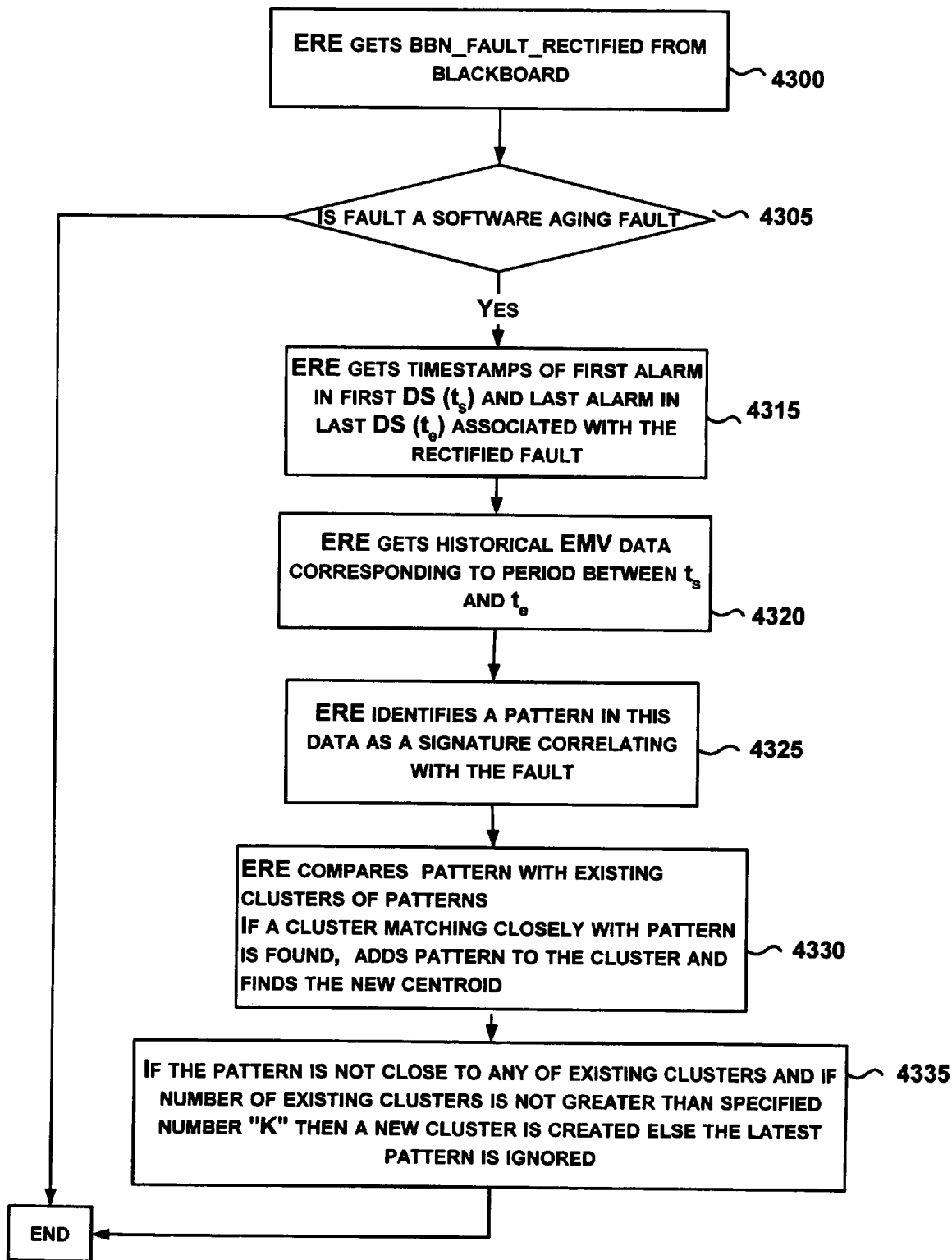
FIG. 4D: PROCESSING OF BBN_FAULT_RECTIFIED BY ERE

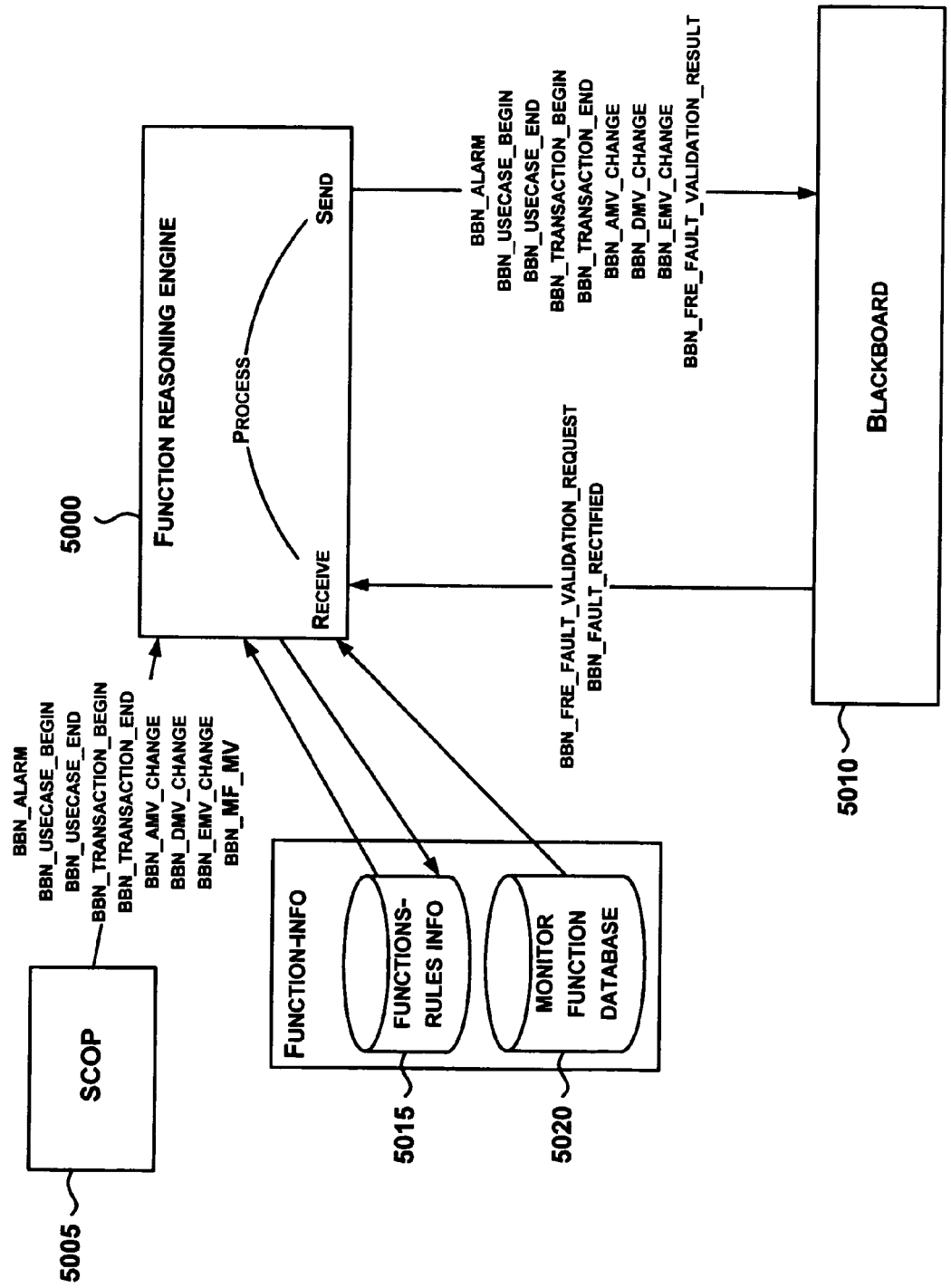
FIG. 5A: FRE ARCHITECTURE

MONITOR FUNCTION DATABASE

| MF_MV_ID | INFERENCE |
|---|---|
|  |  |

FUNCTION-ALARM KNOWLEDGE BASE

| FAULT-ID | LIST OF F-A SIGNATURES |
|---|---|
|  |  |

FUNCTION, ALARM, AND FAULT ASSOCIATION RULES

| RULE_ID | CONDITION (FUNCTION-ALARM SIGNATURE) | FAULT-ID |
|---|---|---|
|  |  |  |

FIG. 5A-1: FUNCTION-INFO (KR)

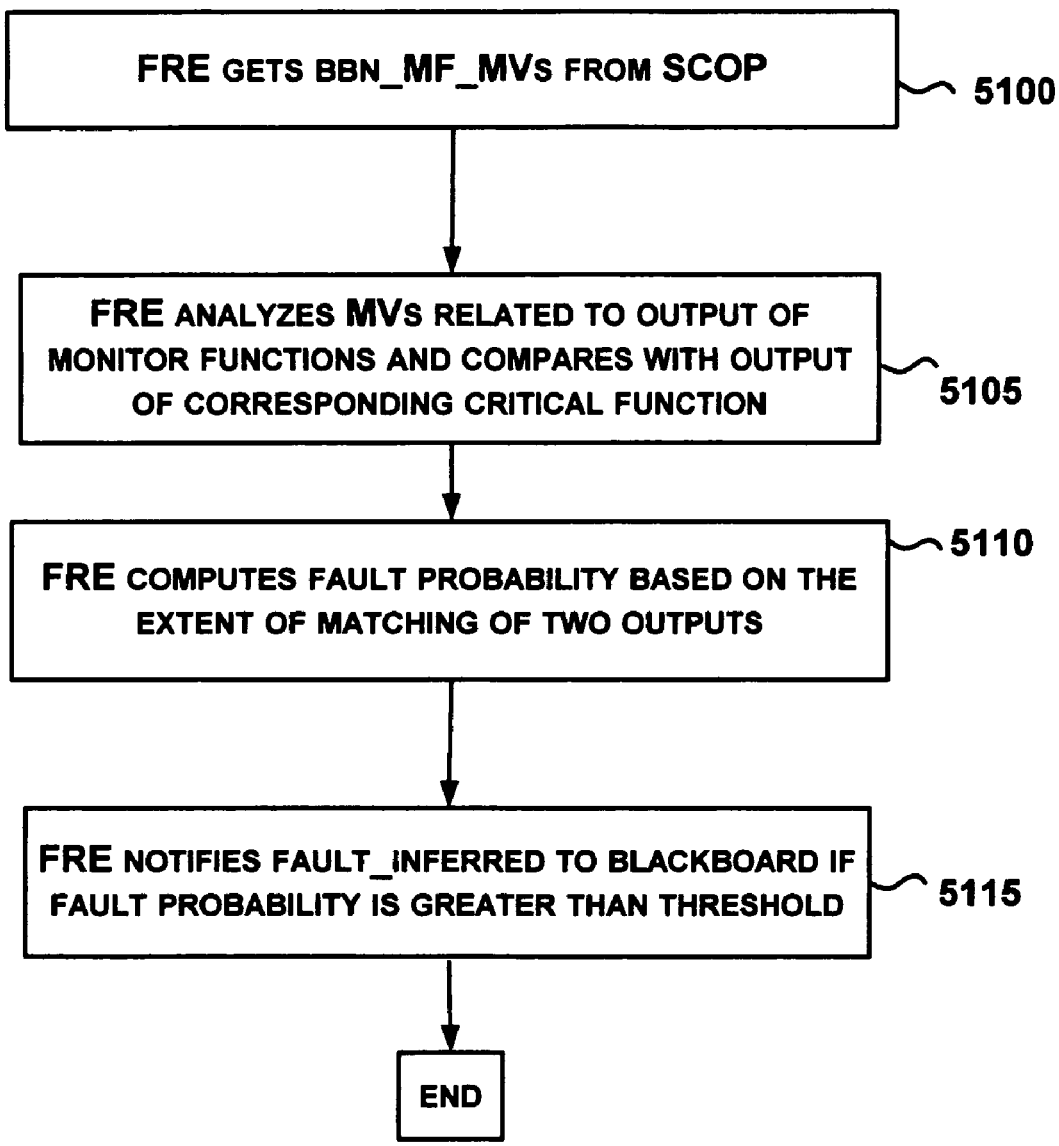
FIG. 5B: PROCESSING OF BBN_MF_MV NOTIFICATION BY FRE

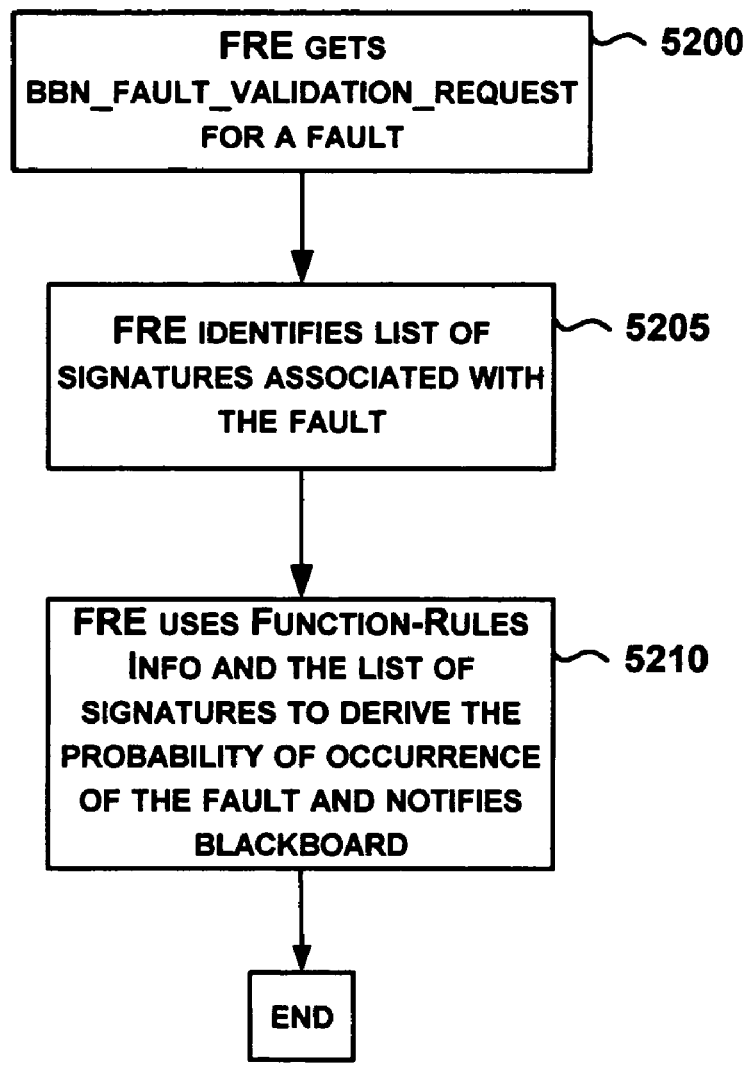
FIG. 5C: PROCESSING BBN_FAULT_RECTIFIED NOTIFICATION BY FRE

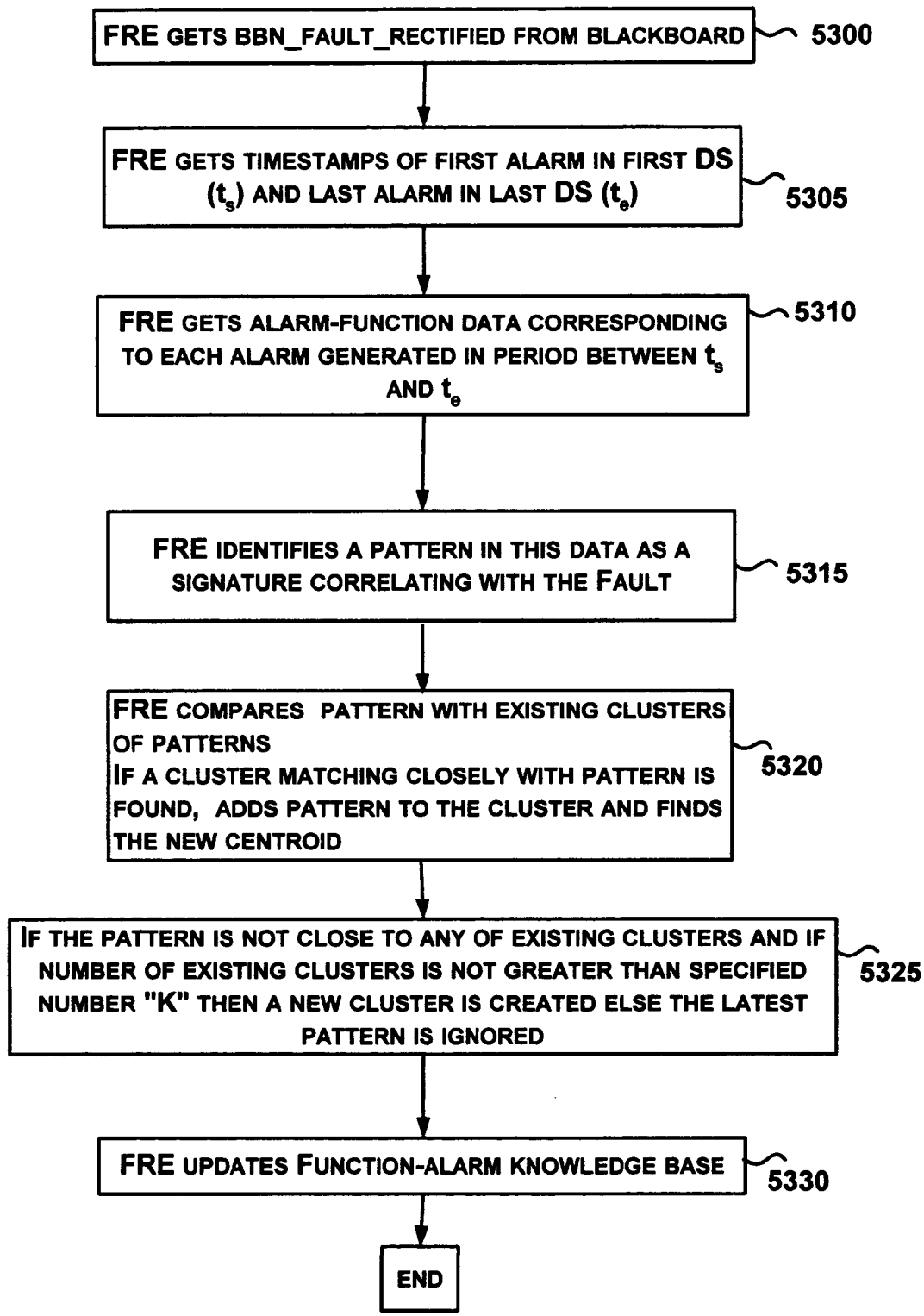
FIG. 5D: PROCESSING OF BBN_FAULT_RECTIFIED BY FRE

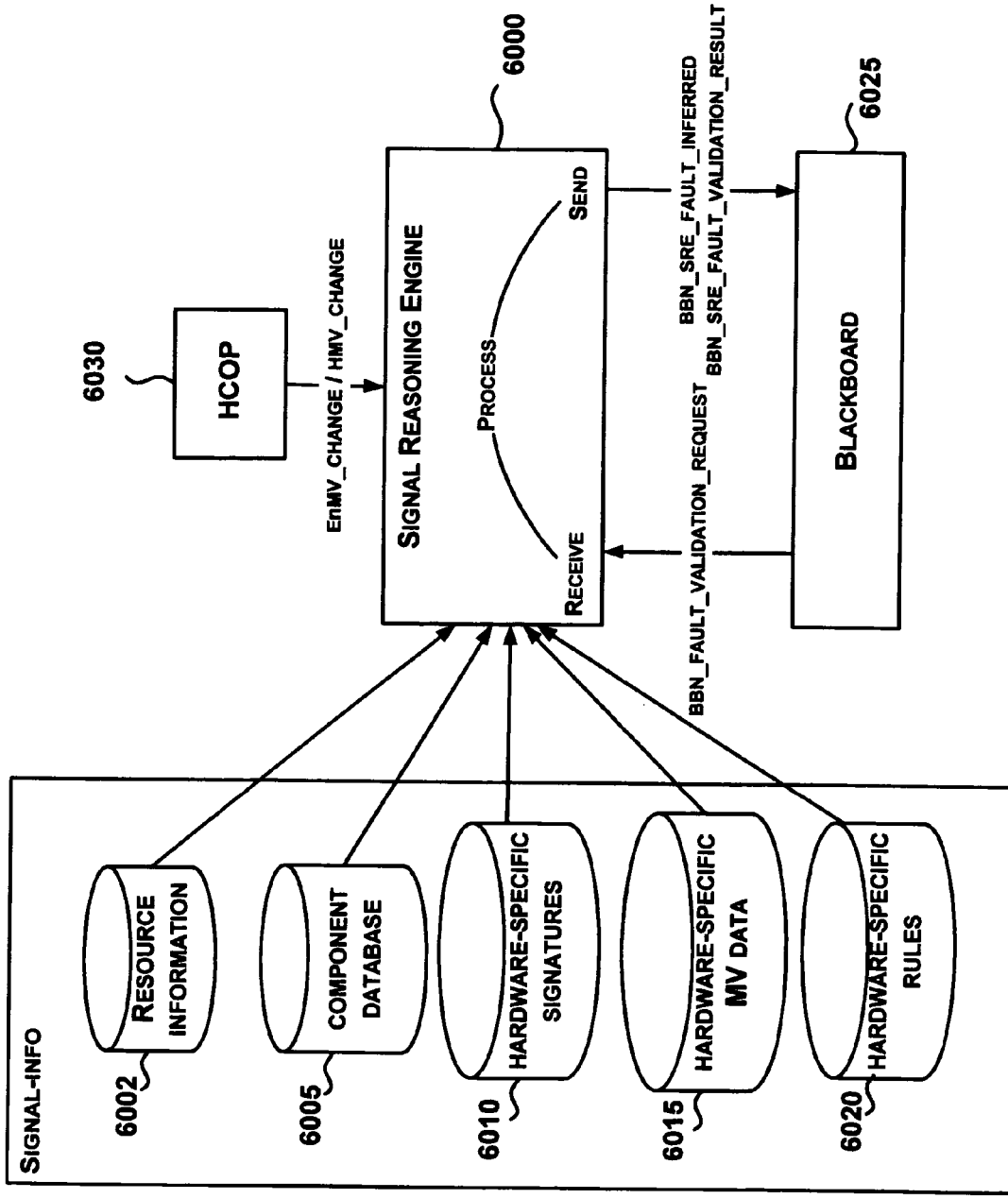
FIG. 6A: SRE ARCHITECTURE

Component Database

| COMPONENT_ID | AGING PARAMETERS | OPERATING CONDITIONS | LIST OF FAULT IDs |
|---|---|---|---|
| | | | |

Resource Information

| RESOURCE_ID | RELATED RESOURCES |
|---|---|
| | |

Hardware-Specific MV Data

| HMV_ID / EnMV_ID | HMV_VALUE / EnMV_VALUE | TIMESTAMP |
|---|---|---|
| | | |

Hardware-Specific Signatures

| HMV_ID / EnMV_ID | SIGNATURE |
|---|---|
| | |

Hardware-Specific Rules

| RULE_ID | CONDITION | INFERENCE |
|---|---|---|
| | | |

FIG. 6A-1: SIGNAL-INFO (KR)

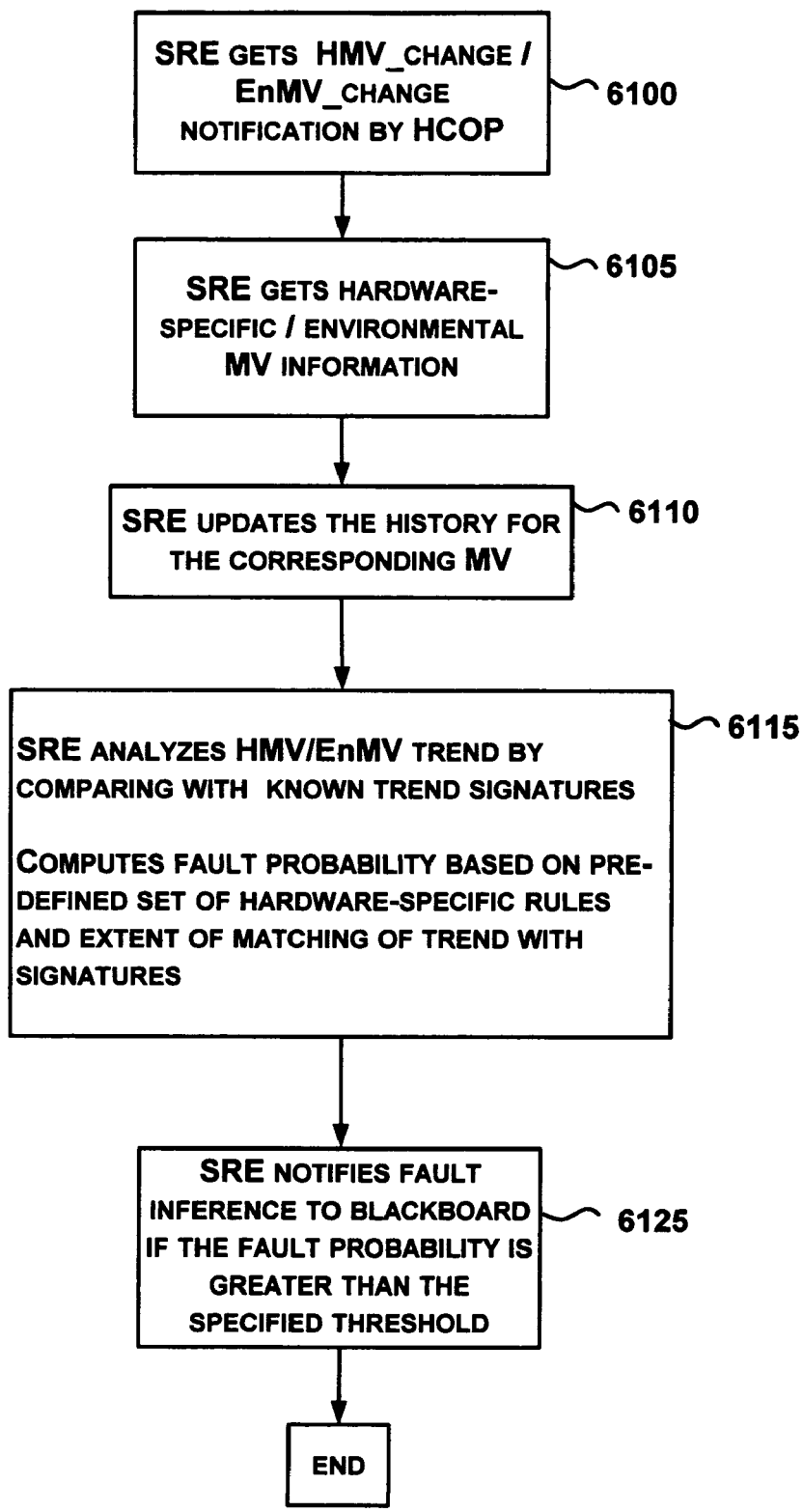
FIG. 6B: PROCESSING OF HMV_CHANGE / ENMV_CHANGE BY SRE

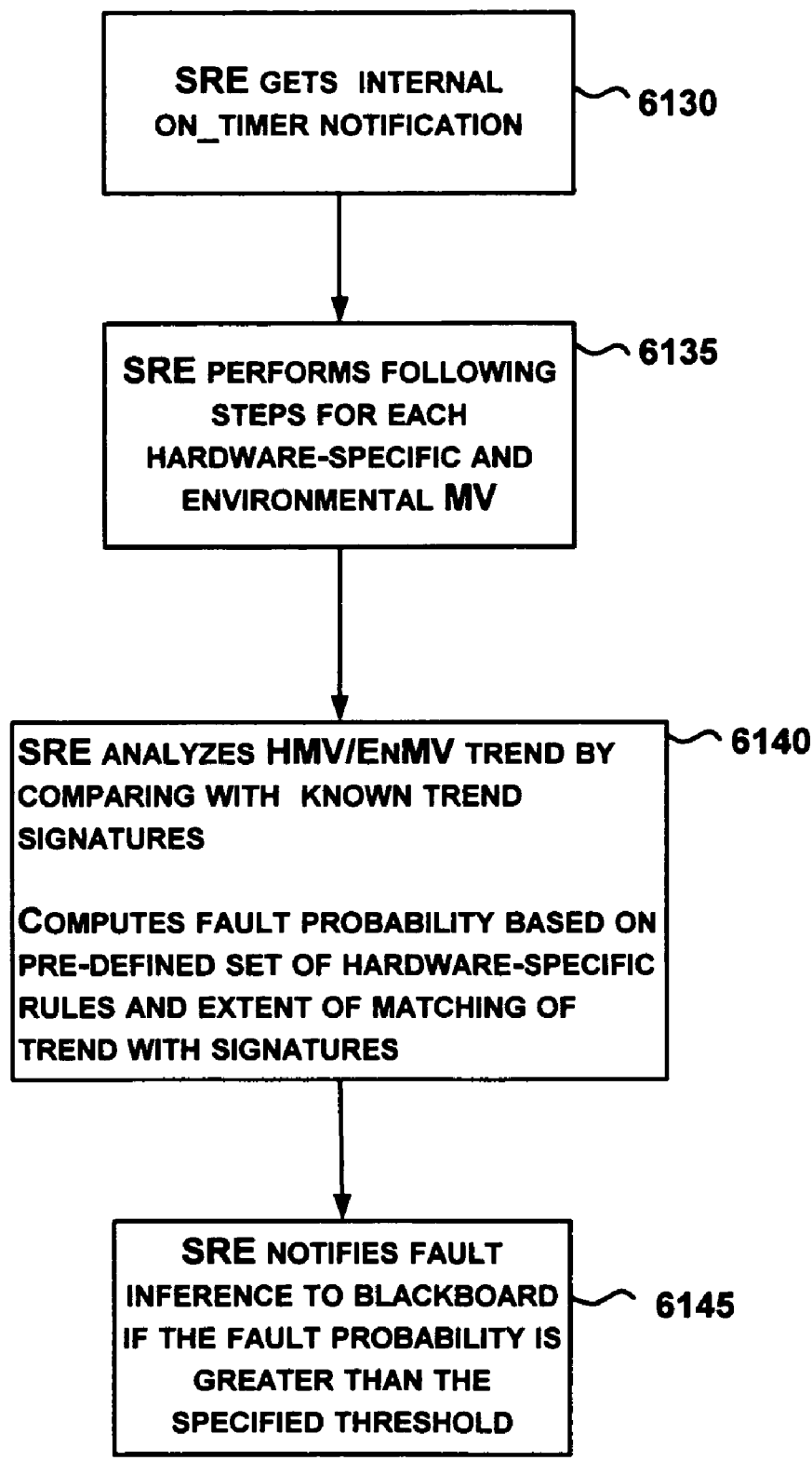
FIG. 6B-1: PROCESSING OF ON_TIMER NOTIFICATION BY SRE

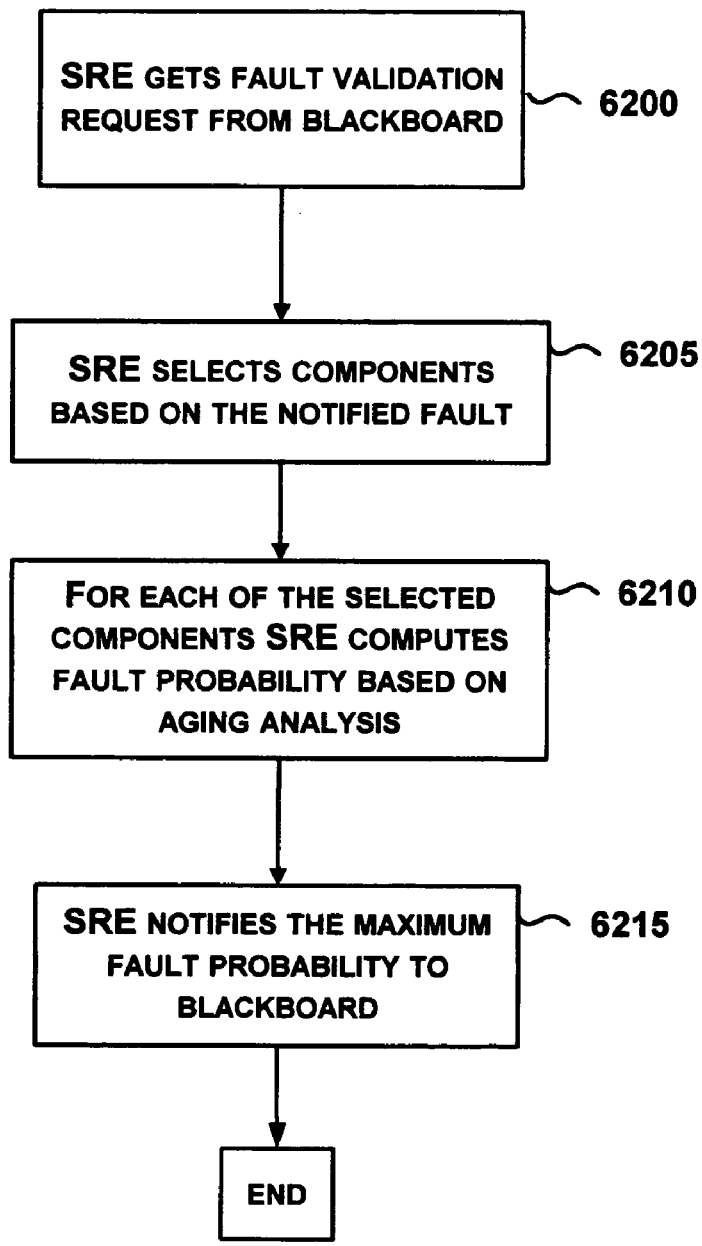
FIG. 6C: PROCESSING OF BBN_FAULT_VALIDATION_REQUEST BY SRE

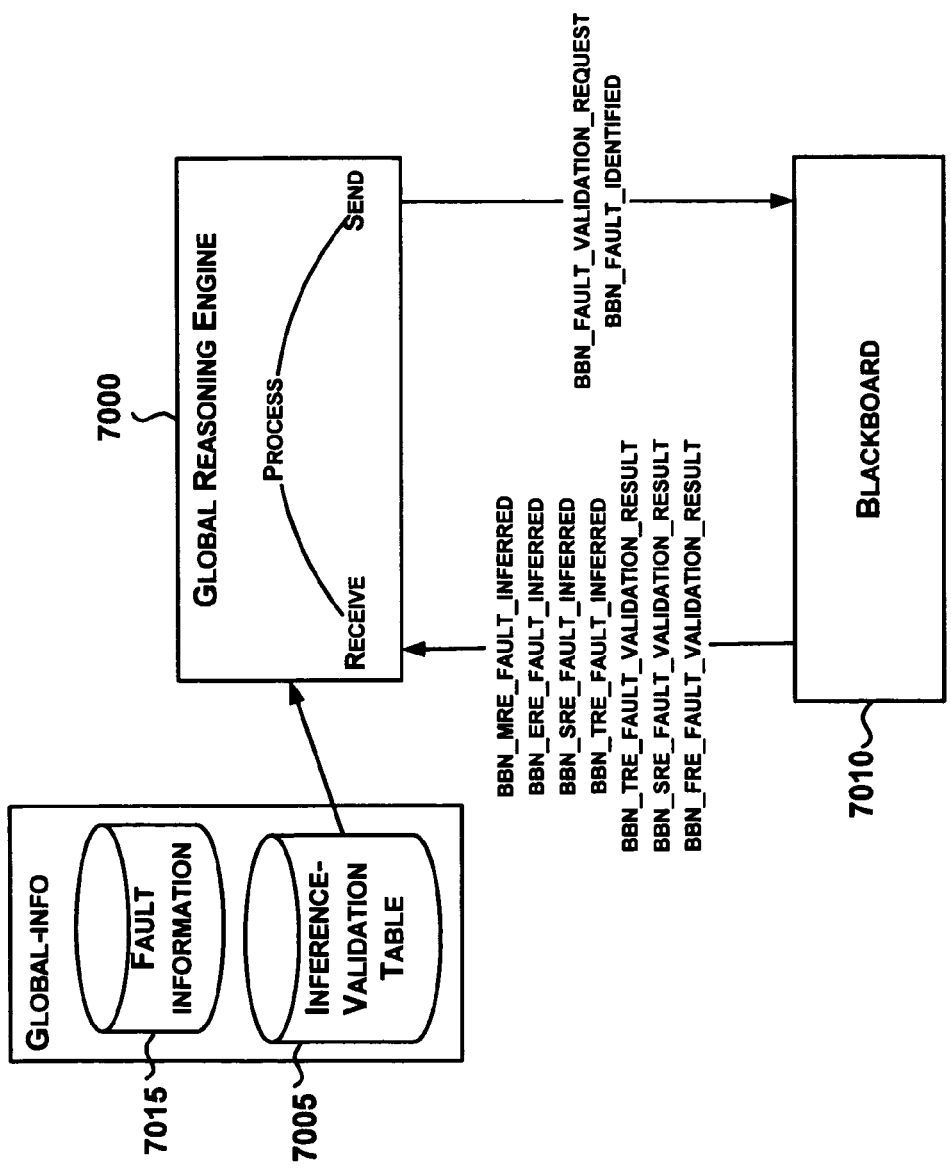
FIG. 7A: GRE ARCHITECTURE

FAULT INFORMATION

| FAULT_ID | LIST OF COMPONENTS |
|---|---|
|  |  |

INFERENCE-VALIDATION TABLE

| FAULT_ID | TRE_INFERENCE | SRE_INFERENCE | MRE_INFERENCE | ERE_INFERENCE | TRE_VALIDATION | SRE_VALIDATION | FRE_VALIDATION | FINAL FAULT PROBABILITY |
|---|---|---|---|---|---|---|---|---|
|  |  |  |  |  |  |  |  |  |

FIG. 7A-1: GLOBAL-INFO

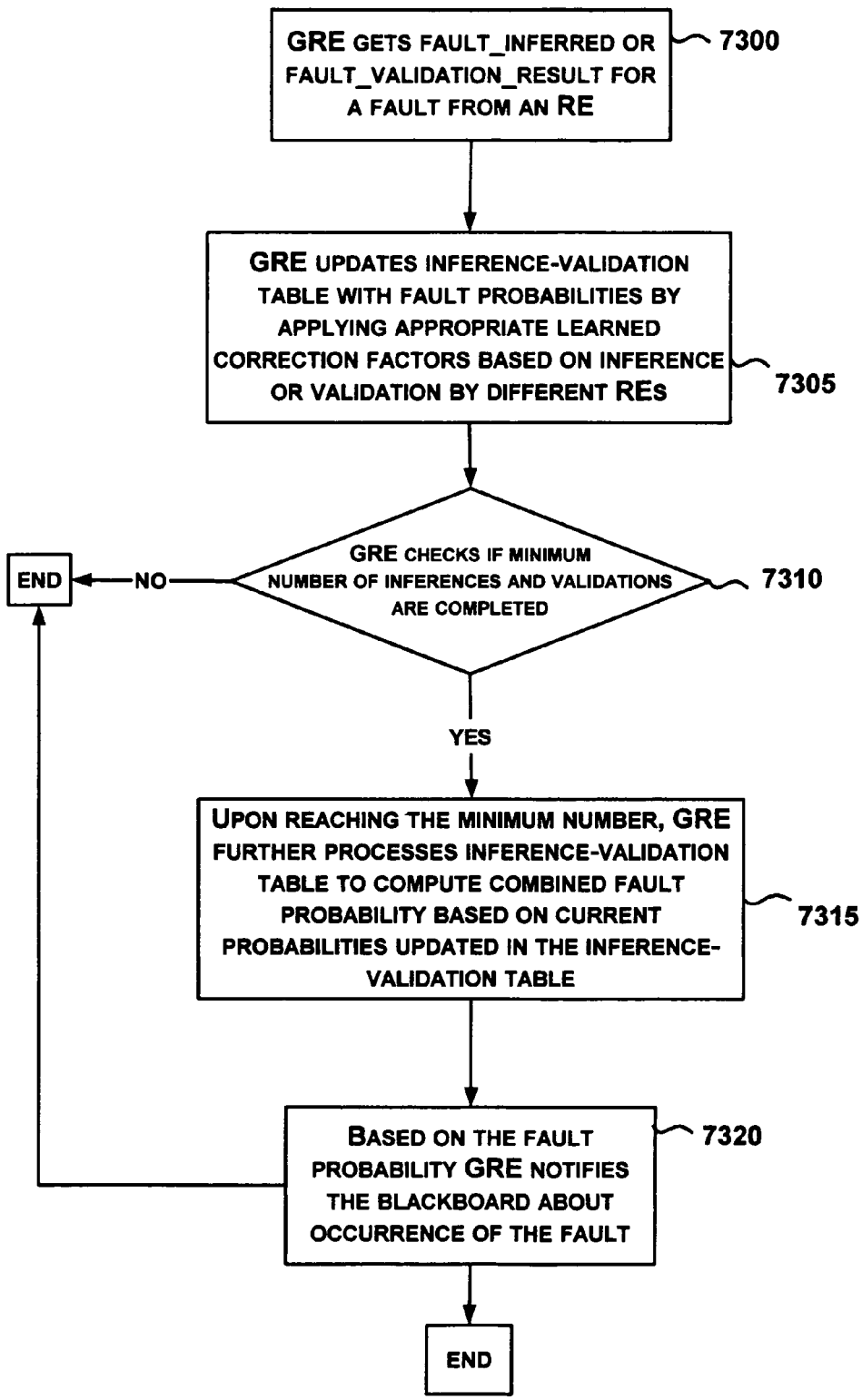
FIG. 7B: PROCESSING OF FAULT INFERENCE AND VALIDATION NOTIFICATIONS BY GRE

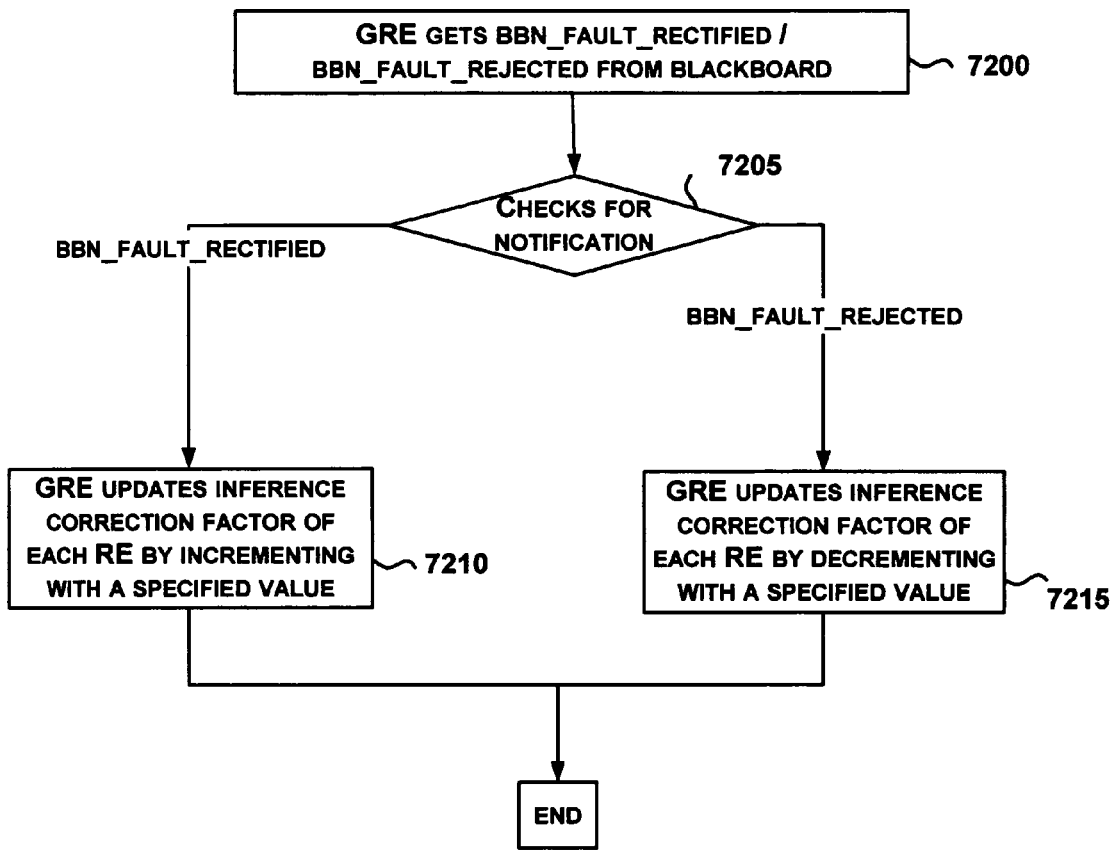
FIG.7C: PROCESSING OF BBN_FAULT_RECTIFIED / BBN_FAULT_REJECTED BY GRE

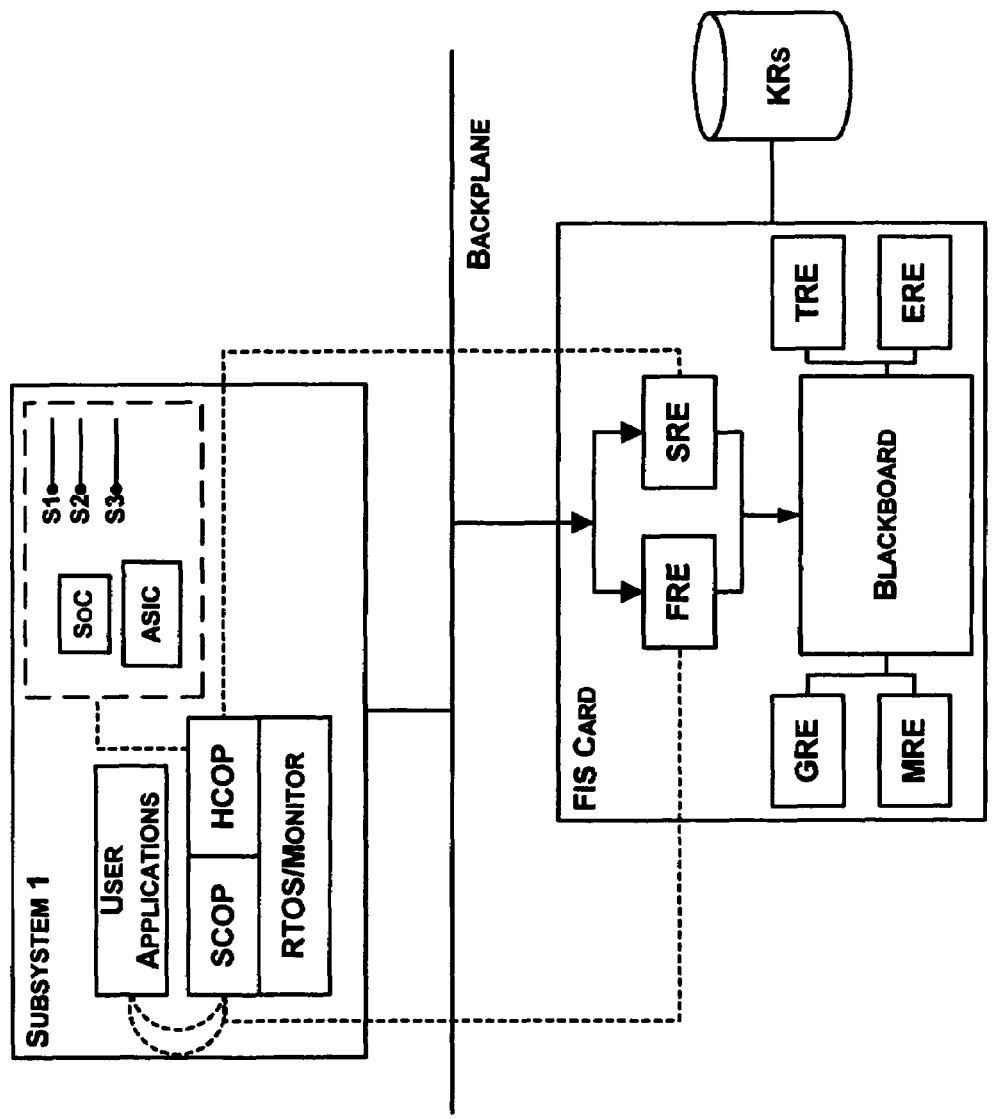
FIG. 8: HARDWARE ARCHITECTURE

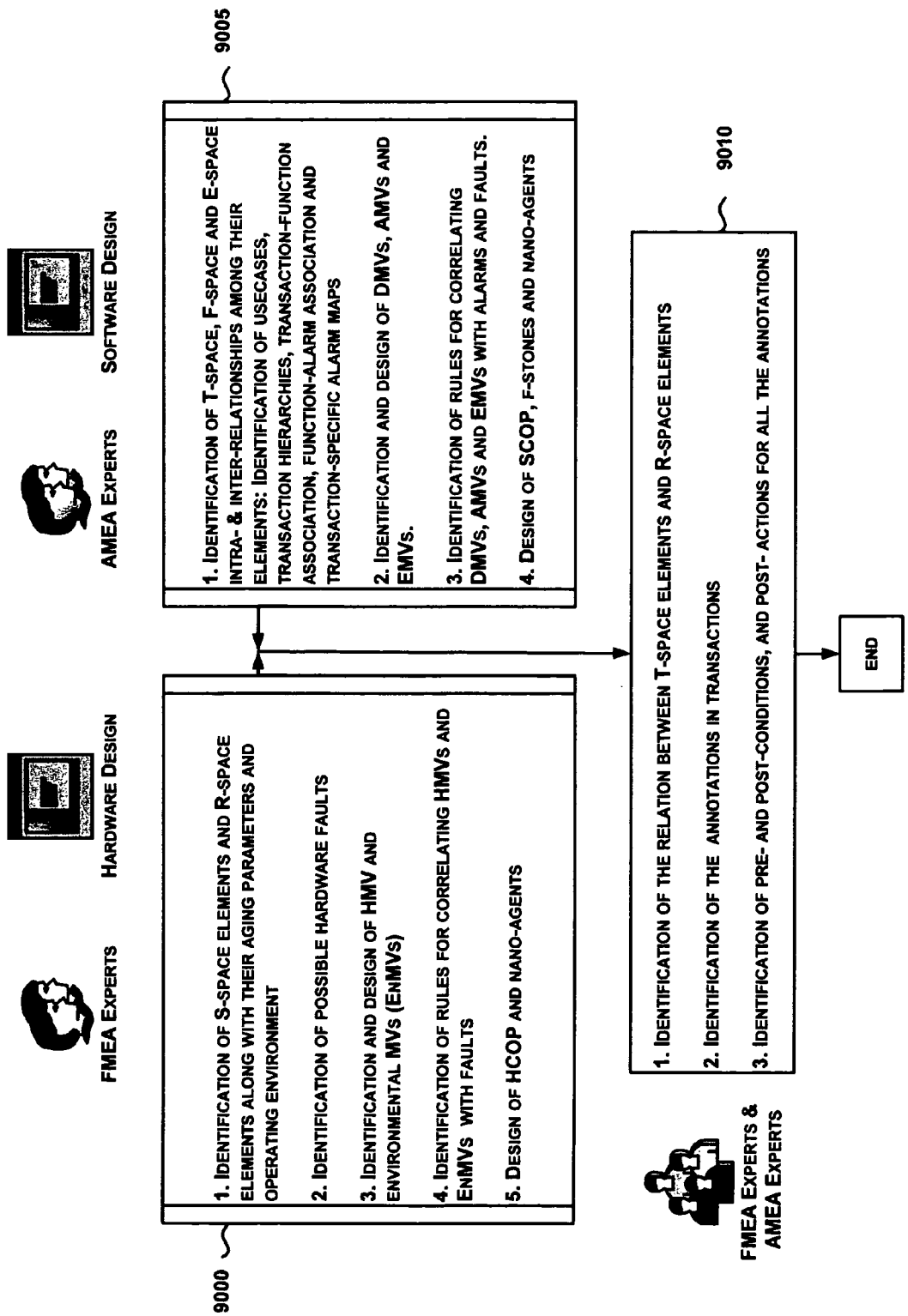
Fig. 9A: Overview of DFD Process

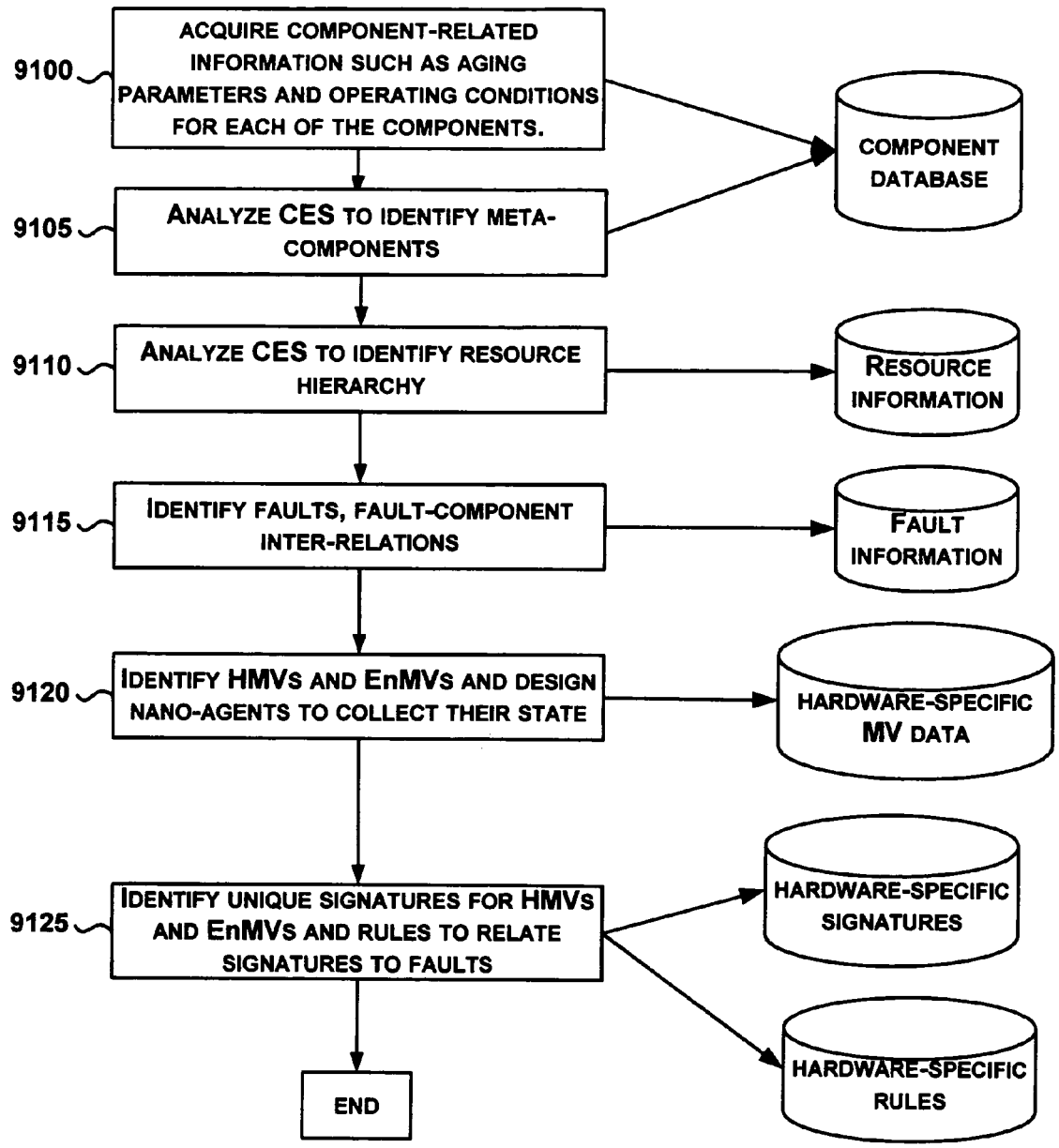
Fig. 9B: DFD Process I

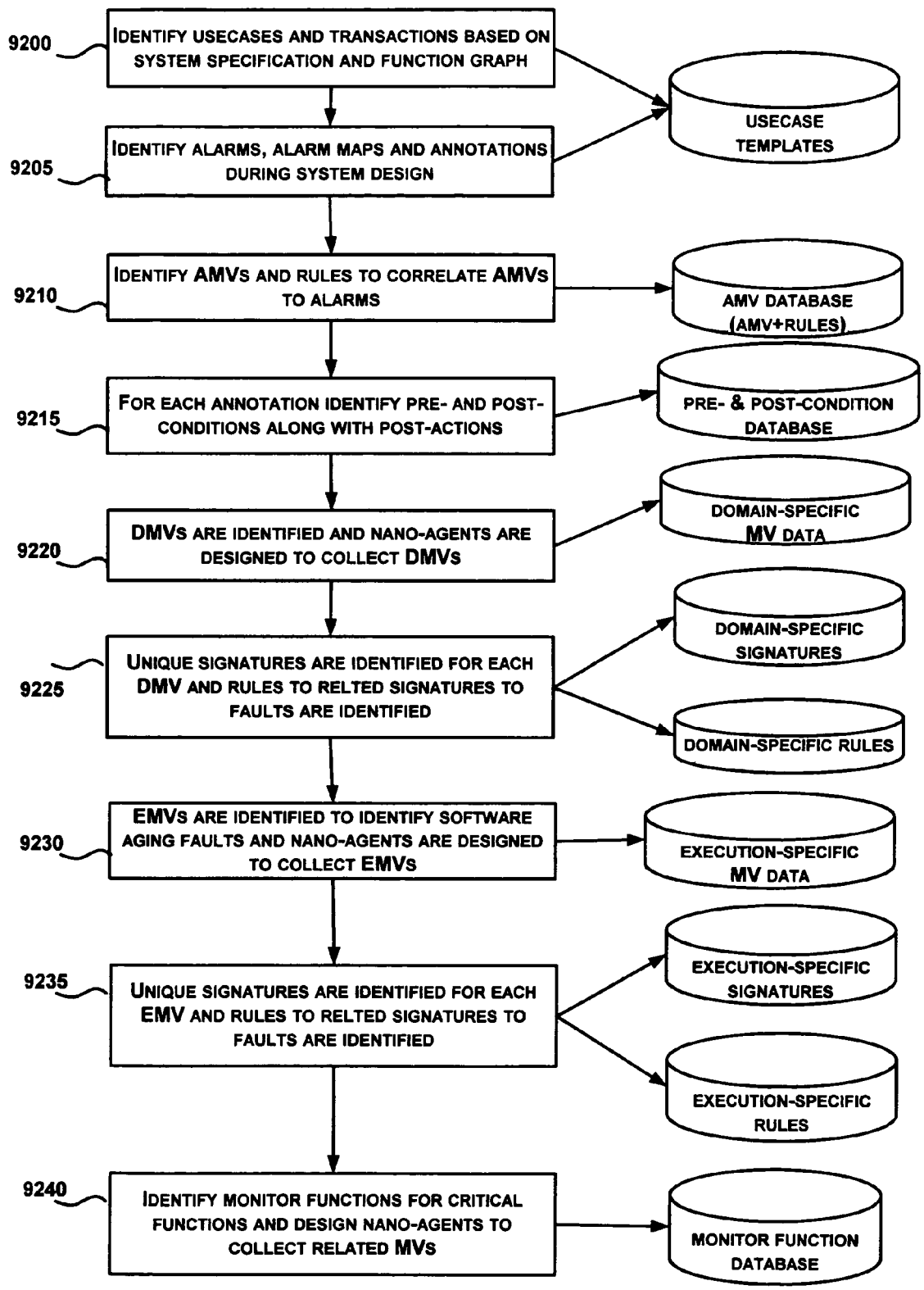
Fig. 9C: DFD Process II

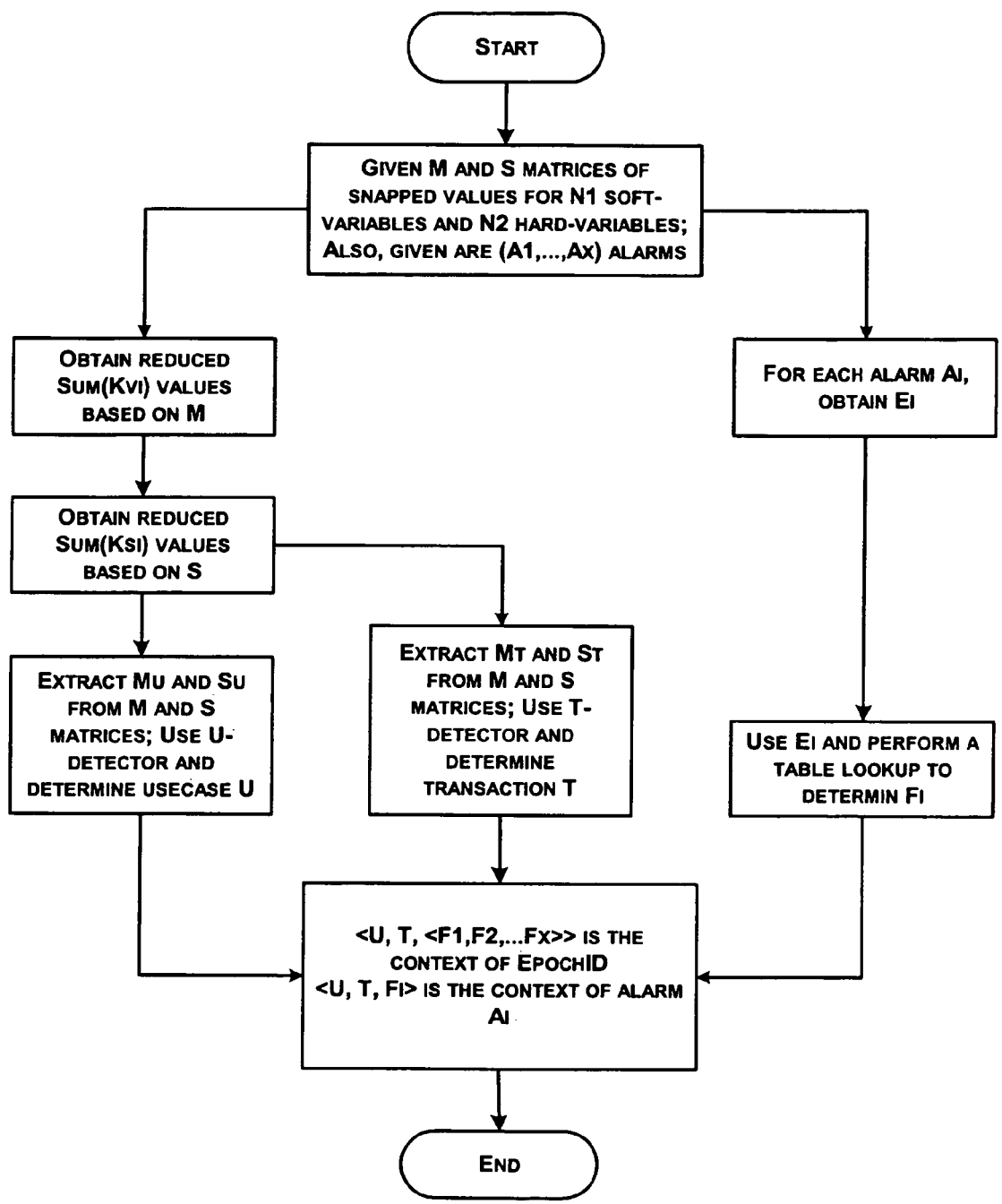
FIG. 10A: CONTEXT GENERATION

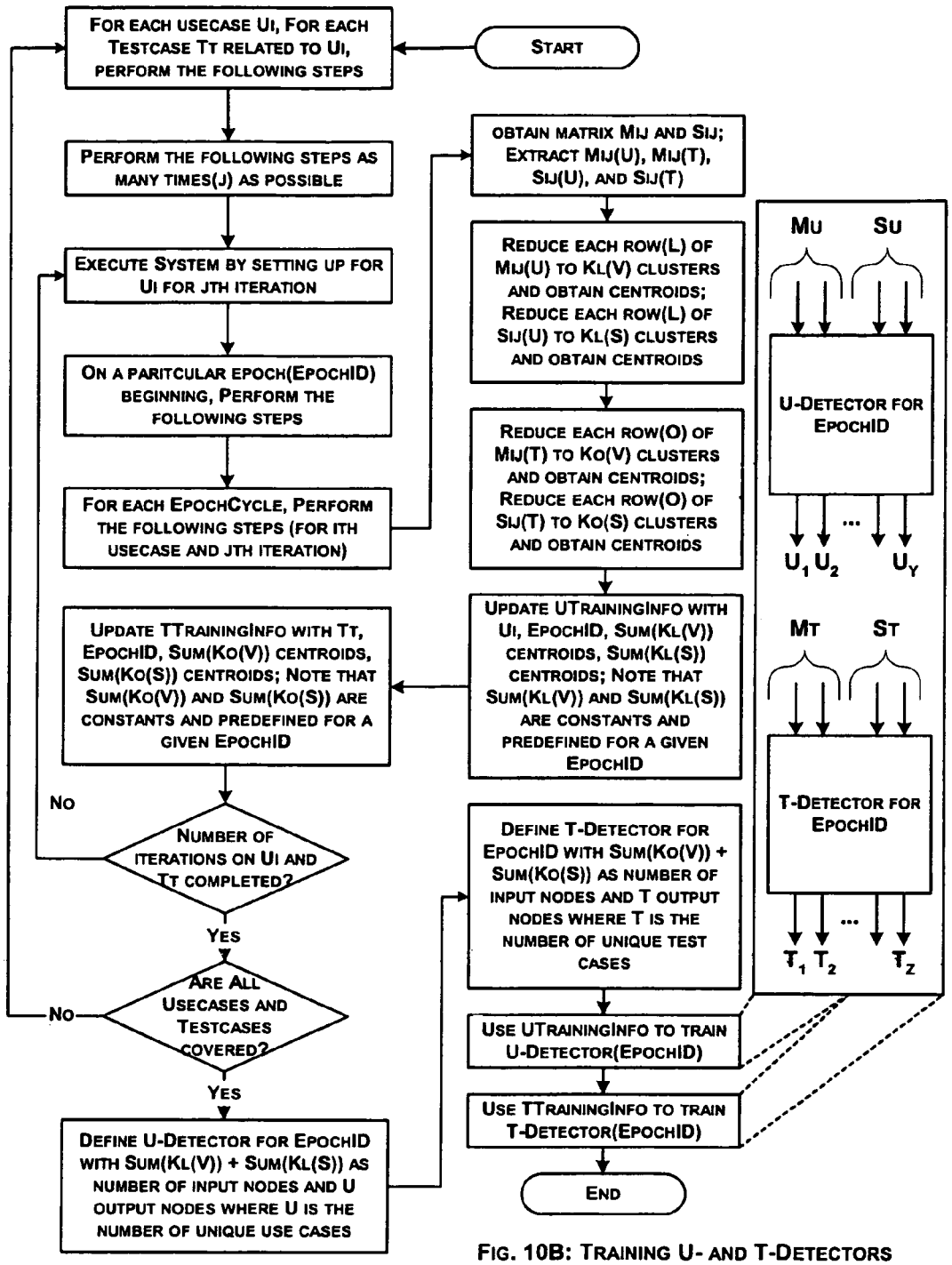
FIG. 10B: TRAINING U- AND T-DETECTORS

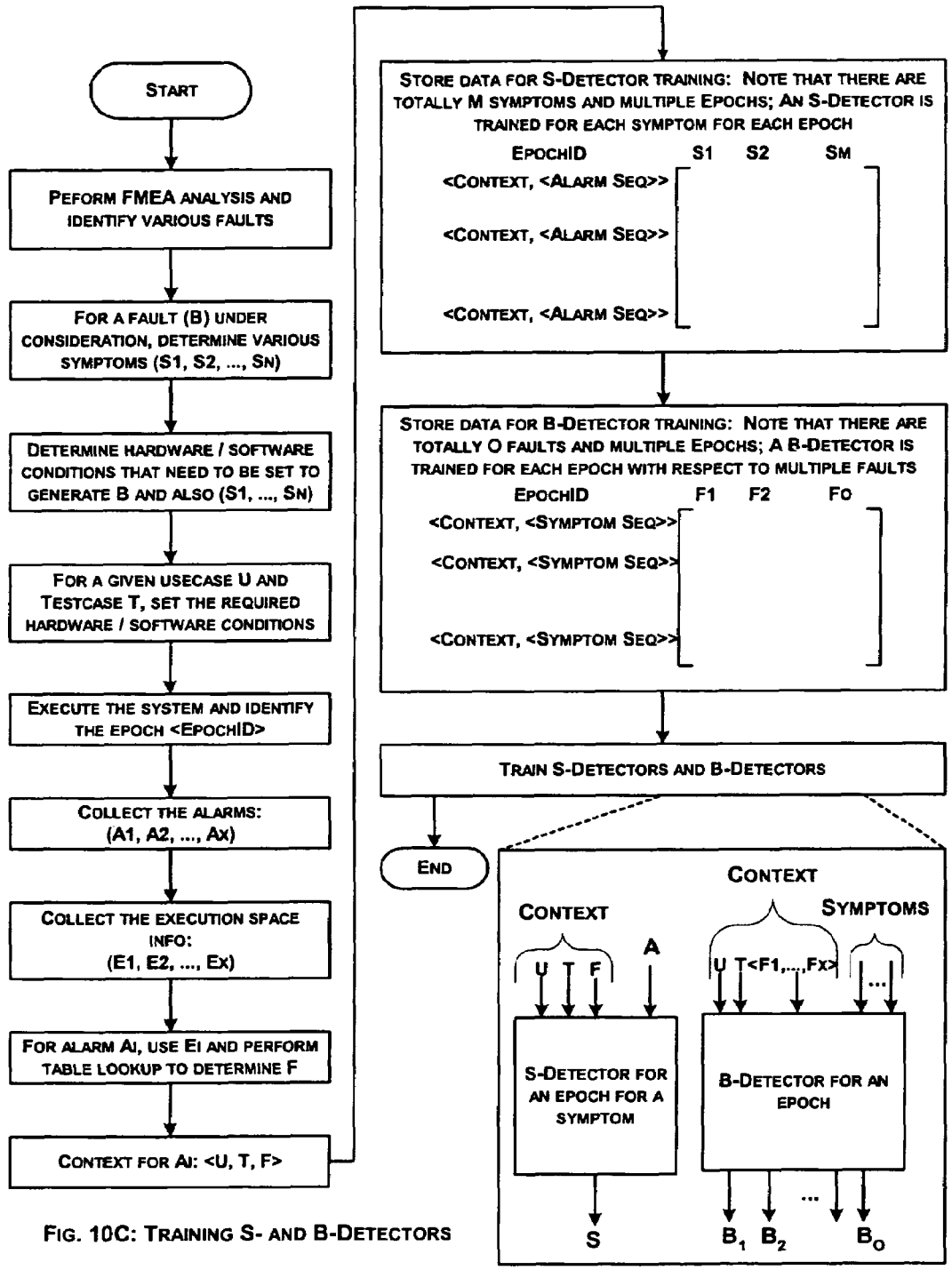
FIG. 10C: TRAINING S- AND B-DETECTORS

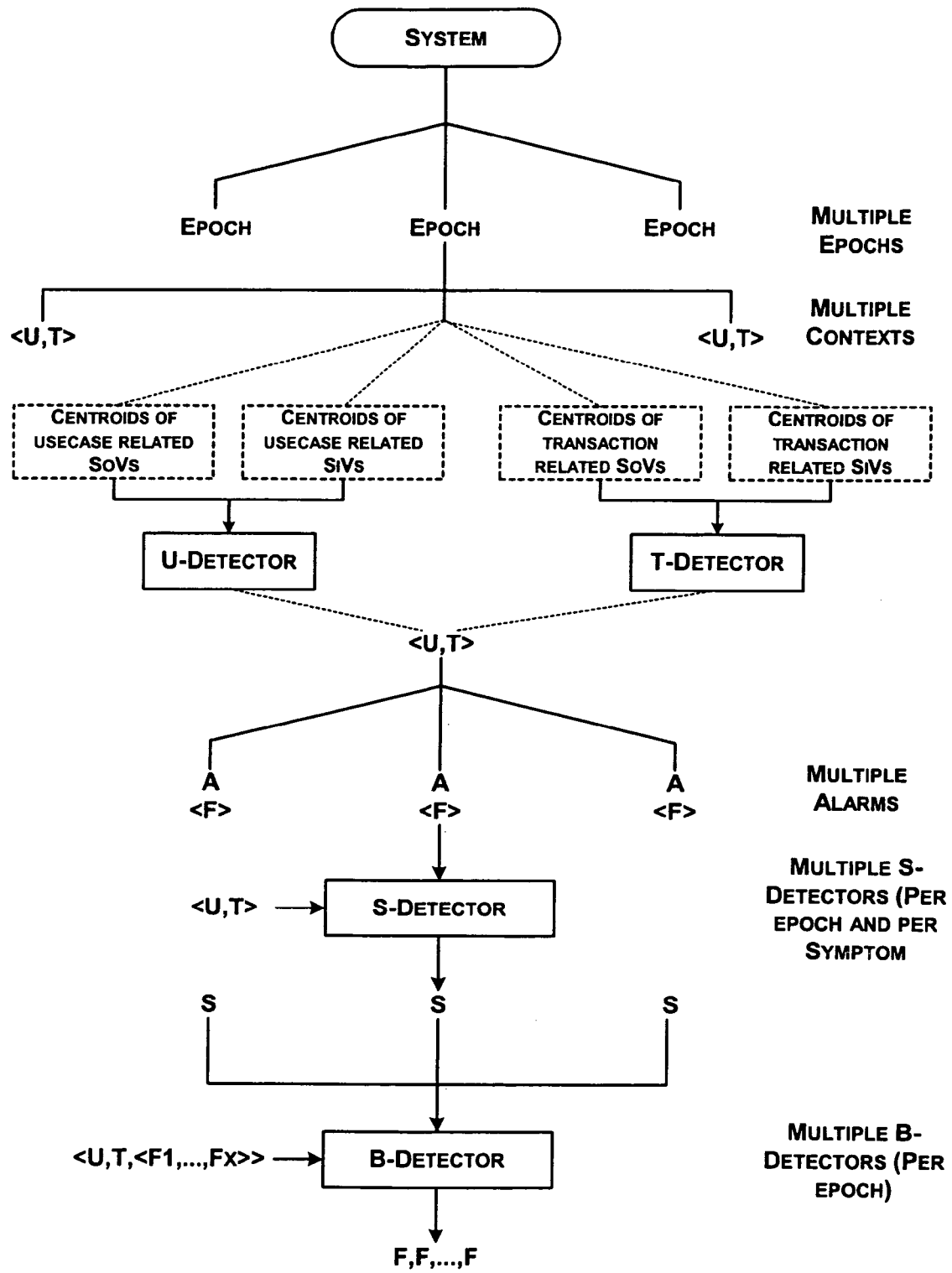
FIG. 10D: USING S-DETECTORS AND B-DETECTOR

SYSTEM AND METHOD FOR FAULT IDENTIFICATION IN AN ELECTRONIC SYSTEM BASED ON CONTEXT-BASED ALARM ANALYSIS

FIELD OF INVENTION

The present invention relates to the field of fault identification in an electronic system and more particularly, to identify the occurrence of a fault in a complex electronic system based on alarm processing. Still more particularly, the invention relates to systems and methods for efficient alarm analysis and fault identification based on context based analysis.

BACKGROUND OF THE INVENTION

Fault isolation in electronic devices such as network elements and communication switches is a challenging task due to enormity of alarm data, ambiguous alarm information (false or missing alarms, redundant alarms, out of sequence alarms etc.) and insufficient alarm-based information for some faults. Hence, there is a need for a mechanism for fast and efficient processing of a large number of alarms.

Existing solutions for fault isolation are mainly of the following categories based on the approach employed for fault diagnosis and isolation:

Rule Based Event Correlation

Rule based systems are based on expert knowledge to identify set of rules to correlate alarms to faults. In case of large network systems, these rules can be very complex and large in number resulting in difficulties in the management of these rules and leading to inaccurate inference of faults. These systems are sensitive to missing and false alarms and out of sequence alarms.

Model Based Reasoning

In model based systems, fault isolation is based on the models of the systems. The alarms are processed with the help of these models to isolate the faults. However, it is difficult to model complex systems to achieve accurate fault isolation.

Case Based Reasoning

Case based reasoning is based on the history of solved problems. A strategy to solve the problem is based on the case history. These systems require exhaustive case database consisting of solution strategy for each case. Huge case database result in high search time and hence affecting the time required for fault isolation.

Probability Network/Bayesian Network

Fault isolation based on Bayesian network is used in conjunction with other fault isolation mechanisms. Probability networks may be advantageous if they can produce hypotheses with a precise confidence level.

DESCRIPTION OF RELATED ART

Diagnosing an electronic system is a challenging task despite the availability of enormous alarm information. The ambiguity and redundancy associated with alarm information presents a challenge for fast and accurate fault identification.

For majority of the existing systems, the focus has been on performance and throughput aspects, rather than fault diagnosis. Focusing the design towards efficient fault diagnosis enhances precision and speed of diagnosis.

U.S. Pat. No. 6,356,885 to Ross; Niall, White, Anthony Richard for "Network Model For Alarm Correlation" (issued Mar. 12, 2002 and assigned to Nortel Networks Limited (St. Laurent, Calif.)) describes a method of processing alarms in a network adapting virtual model wherein each network entity offers and receives services to and from other entities and having associated knowledge based reasoning capacity, such as rules, for adapting the model. Cause of an alarm is determined using the virtual model.

U.S. Pat. No. 6,076,083 to Baker; Michelle for "Diagnostic system utilizing a Bayesian network model having link weights updated experimentally" (issued Jun. 13, 2000) describes a system utilizing a Bayesian network model with an algorithm quantifying the strength of the links and a method to automatically update probability matrices of the network on the basis of collected experiential knowledge. Probability networks are ineffective if they cannot produce hypotheses with a precise confidence level.

U.S. Pat. No. 4,812,819 to Corsberg; Daniel R for "Functional relationship-based alarm processing system" (issued Mar. 14, 1989 and assigned The United States of America as represented by the United States (Washington, D.C.)) describes a system and method that analyzes each alarm as it is activated and determines its relative importance with other currently activated alarms in accordance with the functional relationships that the newly activated alarm has with other currently activated alarms. Four hierarchical relationships are defined by this alarm filtering methodology: (1) there are two alarm settings on the same parameter; (2) causal factors between two alarms; (3) system response within a specified time following activation of an alarm; and (4) unimportant alarms that are normally expected. This invention addresses alarm processing in terms of reducing the complexity and enormity of the alarm information; however it does not address the issues such as ambiguity and insufficiency of alarm related information.

U.S. Pat. No. 6,249,755 to Yemini; Yechiam; Yemini; Shaula; Kliger; Shmuel for "Apparatus and method for event correlation and problem reporting" (issued Jun. 19, 2001 and assigned to System Management Arts, Inc. (White Plains, N.Y.)) describes:

1. Event and propagation model—Model consisting of exceptional events, local symptoms, potential relationships for event propagation;
2. Creating causality matrix of problems and symptoms—Mapping of symptoms to likely problems with associated probabilities;
3. Finding optimal code book—Based on a minimal subset of symptoms that provide an acceptable level of problem identification; and
4. Fault Isolation using optimal code book—Continuos monitoring and decoding of the symptoms by locating best fit problem in the optimal code book which matches a particular set of symptoms.

This invention makes implicit assumptions such as every fault has a unique set of alarms and the information accompanying alarms are sufficient to identify a fault.

U.S. Pat. No. 5,107,500 to Wakamoto; Masaaki (Yokohama, JP); Kim; Moo W. (Kawasaki, JP); Fukazawa; Mitsunori (Yokohama, JP); Aramaki; Takahiro (Kawasaki, JP) for "Diagnostic expert system" (issued Apr. 21, 1992 and assigned to Fujitsu Ltd. (Kawasaki, JP)) describes a diagnostic expert system that is set up with multiple diagnostic subsystems, one diagnostic subsystem based on a maintenance technician's knowledge and a second diagnostic subsystem based on a design engineer's knowledge, and the two diagnostic subsystems are used to locate the occurred faults.

U.S. Pat. No. 5,388,189 to Kung; Ching Y for "Alarm filter in an expert system for communications network" (issued Feb. 7, 1995 and assigned to Racal-Datacom, Inc. (Sunrise, Fla.)) describes an Expert System for providing diagnostics to a data communications network in which alarms from a Network Manager are received and queued by an Event Manager and then filtered by an Alarm Filter to remove redundant alarms. Alarms which are ready for processing are then posted to a queue referred to as a Bulletin Board and an Inference Engine uses information from an Expert Information Structure to solve the highest priority goal.

U.S. Pat. No. 5,664,093 to Barnett; Bruce Gordon (Troy, N.Y.); Bloomer; John Joseph (Schenectady, N.Y.); Chang; Hsuan (Clifton Park, N.Y.); Crapo; Andrew Walter (Scotia, N.Y.); Hartman; Michael James (Clifton Park, N.Y.); Vivier; Barbara Jean (Niskayuna, N.Y.) for "System and method for managing faults in a distributed system" (issued Sep. 2, 1997 and assigned to General Electric Company (Schenectady, N.Y.)) describes a system and method for managing faults in a distributed system in which the fault management system includes a configuration manager that maintains configuration information of components used in the distributed system. The diagnostic system receives the configuration information from the configuration manager and the performance information from measurement agents and uses the configuration and performance information with the rules to identify faults and provide solutions for the faults.

U.S. Pat. No. 5,751,933 Dev; Roger H. (64 Bagdad Rd., Durham, N.H. 03824); Nelson; Mark H. (53 Tibbetts Rd., Fremont, N.H. 03044) for "System for determining the status of an entity in a computer network" (issued May 12, 1998) describes a network management system that includes a virtual network that models network entities and relations between network entities along with inference handlers to process network data. The system can poll or communicate with certain network entities and can infer the status of network entities.

U.S. Pat. No. 6,012,152 to Douik; Samir (Sainte Anne de Bellevue, Calif.); Boutaba; Raouf (Montreal, Calif.) for "Software fault management system" (issued Jan. 4, 2000 and assigned to Telefonaktiebolaget LM Ericsson (publ) (Stockholm, SE)) describes a Software Fault Management system for managing software faults in a managed mobile telecommunications network. The system includes an Intelligent Management Information Base with a functional model of the managed network and a trouble report/known faults case base. Fault management is both proactive and reactive.

U.S. Pat. Application 20040168100 by Thottan, Marina K.; (Troy, N.Y.); Ji, Chuanyi; (Troy, N.Y.) titled "Fault detection and prediction for management of computer networks" (filed on Jan. 14, 2004) describes a system and method for network fault and anomaly detection and is based on the statistical behavior of the management information base variables. The detection scheme relies on traffic measurement and is independent of specific fault descriptions.

Use of blackboard architecture in case based diagnostics and diagnosing nuclear power plants was proposed in some of the prior art (Rissland, E., Daniels, J., Rubinstein, B., and Skalak, D., "Case-Based Diagnostic Analysis in a Blackboard Architecture", in the Proceedings of the Eleventh National Conference on Artificial Intelligence, pp 66-72, Washington, 1993.)

The detection of faults, based on monitoring of behavior of the variables, involves generation of variable level alarms based on the magnitude of the detected changes as compared to the normal situation was discussed in the literature (Marina Thottan and Chuanyi Ji, "Adaptive thresholding for proactive network problem detection," Proceedings IEEE Internation Workshop on Systems Management, pp. 108-116, Newport, R.I., April 1998).

Another prior art refers to the model-based monitoring and diagnosis system based on Qualitative Reasoning where hierarchical models are used to monitor and diagnose dynamic systems (Franz Lackinger and Wolfgang Nejdl, "Diamon: a model-based troubleshooter based on qualitative reasoning" in IEEE Expert 8(1): 33-40, February 1993).

The known systems do not address the issue of exploiting a multidimensional context associated with a plurality of alarms in identifying and localizing faults in an electronic system. The present inventions describes six carefully selected context dimensions, namely, usecase, transaction, function, soft-variable, hard-variable, and execution, describes methods for generating the context associated with an alarm, and using the generated contextual information with a sequence of alarms to identify and localize faults.

SUMMARY OF THE INVENTION

The present invention provides a method and apparatus for efficiently identifying the faults occurring in an electronic system based on the analysis of observed alarm information. More specifically, the present invention provides methods for reducing the ambiguity and complexity arising due to the enormity of the alarms generated by the system.

One aspect of the invention is to provide for the definition of additional contextual information associated with the alarms by observing the electronic system along the four dimensions namely, Transaction-space, Function-space, Execution-space and Signal-space. Each of these spaces provide additional contextual information for the alarms generated and thus enhancing the semantic content of the alarms.

Another aspect of the invention is to provide for identification and analysis of alarm-independent system variables (monitor variables), which provide additional contextual information on the functional, performance, and environmental aspects of the electronic system. Analysis of data obtained from the monitor variables is used to resolve the ambiguity resulting out of missing and false alarms.

Yet another aspect of the invention is an apparatus for collecting and processing of contextual information along with alarm information to identify a fault. This apparatus consists of a blackboard and multiple reasoning engines for processing each of the kind of contextual information, namely, Transaction reasoning engine (TRE), Function reasoning engine (FRE), Signal reasoning engine (SRE), Execution reasoning engine (ERE), Monitor reasoning engine (MRE) and Global reasoning engine (GRE).

Another aspect of the invention is a method for processing of alarms, in which alarms are processed collaboratively by the various reasoning engines.

Yet another aspect of the invention is a definition of a process for the design of the system based on the "Design for Diagnosis" approach. DFD approach is an enhanced hardware-software co-design methodology to improve the diagnosibility of the system. This methodology provides a process to collect the knowledge and database information during the system design and to identify contextual information and design of means for collecting the contextual information from CES at run-time.

Present invention is advantageous in reducing the complexity of alarm processing arising out of enormity of alarms by logically grouping them based on transactions.

Present invention further addresses the problem of ambiguity in alarm information by providing a method for using monitor variables for ambiguity resolution and addresses the problem of insufficiency of information accompanying the alarms, by defining additional contextual information and providing methods for collecting and analyzing the contextual information.

BRIEF DESCRIPTION OF DRAWINGS

FIG. 1A illustrates the blackboard architecture of Fault Identification System (FIS);

FIG. 1B illustrates various spaces and space mapping;

FIG. 1C illustrates resource hierarchy;

FIG. 1D illustrates inter-relation between usecase, transaction, alarm map and annotation;

FIG. 1E illustrates context association with the alarm;

FIG. 2A illustrates the architecture of Transaction Reasoning Engine (TRE);

FIG. 2A-1 illustrates typical data representation of transaction information;

FIG. 2B illustrates processing of usecase begin notification by TRE;

FIG. 2C illustrates processing of transaction begin notification by TRE;

FIG. 2D illustrates processing of alarm notification by TRE;

FIG. 2D-1 illustrates processing of DSs by TRE,

FIG. 2E illustrates processing of AMV change notification by TRE;

FIG. 2F illustrates processing of transaction end notification by TRE;

FIG. 2G illustrates processing of usecase end notification by TRE;

FIG. 2H illustrates processing of fault validation request by TRE;

FIG. 2I illustrates processing of fault rectified and fault rejected notifications by TRE;

FIG. 3A illustrates the architecture of Monitor Reasoning Engine (MRE);

FIG. 3A-1 illustrates typical data representation of monitor information;

FIG. 3B illustrates processing of DMV change notification by MRE;

FIG. 3B-1 illustrates processing of timer notification by MRE;

FIG. 4A illustrates the architecture of Execution Reasoning Engine (ERE);

FIG. 4A-1 illustrates typical data representation of execution information;

FIG. 4B illustrates processing of EMV change notification by ERE;

FIG. 4B-1 illustrates processing of timer notification by ERE;

FIG. 4C illustrates processing of fault validation request by ERE;

FIG. 4D illustrating processing of fault rectified by ERE;

FIG. 5A illustrates the architecture of Function Reasoning Engine (FRE);

FIG. 5A-1 illustrates typical data representation of function information;

FIG. 5B illustrates processing of MF_MV notification by FRE;

FIG. 5C illustrates processing of fault validation request by FRE;

FIG. 5D illustrates processing of fault rectification by FRE;

FIG. 6A illustrates the architecture of Signal Reasoning Engine (SRE);

FIG. 6A-1 illustrates typical data representation of signal information;

FIG. 6B illustrates processing of HMV/EMV change notification by SRE;

FIG. 6B-1 illustrates processing of timer notification by SRE;

FIG. 6C illustrates processing of fault validation request by SRE;

FIG. 7A illustrates the architecture of Global Reasoning Engine (GRE);

FIG. 7A-1 illustrates typical data representation of global information;

FIG. 7B illustrates computation of final fault probability by GRE;

FIG. 7C illustrates processing of fault rectified and fault rejected notifications by GRE;

FIG. 8 illustrates the hardware architecture of FIS system;

FIG. 9A illustrates the overview of Design For Diagnosis (DFD) process;

FIG. 9B illustrates DFD process I;

FIG. 9C illustrates DFD process II;

FIG. 10A illustrates the procedure for context generation;

FIG. 10B illustrates the procedure for training U- and T-detectors;

FIG. 10C illustrates the procedure for training S- and B-detectors; and

FIG. 10D illustrates the use of S-detectors and B-detector.

DETAILED DESCRIPTION OF THE PREFERRED EMBODIMENT

FIG. 1A illustrates a blackboard based architecture of Fault Identification System (FIS). In a preferred embodiment, FIS is part of an Electronic System (ES) and identifies faults in Core Electronic System (CES). Primary objective of FIS is to process alarms to identify faults. The approach for alarm processing is based on the generation and analysis of contextual information using multiple knowledge repositories. Each KR is maintained by an RE over the lifecycle of the core electronic system and the RE processes the knowledge during reasoning to aid in alarm processing. The blackboard architecture facilitates the collaborative identification of faults involving multiple REs.

Nano-Agents ($\eta$As) (1000) are implemented in the core electronic system to facilitate the collection of contextual information to monitor the state of hardware and software of CES. Function-stones (f-stones) (1005) are implemented in critical functions identified during the design of CES to collect the information related to the transaction and the usecase associated with the function under execution.

A component SCOP (1010) collects the information from software $\eta$As, filters information based on pre-defined requirements, and communicates this information to FIS.

A component HCOP (1015) collects the information from hardware $\eta$As (in SoCs and ASICs) and sensors, filters information based on pre-defined requirements, and communicates this information to FIS.

FIS comprises of the following REs:

Transaction Reasoning Engine (TRE) (1020): A sequence of function invocations defines a transaction and each such transaction is associated with an alarm map where the alarm map provides the relationship among the alarms that could get generated while executing the transaction. In order to reduce the non-determinism in alarm processing, the definition of transaction is restricted to a unit that gets executed completely in a thread or process. Conventionally, alarms get associated at the lowest level with functions and at a higher level with, say, usecases. Functions and usecases are the two extremes of the spectrum of possibilities. In former case, the association is at too low a level (and hence, it is required to process with limited context) while in latter case, the association is at a higher level (and hence, it is required to process with general context). Definition of a transaction as something that is in between the above two extreme cases helps to reduce the complexity with adequate context information. TRE processes alarms on per transaction basis to determine a sequence of alarms (alarm annotations) directly or indirectly leading to the identification of faults. Transaction-wise alarm processing is aimed at reducing the ambiguity in alarm processing due to the concurrency in CES. Furthermore, the concurrent processing of alarms results in relatively faster processing of generated alarms. Transaction-Info is the knowledge repository of TRE (1025).

Function Reasoning Engine (FRE) (1030): At the lowest level, alarms are generated by the functions and these functions define the context in which alarms are generated. Collection and analysis of this contextual information along with the alarms aid in semantic correlation of alarms. FRE collects the contextual information from ηAs and f-stones through SCOP. FRE analyses an alarm from function perspective to correlate alarms with functions, which is used to validate faults. Function-Info is the knowledge repository of FRE (1035).

Signal Reasoning Engine (SRE) (1040): Hardware is the heart of the CES and state of the hardware needs to be monitored to correlate alarms with hardware faults. Hardware components have a finite lifetime and are sensitive to the environment in which they operate. SRE analyses the information related to the operating environment, age of the hardware component, and additional contextual information to identify and validate the hardware faults. Signal-Info comprising of hardware-specific signatures, hardware-specific MV data and hardware-specific rules is the knowledge repository of SRE (1045).

Monitor Reasoning Engine (MRE) (1050): Most often alarm information alone is inadequate to identify all the faults. Hence, there is a need to periodically collect and analyze the domain-specific information to identify faults. The domain-specific information consists of software monitor variables to infer faults. Domain-specific signatures database, domain-specific MV data and domain-specific rules are part of Monitor-Info, the knowledge repository of MRE (1055).

Execution Reasoning Engine (ERE) (1060): Most of the electronic systems are concurrent systems wherein multiple tasks are carried out simultaneously. Concurrency in CES leads to ambiguities while processing alarms. Hence, there is a need to monitor system-specific monitor variables that monitor each of the execution units (such as threads or processes) independently to infer faults. Execution-Info comprising of execution-specific MV data, execution-specific signatures and execution-specific rules is KR of ERE (1065).

Global Reasoning Engine (GRE) (1070): Each of the REs described above has an ability to infer and/or validate an occurrence of a fault. Inference or validation of a fault by a reasoning engine is considered as a vote for or against the occurrence of the fault by the reasoning engine. GRE computes the probability of occurrence of a fault based on the majority of votes on fault inference and validation by various REs. Global-Info is the knowledge repository of GRE (1075). Knowledge part of the repository refers to learning of correction factors, which are applied to the fault inferences posted by various REs. Based on positive and negative examples, GRE learns these correction factors for each individual RE.

The blackboard in FIS is a shared memory through which various subsystems share the data among themselves using a messaging mechanism (1080).

Upon receiving a fault identification notification from GRE, FIS notifies about the fault occurrence to the operator. Subsequent feedback from the operator is collected by FIS either as fault rectified or rejected and posted to the blackboard.

Modularity in collaborative reasoning with multiple REs localizes the updation required due to continues changes in evolving systems. For example, if hardware of CES is enhanced, enhancement is updated mostly in SRE, without disturbing other REs.

FIG. 1B illustrates the representation of CES, visualized in terms of multiple logical (semantic) and physical (hardware/software) spaces to define contextual information for alarms.

The spaces are:
Function space (F-space)—physical and soft space
Resource space and Signal space (S-space)—physical and hard space
Execution space (E-space)—physical and soft space
Transaction space (T-space)—logical space F-space is a set of software function hierarchies where each hierarchy comprises of multiple functions based on caller-callee relationship. Every function conceptually belongs to one or more transactions.

Resource and signal spaces together cover the complete hardware of CES. Resource space defines the hardware resources such as ASIC, SoC, microprocessors, memory modules, and discrete components of CES. Signal space defines signal flow in the hardware. Elements of a signal space are two or more resource space elements that are connected by signal paths. Signal and resource spaces are together referred as S-space.

Another soft space that provides additional contextual information is E-space. E-space is a set of execution units ($E_i$). In every execution unit, a set of transactions get executed.

A transaction space enables a logical grouping and processing of alarms with additional contextual information. A sequence of function invocations defines a transaction and the definition of a transaction is restricted to a unit that gets executed completely in a thread or process. Transactions that directly interact with the hardware components (one or more signal space elements) are referred as Kernel Transaction (KT). T-space is a set of transaction hierarchies where each hierarchy ($T_i$) comprises of multiple transactions ($t_j$'s). Several $t_j$'s in a hierarchy could be related to each other in many ways. A few examples of relations among $t_j$'s in a $T_i$ hierarchy are: Mutually Exclusive (execution of one transaction rules out the execution the other transaction), Conditional (a transaction is executed on a condition), sequential (two transactions are executed one after another), concurrent (two transactions are executed simultaneously), and transactions with common inputs/shared data (two transactions operate on a shared resource).

FIG. 1C illustrates the inter-relation among usecases, transactions, functions and alarms. A set of functions are associated with a transaction and a set of transactions are associated with a usecase. However, there could be some functions in the system which are not associated with any of the identified usecases. Such functions are grouped under one or more system usecases. The set of functions associated with all the usecases, including system usecases, account for the all the functions defined as part of the CES software. Each transaction hierarchy corresponds to a usecase of CES and each individual transaction is associated with an alarm map where the alarm map provides the relationship among the alarms that could get generated while executing the transaction. A sequence of alarms in a transaction directly or indirectly leading to the identification of faults is defined as an alarm annotation.

FIG. 1D illustrates a typical resource hierarchy showing resource grouping at different levels such as board level, meta-component level and component level.

FIG. 1E illustrates the contextual information that is associated with an alarm:
 Timestamp at which alarm is generated
 Usecase associated with the generating function
 Transaction associated with the generating function
 Function generating the alarm
 Execution thread of the generating function
 Resources associated with the generating function, transaction, or usecase.

FIG. 2A illustrates the architecture of the Transaction Reasoning Engine (TRE). TRE (2000) receives notifications from the blackboard (2015) regarding current alarm, begin or end of a usecase, begin or end of a transaction, request for validation of occurrence of a fault or a change in alarm specific MV (AMV). TRE uses the information available in knowledge repository consisting of usecase templates (2005), and pre- and post-condition database (2010) to process the notifications received from the blackboard and to identify the faults based on alarms generated in various transactions. A usecase template defines the transaction hierarchy associated with a usecase. Pre- and post-condition information consists of rules to relate annotations to annotations in other transactions or to faults. Typical pre-conditions are AMV support to the annotations and co-occurrence of an annotation, and specific rules in terms of annotation probabilities. Typical post-conditions are rules in terms of specific AMV support and annotation probabilities. Both pre- and post-conditions are context-sensitive. Post-action is the expected result when post conditions are satisfied and this could be an expectation of annotation or inference of a fault. AMV database comprises of rules to analyze AMVs to resolve ambiguities while processing alarms. Further, TRE validates the fault inferences posted by other reasoning engines based on the AMV analysis (2015). AMVs, associated with a context, are collected by ηAs and are stored in AMV database.

FIG. 2A-1 illustrates typical data representation of transaction information as stored in the KR.

FIG. 2B illustrates the procedure for processing of BBN_USECASE_BEGIN notification by TRE. Usecases are identified during the CES design and f-stones implemented in CES provide usecase execution information. The beginning of a usecase is notified by f-stone to the blackboard through SCOP and FRE. TRE gets the notification of the beginning of a usecase from the blackboard (2100). TRE collects the usecase information related to the notification (2105) consisting of current execution thread information, usecase identifier, and usecase instance identifier. TRE queries KR for the usecase template corresponding to the usecase identifier and instantiates the template as a current usecase ($CU_j$) (2110). TRE gets information on specific R-elements associated with the usecase as part of the usecase information from usecase templates database and updates $CU_i$. (2115). For example, in case of "call setup" usecase in a communication switch, one of the R-elements associated with the usecase is the specific physical port. TRE updates $CU_i$ with this information. Further, TRE queries KR for all possible annotations corresponding to all the transactions in the usecase and updates $CU_i$ with this information (2120).

FIG. 2C illustrates the procedure for the processing of BBN_TRANSACTION_BEGIN notification by TRE. Beginning of a transaction is notified by an f-stone to the blackboard via SCOP and FRE. TRE receives this notification from the blackboard (2200). TRE collects the transaction-related information such as transaction id and usecase id from the blackboard (2205) and updates $CU_i$ with this information (2210).

FIG. 2D illustrates the procedure for processing of BBN_ALARM notification by TRE. SCOP collects and notifies the alarms generated during a transaction to the blackboard via FRE. TRE receives the notification and reads the alarm information such as alarm id and the associated contextual information from the blackboard (2300). TRE processes this information and identifies the transaction to which this alarm belongs to (2305). TRE checks whether the current alarm matches with any of the annotations associated with the context (2310). If the alarm is an out of context alarm, TRE logs the alarm (2315) for a later processing.

TRE further checks if this alarm is the first one in the identified transaction (2320). If the alarm generated is the first alarm in the identified transaction, TRE further processes the alarm, by getting all possible annotations containing the alarm for the identified transaction (2325). For all of the above annotations, TRE constructs derived segments (DS) based on the generated alarm (2330). A derived segment (DS) is a part of an annotation consisting of the alarms that have occurred and the alarms, which are missing but have AMV support. For example, if alarms a1 and a3 have occurred in sequence and if corresponding annotation is [a1, a2, a3], then the derived segment is considered as DS=[a1, a2, a3] with a2 as a missing alarm. Support for a missing alarm is derived from the analysis of the associated AMV information. If the AMV information supports the occurrence of the missing alarm, then alarm is considered to have occurred and appropriate probability is associated with the occurrence. For each of the identified annotations, TRE constructs the derived segments and updates these derived segments based on the occurrence of the alarm and the AMV analysis of the missing alarms (2335).

Validation of a missing alarm is based on the processing of the rules related to an appropriate AMV. The probability of occurrence of the missing alarm is estimated based on the extent of matching of the AMV with respect to the rules and it is used to define the probability of the occurrence of the alarm.

As further alarms occur, the derived segments are updated incrementally as described in steps 2340 through 2355.

An example provided below explains the construction of derived segments:

Example 1: Consider the following four sample annotations:
Annotation 1=[a1, a2, a5*] where a5* indicates that zero or more alarms can get generated
Annotation 2=[a1, a6+, a8] where a6+ indicates that 1 or more alarms can get generated
Annotation 3=[a9, a1, a10, a11]
Annotation 4=[a6, a7]

On occurrence of first alarm a1, annotations 1, 2, and 3 contain the alarm a1 and hence these are selected for defining the derived segments.
 DS1=[a1] based on comparison with Annotation 1
 DS2=[a2] based on comparison with Annotation 2

DS3=[a9, a1] based on comparison with Annotation 3 and although alarm a1 has occurred, a9 is missing. TRE analyses the information related to the associated AMV to validate the support for the missing alarm, and based on the support for the occurrence of the missing alarm, the derived segment is updated.

In case when the alarm received is not the first one in the transaction (2320), TRE checks the generated alarm with respect to each of the DSs (2340). Further, TRE performs missing alarm analysis for out of sequence alarms and suitably updates the DSs with annotation probabilities (2345).

Continuing Example 1, upon receiving the second alarm a2, the derived segments are updated as follows: Since only annotation 1 has a2, DS1 alone is updated and DS2 and DS3 remain unchanged.

DS1=[a1, a2]
DS2=[a1]
DS3=[a9, a1]

In step 2350, TRE queries the current usecase information for the annotations containing the current alarm. If annotations are found, TRE processes the alarm from the step 2315 onwards. TRE checks and notifies DS Compete internal notification for each of DSs that completely match with an annotation (2355).

FIG. 2D-1 illustrates the procedure for processing the DS on DS complete/AMV change/transaction_end/usecase_end notifications (2360). Pending DS list is a common list of DSs, across usecases, that match completely with an annotation and has pre- and/or post-conditions yet to be satisfied. TRE checks for the notification (2361). Upon receiving transaction end or usecase end notification, TRE deletes DSs in Pending DS list whose context associated with pre- and post-conditions matches with the transaction/usecase (2362).

Upon receiving AMV change internal notification, TRE checks and updates pre-/post-conditions of all DSs in Pending DS list based on changed AMV and transfers those DSs whose pre- and post-conditions got completely satisfied to Open DS list (2363). On receiving DS complete notification, TRE updates Open DS list with the completed DS (2364).

For each DS in the Open DS list, TRE performs the following steps (2365):
  Checks and updates pre- and post-conditions and annotation probability of current DS. If annotation probability is less than the threshold specified in the post condition, then the DS is deleted. If all conditions are satisfied and post-action is fault, TRE notifies BBN_TRE_FAULT_INFERRED to the blackboard (2366).
  Updates pre- or post-condition of DSs in Pending DS list based on the current DS. Transfers pre- and post-condition satisfied DSs from pending DS list to Open DS list. Moves the current DS from Open DS list to Pending list (2367).
  TRE checks whether Open DS list is empty (2369). If DSs exist, steps from 2365 to 2367 are performed; else DS processing is terminated.

FIG. 2E illustrates the procedure for processing BBN_AMV_CHANGE notification by TRE. TRE gets notification on AMV change (2400) and gets additional AMV information such as AMV id and AMV value from the blackboard (2405) and stores it in AMV database (2410). In addition, AMV_Change internal notification is posted.

FIG. 2F illustrates the procedure for processing of BBN_TRANSACTION_END notification by TRE (2500). Transaction end is notified to the blackboard by f-stones via SCOP and FRE. TRE performs the following steps for each of the DS in the current transaction (2502). AMV analysis for missing alarms for a DS is performed (2505). If annotation probability condition (2507) is satisfied, TRE posts an internal DS complete notification (2510), otherwise current DS is deleted (2508). After processing all the DSs, TRE posts an internal transaction end notification (2515).

FIG. 2G illustrates the procedure for processing of BBN_USECASE_END notification by TRE. F-stones notify the end of the usecase to the blackboard via SCOP and FRE. TRE gets BBN_USECASE_END notification (2600) and posts internal notification about usecase end (2605). TRE logs all alarms generated in CUi (2610).

FIG. 2H illustrates the procedure for processing BBN_FAULT_VALIDATION_REQUEST for a fault by TRE (2700). TRE reads information of one or more AMVs related to the fault from AMV database (2705). TRE analyzes the updated trend of the related AMVs by comparing it with signature trends associated with the AMV and using pre-defined rules for this AMV (2710). If the signature indicating the occurrence of the fault is detected, TRE notifies the probability of occurrence of the fault (2715). The probability of occurrence of the fault is estimated based on the extent to which the AMV trend matches with its corresponding signature.

FIG. 2I illustrates the procedure for processing of BBN_FAULT_RECTIFIED/BBN_FAULT_REJECTED notification by TRE (2800). TRE identifies pending DS list for all the DSs associated with a rectified/rejected fault and deletes them from the pending DS list (2805). The DSs associated with the rectified/rejected fault are identified by tracing backwards the chain of DSs connected by pre- or post-conditions starting with DS whose post action has led to the current fault till the starting DS of the chain ensuring that the deleted DS is not part of any other chains. Prior to deletion, TRE keeps track of the timestamps of the first alarm in the beginning of the annotation chain and the last alarm in the last annotation leading to the fault. This information is used by other REs.

FIG. 3A illustrates the architecture of the Monitor Reasoning Engine (MRE). MRE processes the Domain-specific Monitor Variables (DMVs) to infer software and hardware faults (3000). MRE receives DMVs from SCOP via FRE. DMVs are directly associated with faults and support from DMVs is used to infer faults. MRE makes use of knowledge repository comprising of domain-specific rules knowledge base (3015), domain-specific signature database (3005), and domain-specific MV data (3010). The rules are collected during the life cycle of CES and are updated as and when the knowledge about a fault and the corresponding trend in one or more DMVs is acquired. MRE compares the result of analysis of DMVs with the stored signatures and based on the comparison estimates the probability of occurrence for the fault and if the estimated probability is greater than the specified threshold MRE notifies the occurrence of the corresponding fault, along with the estimated probability to the blackboard (3020).

FIG. 3A-1 illustrates typical data representation of monitor information as stored in KR.

FIG. 3B illustrates the procedure for processing BBN_DMV_CHANGE notification by MRE (3100). MRE reads domain-specific MV information of the notified DMV containing DMV identifier and DMV value from the blackboard (3105). MRE analyzes the DMV trend by comparing with the known trend signatures and computes the fault probability based on a pre-defined set of rules and the extent of matching of the trend with signatures (3110). Signature trends are available with domain-specific signature database. MRE notifies inferred fault to the blackboard along with the probability of occurrence, if the fault probability is greater than the specified threshold (3115).

FIG. 3B-1 illustrates the procedure for processing internal ON_TIMER notification by MRE (3120). MRE performs the following steps for each DMV (3125). MRE analyzes the DMV trend by comparing with the known trend signatures and computes the fault probability based on the pre-defined set of rules and the extent of matching of the trend with signatures (3130). Signature trends are available with domain-specific signature database. MRE notifies inferred fault to the blackboard along with the probability of occurrence, if the fault probability is greater than the specified threshold (3135).

FIG. 4A illustrates the architecture of the Execution Reasoning Engine (ERE). ERE processes the execution-specific monitor variables (EMVS) to infer execution-specific/process-specific software faults (4000). ERE gets EMVs from SCOP via FRE. Execution-specific MVs are directly associated with faults and support from EMVs is used to infer faults. ERE uses the knowledge repository comprising of execution-specific rules knowledge base (4015), execution-specific signature database (4020) and execution-specific MV data (4010). ERE monitors memory and processor usage per execution thread and applies the rules on collected monitor variables to infer faults.

FIG. 4A-1 illustrates typical data representation of execution information as stored in KR.

FIG. 4B illustrates the procedure for processing BBN_EMV_CHANGE notification by ERE (4100). ERE reads execution-specific MV information of the notified the EMV, containing EMV identifier, EMV value from the blackboard (4105). ERE analyzes EMV info to identify the lists of rules associated with EMV and processes each list of rules to infer faults (4110). ERE notifies inferred fault to the blackboard along with the probability of occurrence, if the fault probability is greater than the specified threshold (4115).

FIG. 4B-1 illustrates the procedure for processing internal ON_TIMER notification by ERE (4120). ERE performs the following steps for each of the EMVs (4125). ERE analyzes the EMV info to identify the lists of rules associated with EMV and processes each list of rules to infer faults (4130). ERE notifies inferred fault to the blackboard along with the probability of occurrence, if the fault probability is greater than the specified threshold (4135).

FIG. 4C illustrates the procedure for processing BBN_FAULT_VALIDATION_REQUEST notification by ERE (4200). ERE identifies the execution-specific MV information corresponding to the inferred fault (4205). ERE analyzes EMV trend by comparing with the known trend signatures which are learned based on positive examples of fault occurrence and computes the fault probability based on the pre-defined set of rules and the extent of matching of the trend with signatures (4210). ERE notifies validation result to the blackboard along with the probability of occurrence of the fault (4215).

FIG. 4D illustrates the procedure for processing BBN_FAULT_RECTIFIED notification by ERE. On BBN_FAULT_RECTIFIED notification ERE checks if the fault is a software aging fault (4305). If it is a software aging fault, ERE initiates learning of EMV signature-fault correlation model. Following are the steps in the learning procedure.

1. Gets the timestamps of the first alarm in the first DS ($t_s$) and last alarm in the last DS ($t_e$) associated with rectified fault from the blackboard (4315).
2. Collects the EMV data corresponding to the period between these time stamps ($t_s$ and $t_e$) (4320).
3. Identifies a pattern in this data as a signature correlating with the fault (4325).
4. ERE compares pattern with existing clusters of patterns and adds to the cluster closely matching and finds the new centroid (4330).
5. If the pattern is not close to any of existing clusters and if number of existing clusters is not greater than specified number "K", then a new cluster is created else the latest pattern is ignored (4335).

FIG. 5A illustrates the architecture of the Function Reasoning Engine (FRE). FRE acts as an interface between SCOP and the blackboard (5000). FRE interacts with SCOP to collect the information from CES (5005), and provides the information to the blackboard (5010). FRE validates a fault based on the correlation between an alarm in a function with the fault. Functions-Rules Info consists of rules correlating the function-alarm combination to specific faults (5015). Monitor function database consists for MVs related to critical functions (5020).

Following are the notifications sent to the blackboard by FRE based on the information collected from SCOP:
BBN_ALARM
BBN_USECASE_BEGIN
BBN_USECASE_END
BBN_TRANSACTION_BEGIN
BBN_TRANSACTION_END
BBN_AMV_CHANGE
BBN_DMV_CHANGE
BBN_EMV_CHANGE FIG. 5A-1 illustrates typical data representation of function information as stored in KR.

FIG. 5B illustrates the procedure for processing BBN_M-F_MV notification by FRE. FRE gets the BBN_MF_MV notification from SCOP (5100). FRE analyzes the MVs related to output of monitor functions and compares with the output of the corresponding critical function (5105). FRE computes the fault probability based on the extent of matching of the two outputs (5110). FRE posts the fault-inferred notification to the blackboard if the fault probability is greater than a threshold (5115).

FIG. 5C illustrates the procedure for processing BBN_FAULT_VALIDATION_REQUEST notification for a fault by FRE (5200). FRE identifies the list of signatures associated with the fault from Function-Alarm knowledge base (5205). FRE uses Function-Rules Info and the list of signatures to derive the probability of occurrence of the fault and notifies blackboard (5210).

FIG. 5D illustrates the procedure for processing BBN_FAULT_RECTIFIED notification by FRE (5300). FRE initiates learning of alarm-function signature correlation with the fault. Following are the steps in the learning procedure:

1. FRE gets timestamps of first alarm in first DS ($t_s$) and last alarm in last DS ($t_e$) (5305).
2. FRE gets alarm-function data corresponding to each alarm generated in period between $t_s$ and $t_e$ (5310).
3. FRE identifies a pattern in this data as a signature correlating with the fault (5315).
4. FRE compares the pattern with existing clusters of patterns. If a cluster matching closely with the pattern is found, adds the pattern to the cluster and finds the new centroid (5320).
5. If the pattern is not close to any of existing clusters and if number of existing clusters is not greater than the specified number "K", then a new cluster is created else the latest pattern is ignored (5325).
6. FRE updates Function-alarm knowledge base (5330).

FIG. 6A illustrates the architecture of the Signal Reasoning Engine (SRE) (6000). SRE receives the hardware and environmental related monitor information from HCOP (6030). SRE identifies and validates the hardware faults based on hardware-specific MV analysis and aging analysis and notifies the blackboard (6025). SRE's knowledge repository comprises of Resource Information (6002), component database (6005), hardware-specific rules knowledgebase including operating conditions of the components (6020), hardware-specific signature database (6010) and hardware-specific MV data (6015). The procedure for processing the information from HCOP to identify and validate the hardware faults by SRE is explained below.

FIG. 6A-1 illustrates typical data representation of signal information as stored in KR.

FIG. 6B illustrates the procedure for processing of HMV_CHANGE/EnMV_CHANGE notification by SRE (6100). SRE gets HMV change or EnMV change notification by HCOP (6105). SRE gets the hardware-specific and environmental MV information from the blackboard. SRE updates the MV data for the corresponding MV (6110). SRE analyzes HMV/EnMV trend by comparing with known trend signatures and computes fault probability based on pre-defined set of hardware-specific rules and extent of matching of trend with signatures (6115). SRE notifies fault inference to the blackboard if the fault probability is greater than the specified threshold (6120).

FIG. 6B-1 illustrates the procedure for processing of internal ON_TIMER NOTIFICATION by SRE (6130). SRE performs the following for each HMV and EnMV (6135). SRE analyzes the HMV/EnMV trend by comparing with known trend signatures and computes the fault probability based on the pre-defined set of hardware-specific rules and extent of matching of trend with signatures (6140). SRE notifies the fault inference to the blackboard if the fault probability is greater than the specified threshold (6145).

FIG. 6C illustrates the procedure for processing BBN_FAULT_VALIDATION_REQUEST notification by SRE (6200). SRE selects the components based on the notified fault (6205). For each of the selected components SRE computes fault probability based on the aging analysis (6210). SRE notifies the maximum of the computed fault probabilities to the blackboard (6215).

FIG. 7A illustrates the architecture of the Global Reasoning Engine (GRE) (7000). GRE keeps track of a fault inferred by an RE, and requests the remaining REs to validate the fault. For each fault identified, GRE computes the final fault probability based on majority voting. Global-Info comprising of fault inference-validation table (7005) and Fault information (7015) is the knowledge repository of GRE.

FIG. 7A-1 illustrates typical data representation of global information as stored in KR.

FIG. 7B illustrates the procedure for processing BBN_MRE_FAULT_INFERRED, BBN_ERE_FAULT_INFERRED, BBN_SRE_FAULT_INFERRED, BBN_TRE_FAULT_INFERRED, BBN_TRE_FAULT_VALIDATION_RESULT, BBN_SRE_ FAULT_VALIDATION_RESULT, BBN_ERE_VALIDATION_RESULT AND BBN_FRE_FAULT_VALIDATION_ RESULT notifications by GRE (7300). GRE updates the inference-validation table with fault probabilities by applying appropriate learned correction factors based on the inference or validation by different REs (7305). GRE updates the inference-validation table for the inferred probability only if the latest inferred fault probability by an RE is greater than the fault probability previously posted by the same RE in the inference-validation table. GRE checks if a minimum number of inferences and validations are available (7310). Upon reaching the minimum number, GRE further processes inference-validation table to compute combined fault probability based on current probabilities updated in the inference-validation table (7315). Based on the fault probability GRE notifies the blackboard about occurrence of the fault (7320).

FIG. 7C illustrates the procedure for processing BBN_FAULT_RECTIFIED/BBN_FAULT_REJECTED notifications by GRE (7200). GRE checks for the notification (7205). If the notification is BBN_FAULT_RECTIFIED, GRE updates inference correction factor of each RE by incrementing with a specified value (7210). If the notification is BBN_FAULT_REJECTED, GRE updates inference correction factor of each RE by decrementing with a specified value.

FIG. 8 illustrates the hardware architecture of the fault identification system (FIS). FIS is an independent hardware, integrated with the core electronic system. Each hardware-software component in the core electronic system is designed for diagnosis, meaning that nano-agents and f-stones along with SCOP and HCOP are implemented to provide the information for diagnosis. These components of the core electronic system communicate with the FIS card over system backplane.

Another preferred embodiment of this invention covers the aspect of design for diagnosis (DFD). Design for diagnosis is aimed to minimize MTTR by designing the CES to provide maximum additional contextual information for the alarms generated, thus enhancing the precision with which the faults can be diagnosed within a minimum amount of time.

FIG. 9A illustrates the overview of the DFD process. One phase of the DFD addresses hardware issues related to efficient diagnosis. During hardware design of CES, a group of experts, specialized in failure mode and effective analysis (FMEA), performs the following (9000):

1. Identification of S-space elements and R-space elements along with their aging parameters and operating environment;
2. Identification of possible hardware faults;
3. Identification and design of HMV and environmental MVs (EnMVs);
4. Identification of rules for correlating HMVs and EnMVs with faults; and
5. Design of HCOP and nano-agents.

Another phase of the DFD addresses software related diagnostic issues. During software design of CES, a group of experts, specialized in alarm management and effective analysis (AMEA), performs the following (9005);

1. Identification of T-space, F-space and E-space intra- & inter-relationships among their elements: Identification of usecases, transaction hierarchies, transaction-function association, function-alarm association and transaction-specific alarm maps;
2. Identification and design of DMVs, AMVs and EMVs;
3. Identification of rules for correlating DMVs, AMVs and EMVs with alarms and faults; and
4. Design of SCOP, f-stones and nano-agents.

A joint analysis by FMEA experts and AMEA experts results in the following (9010):

1. Identification of the relation between T-space elements and R-space elements;
2. Identification of annotations associated with transactions; and
3. Identification pre- and post-conditions, and post-actions for all the annotations.

DFD approach is an enhanced hardware-software co-design methodology to improve the diagnosibility of the system. The enhancements are along two directions:

1. The process of fault identification by FIS makes use of several knowledge and databases. The extension to the methodology is to describe steps involved in collecting this required information 2. The run-time environment of FIS requires specific functionality to be implemented as part of CES. Examples of such functionality include nano-agents and f-stones.

FIG. 9B illustrates the key steps involved in the DFD process I are provided below:

1. Component selection: During system design, various components that are used in the design of a hardware subsystem are identified. FIS requires component-related information such as aging parameters and operating conditions for each of the components. This information is acquired during the hardware design step and is updated onto Component database (9100).

2. Meta component: A set of related components form a meta component. System is analyzed to identify meta-components such as SoCs and ASICs, and these components are designed to ensure that the required information related to component behavior are made available. This information is obtained during run-time through the standard interfaces such as JTAG (9105).

3. Resource hierarchy: FIS requires the inter-relation among the resource elements. System is analyzed to identify resource hierarchy in terms of different levels such as component-meta-component- and board-level. This information is updated onto Resource Information database (9110).

4. Fault identification: Faults are identified during FMEA analysis phase. This activity is extended to identify the fault-component inter-relations. The information acquired during this step is updated onto Fault Info database (9115).

5. Monitor variables (HMVs and EnMVs): FIS uses monitor variables to infer faults. These monitor variables provide additional support information for occurrence or non-occurrence of faults. For each of the identified faults, appropriate hardware-specific monitor variables (HMV) and environment specific monitor variables (EnMV) are identified. An HMV is identified by analyzing the input and output of a component associated with a fault and selecting the most appropriate input and/or output whose state or a sequence of states provide additional support for the fault. FIS obtains such a sequence of states through the sensors specifically incorporated for this purpose. Similarly, an EnMV is identified by analyzing the effect of environment and operating conditions on a component behavior. This information is updated onto Hardware-Specific MV database (9120).

6. Nano-agents, rules and signatures: For each of the identified HMVs and EnMVs, appropriate nano-agents are designed to collect the state information of these monitor variables from hardware and provide them to HCOP. Unique signatures for MVs are derived wherever possible using information such as system and component specifications and rules are identified to relate these MVs signatures to faults. This information is updated onto Hardware-Specific Signatures database and Hardware-Specific Rules database (9125).

The key steps involved in the DFD process II (FIG. 9C) are provided below.

7. Usecase and transaction identification: Usecases are identified during software analysis phase based on the required functionality. The function graph associated with a usecase is analyzed to identify transactions. A transaction is a logical grouping of the functions that is a part of a function graph and gets executed in a single thread or process. The transaction hierarchy of a usecase is derived based on the associated transactions and function graph. This information is updated onto Usecase Templates database (9200).

8. Alarms, maps and annotations: Alarms are identified during the system design based on the system specification and design methodology. During the software design, the functions are designed to generate the alarms under specified conditions. Transaction based alarm maps are identified by analyzing the inter-relations such as temporal relations among the alarms within a transaction. Alarms are logically grouped into annotations based on the derived alarm map. This information is updated onto Usecase Templates database (9205).

9. Monitor variables (AMVs): FIS uses AMVs to reason about missing alarms. The support for an alarm is incorporated in parts along the path of data flow starting from a kernel function and upwards till the function in which the alarm is generated. Further, one or more rules are defined that reason with these partial supports to provide a consolidated support or otherwise for the alarm. This information is updated onto AMV database (9210).

10. Pre- and post-conditions, and post-actions: Pre- and post-conditions impose context-based temporal constraints on annotations. In deterministic scenarios, pre-conditions are required to be satisfied before the completion of an annotation and post-conditions to follow the completion of the annotation. On the other hand, in non-deterministic scenarios, pre- and post-conditions are together treated as rule-condition. Some of the pre- and post-conditions, and post-actions of annotations are derived based on the relationship of the annotations from the point of view of transaction hierarchy. Relationship of the annotations across usecases, from the point of view of resource hierarchy, is imposed by incorporating the AMVs of the corresponding alarms in pre- and/or post-conditions. The chain of annotations connected by post-action annotations are analyzed from fault perspective to determine sub-chains that lead to fault inference. These fault inferences are made part of appropriate post-actions. This information is updated onto Pre- and Post-condition database (9215).

11. Monitor variables (DMVs): FIS uses monitor variables to infer faults. These monitor variables provide additional support information for occurrence or non-occurrence of faults. For each of the identified faults, appropriate Domain Specific monitor variables (DMV) are identified wherever applicable based on the analysis of domain specific system information. Data flow from a kernel function upwards is analyzed upto a function wherein the fault manifestation is noticeable and one or more DMVs are identified and introduced in appropriate functions along the path. This information is updated onto Domain-Specific MV database (9220).

12. f-stones, nano-agents, rules and signatures: f-stones are identified based on the requirement of contextual information and implemented in the function to provide the contextual information related to usecase and transaction. For each of the identified DMVs, appropriate nano-agents are designed to collect the state information of these monitor variables and provide them to SCOP. Unique signatures for MVs are derived wherever possible using information such as system specification and component characteristics, and rules are identified to relate the signatures of the MVs to faults. This information is updated onto Domain-Specific Signatures database and Domain-Specific Rules database (9225).

13. Monitor variables (EMVs): FIS uses EMVs to identify software aging faults such as faults due to over utilization of CPU or memory. Various system resource parameters are studied to determine lower- and upper-bound limits from the point of view the system specification and system design decisions. Adequate number of EMVs are define to monitor critical system resources. This information is updated onto Execution-Specific MV database (9230).

14. Nano-agents, rules and signatures: For each of the identified EMVs, appropriate nano-agents are designed to collect the state information of these monitor variables and provide them to SCOP. Unique signatures for MVs are derived wherever possible using information such as system specification and rules are identified to relate the signatures of the MVs to faults. This information is updated onto Execution-Specific Signatures database and Execution-Specific Rules database (9235).

15. Software monitor functions: FIS uses monitor functions to identify software faults. The need for software monitor functions are identified based on criticality of the various functions. The criticality of the function is based on the factors such as sensitivity to input data and impact on system behavior. For each of the identified critical functions, monitor functions are designed. Suitable nano-agents are designed as part of a monitor function to provide crucial parameter for critical software functions and are so designed to collect the monitor function state information and provide the same to SCOP. Rules are designed to reason with the state information of a critical function and the corresponding monitor function to assess the critical function behavior. This information is updated on to Monitor Function database (9240).

16. Signatures and rules associated monitor variables are determined based on the system simulation results, and operation and test results of a system prototype. This information is updated onto related signatures and rules databases.

FIG. 10A illustrates the procedure for a multidimensional context generation. Context associated with an alarm is described as <M,S,E,U,T,F> wherein M corresponds to monitor space (or alternatively, soft-variable space), S corresponds to signal space (or alternatively, hard-variable space), E corresponds to execution space, U corresponds to usecase space, T corresponds to transaction space, and F corresponds to function space. The objective, on occurrence of an alarm, is to identify the value with respect to these spaces or along these dimensions and use the same in the process of fault identification. In order to effectively generate the contextual information, it is required to analyze the executing core electronic system under consideration systematically and this is facilitated by studying the core electronic system with respect to multiple epochs. An epoch is a high level logical unit related to a transaction, and identifying the beginning and ending of a transaction is a way of tracking transactions. Analyze the core electronic system and identify an appropriate number of epochs. The beginning of an epoch is indicated by the invoking of a designated function and the epoch terminates when all of the following conditions are met: (a) the designated function terminates; (b) the processing of all the messages sent by the designated function and the functions invoked recursively by the designated function are completed; and (c) all the threads created by the designated function and the functions recursively invoked by the designated function run to completion. The identified soft-variables, that are a part of monitor or soft-variable space, and hard-variables, that are a part of signal or hard-variable space are categorized with respect to epochs. In other words, each epoch is characterized by a set of soft-variables and a set of hard-variables, and the values of these soft- and hard-variables are gathered during an epoch cycle that is an executing instance of an epoch. Note that during the processing of a transaction, multiple epoch cycles of an associated epoch are observed. During an epoch cycle, each of the soft- and hard-variables are sampled at a pre-specified interval unique to that variable and let K be the maximum snapshots obtained of any variable. That is, the number of periodic snapshots of a variable is less than or equal to K. Let $M=N1 \times K$ be the matrix of values related to N1 soft-variables and $S=N2 \times K$ be the matrix of values related to N2 hard-variables. Let alarms, A1, A2, ..., Ax, be the raised X alarms during the epoch cycle. For each soft-variable, Vi, cluster values into a predefined number of Kvi clusters and obtain their centroids. Hence, the dimension M is reduced to 1,2, ..., Kv1, ..., Kv1+Kv2, ..., Sum(Kvi). Similarly, for each hard-variable, Si, cluster values into a predefined Ksi clusters and obtain their centroids. Hence, the dimension S is reduced to 1,2, ..., Ks1, ..., Ks1+Ks2, ..., Sum(Ksi). Note that Kvi and Ksi are determined and fixed during system design and testing time.

Given M and S matrices of snapped values for N1 soft-variables and N2 hard-variables with respect to an epoch (EpochID), the objective is to find <U,T> that is a part of the context associated with a sequence of alarms A1, ..., Ax. Extract Mu and Su from M and S matrices respectively. Here, Mu is a subset of N1 soft-variables that is related to usecases associated with the epoch and similarly, Su is a subset of N2 hard-variables that is related to usecases associated with the epoch. Use Mu and Su centroid values and the U-Detector associated with the epoch to detect usecase U. Similarly, extract Mt and St subsets of variables that are related to transactions associated with the epoch and the use the centroid values and the T-Detector associated with the epoch to determine T.

For alarm Ai, let Ei be the corresponding execution context snapshot. This snapshot contains enough information to perform a table lookup to identify the function Fi. Note that the alarm Ai got raised during the execution of Fi. Hence, <U,T,Fi> is the generated contextual information associated with Ai and <U,T,<F1, ..., Fx>> is the contextual information associated with the alarm sequence <A1, ..., Ax> with respect to the epoch EpochID.

FIG. 10B illustrates the procedure for training U- and T-Detectors. U-Detector is used to determine the usecase aspect of a context and a U-Detector is defined for each of the epochs of the system under consideration. Each epoch is associated with a set of soft-variables and a set of hard-variables. Execute the system with respect to a usecase and a transaction, and obtain the values for the soft-variables Mij and hard-variables Sij for the jth iteration of the ith usecase. Obtain the variables associated with usecase, Mij(U) and Sij(U), and the variables associated with transaction, Mij(T) and Sij(T). Reduce each row L of Mij(U) to Kl(V) clusters and obtain their centroids. Reduce each row L of Sij(U) to Kl(S) clusters and obtain their centroids. Similarly, reduce each row(O) of Mij(T) to Ko(V) clusters, Sij(T) to Ko(S) clusters, and obtain their centroids. Use these data sets to train a U-Detector and a T-Detector for each of the epochs.

FIG. 10C illustrates the procedure for training S- and B-Detectors. These detectors are used in the fault identification process. The fault identification process involves four steps: use clustered values of soft- and hard-variables to determine usecase and transaction aspects of context; determine function aspect using execution snapshot; use <U,T,F> and alarms to determine symptoms using a set of symptom detectors; and finally, use the determined symptoms along with context to determine the occurred faults.

For a fault under consideration, determine the various symptoms. Determine hardware and software conditions that need to be set to generate the fault and also to observe the various symptoms. For a usecase U and testcase T, set the required hardware and software conditions and execute the system. Note that the testcases during testing or running of the system under simulated conditions is the same as transactions during live run of the system. Identify the epoch (EpochID) and collect the generated alarms, (A1, . . . ,Ax). Also, obtain the execution space information (E1, . . . ,Ex) corresponding to the alarms. For each Ai, determine the context <U,T,Fi>. Using this data, generate training data for a symptom detector for an epoch and train M symptom detectors where M is the number of observable symptoms. Similarly, generate training data to train a B-Detector for an epoch.

FIG. 10D illustrates the use of S-Detectors and B-Detector for identifying faults given an epoch. Note that the analysis of the system under consideration is with respect to a set of epochs. An epoch has a pre-associated set of soft- and hard-variables, and some of these variables are usecase related and the rest are transaction related. Use these variables, and a U-Detector and a T-Detector associated with the epoch to determine <U,T>. Use execution snapshots associated with a raised alarm A to determine F, and use <U,T,F> along with A with respect to various S-Detectors to determine the symptom sequence. That is, there are M symptom detectors associated with the epoch and use all of them to determine the most plausible set of symptoms. Finally, use the B-Detector associated with the epoch to identify the most likely list of the occurred faults.

ACRONYMS AND DEFINITIONS

1. ηAs Nano-Agents
2. AM Alarm Map
3. AMEA Alarm mode and effective analysis
4. AMV Alarm-related Monitor Variable
5. AP Annotation probability
6. ASIC Application Specific Integrated Chip
7. BB Blackboard
8. BBN The blackboard Notification
9. CES Core Electronic System
10. CIC Contextual Information Collection
11. CU Current Usecase
12. DFD Design for Diagnosis
13. DMV Domain-specific Monitor Variable
14. DS Derived Segment
15. EMV Execution-specific Monitor Variable
16. EnMV Environmental-related Monitor Variable
17. ERE Execution reasoning engine
18. ES Electronic System
19. E-space Execution space
20. FIS Fault identification system
21. FMEA Failure mode and effective analysis
22. FRE Function reasoning engine
23. F-space Function space
24. f-stones Function-stones
25. GRE Global reasoning engine
26. HCOP Hardware information collection
27. HMV Hardware-specific Monitor Variable
28. KF Kernel Function
29. KT Kernel Transaction
30. MRE Monitor reasoning engine
31. MV Monitor Variable
32. RE Reasoning engine
33. SCOP Software information collection
34. SoC System-on-Chip
35. SRE Signal reasoning engine
36. S-space Signal space
37. TRE Transaction reasoning engine
38. T-space Transaction space

What is claimed is:

1. A fault identification system, for efficiently identifying a plurality of faults occurring in a core electronic system during an epoch cycle and localizing said plurality of faults to a plurality of faulty software components and a plurality of faulty hardware blocks, by analyzing a plurality of alarms occurred during said epoch cycle using a plurality of contexts associated with said plurality of alarms so as to reduce the ambiguity and complexity arising due to the enormity of said plurality of alarms, and said fault identification system comprises:

a plurality of associated functions, wherein each of said plurality of associated functions is a part of said core electronic system;

a plurality of usecase detectors for detecting a plurality of usecases;

a plurality of transaction detectors for detecting a plurality of transactions;

a plurality of plurality of symptom detectors detecting a plurality of symptoms;

a plurality of fault detectors for detecting said plurality of faults;

an online contextual information collection subsystem, CIC, for collecting said plurality of alarms and for generating said plurality of contexts associated with said plurality of alarms based on said plurality of usecase detectors, said plurality of transaction detectors, said plurality of plurality of symptom detectors, and said plurality of fault detectors, wherein a context of said plurality of contexts comprises a usecase of said plurality of usecases, a transaction of said plurality of transactions, and a function of said plurality of associated functions;

an online global reasoning engine subsystem, GRE, for identifying and localizing a plurality of identified faults of said plurality of faults based on said plurality of alarms and said plurality of contexts associated with said plurality of alarms resulting in said plurality of faulty software components and said plurality of faulty hardware blocks; and an offline supervised training subsystem, SS, for training said plurality of usecase detectors, said plurality of transaction detectors, said plurality of plurality of symptom detectors, and said plurality of fault detectors.

2. The system of claim 1, wherein said core electronic system is a computer system or a computer network system and further comprises:

a plurality of software components, wherein each of said plurality of faulty software components is a part of said plurality of software components;

a plurality of hardware blocks, wherein each of said plurality of faulty hardware blocks is a part of said plurality of hardware blocks;

a plurality of soft variables that form part of a monitor space associated with said core electronic system;

a plurality of hard variables that form part of a signal space associated with said core electronic system;

said plurality of usecases;
said plurality of transactions;
said plurality of associated functions;

said plurality of symptoms, and;
said plurality of faults; and
said core electronic system is associated with a plurality of epochs, wherein said epoch cycle is a part of a plurality of epoch cycles of an epoch of said plurality of epochs.

3. The system of claim 2, wherein each of said plurality of usecase detectors is associated with a particular epoch of said plurality of epochs.

4. The system of claim 2, wherein each of said plurality of transaction detectors is associated with a particular epoch of said plurality of epochs.

5. The system of claim 2, wherein a symptom detector of a plurality of symptom detectors of said plurality of plurality of symptom detectors is associated with a symptom of said plurality of symptoms and said plurality of symptom detectors is associated with an epoch of said plurality of epochs.

6. The system of claim 2, wherein each of said plurality of fault detectors is associated with a particular epoch of said plurality of epochs.

7. The system of claim 2, wherein said CIC subsystem comprises a procedure to identify a context of said plurality of contexts associated with an alarm of said plurality of alarms raised in said epoch cycle, said procedure comprising:
means for obtaining said epoch of said plurality of epochs associated with said epoch cycle;
means for determining a plurality of plurality of usecase related soft variables centroid values;
means for finding a plurality of plurality of usecase related hard variables centroid values;
means for determining a plurality of plurality of transaction related soft variables centroid values;
means for finding a plurality of plurality of transaction related hard variables centroid values;
means for obtaining a usecase detector associated with said epoch based on said plurality of usecase detectors;
means for obtaining a transaction detector associated with said epoch based on said plurality of transaction detectors;
means for identifying said usecase associated with said context based on said usecase detector, said plurality of plurality of usecase related soft variables centroid values, and a plurality of plurality of usecase related hard variables centroid values;
means for identifying said transaction associated with said context based on said transaction detector, said plurality of plurality of transaction related soft variables centroid values, and said plurality of plurality of transaction related hard variables centorid values;
means for obtaining an execution snapshot associated with said alarm; and
means for identifying said function associated with said context based on said execution snapshot.

8. The system of claim 7, wherein said means for determining further comprising:
means for obtaining a plurality of epoch specific soft variables associated with said epoch based on said plurality of soft variables;
means for obtaining a plurality of plurality of soft variables values associated with said plurality of epoch specific soft variables during said plurality of epoch cycles of said epoch, wherein each plurality of soft variables values of said plurality of plurality of soft variables values is associated with a variable of said plurality of epoch specific soft variables;
means for clustering each plurality of soft variables values of said plurality of plurality of soft variables values into a pre-defined number of clusters resulting in a plurality of clustered soft variables values of a plurality of plurality of clustered soft variables values;
means for computing centroid of each cluster of a plurality of clustered soft variables values of said plurality of plurality of clustered soft variables values resulting in a plurality of plurality of soft variables centroid values;
means for determining said plurality of plurality of usecase related soft variables centroid values based on said usecase and said plurality of plurality of soft variables centroid values; and
means for determining said plurality of plurality of transaction related soft variables centroid values based on said transaction and said plurality of plurality of soft variables centroid values.

9. The system of claim 7, wherein said means for finding further comprises:
means for obtaining a plurality of epoch specific hard variables associated with said epoch based on said plurality of hard variables;
means for obtaining a plurality of plurality of hard variables values associated with said plurality of epoch specific hard variables during said epoch cycles of said epoch, wherein each plurality of hard variables values of said plurality of plurality of hard variables values is associated with a variable of said plurality of epoch specific hard variables;
means for clustering of each plurality of hard variables values of said plurality of plurality of hard variables values into a pre-defined number of clusters resulting in a plurality of clustered hard variables values of a plurality of plurality of clustered hard variables values;
means for computing of centroid of each cluster of a plurality of clustered hard variables values of said plurality of plurality of clustered hard variables values resulting in a plurality of plurality of hard variables centroid values;
means for determining said plurality of plurality of usecase related hard variables centroid values based on said usecase and said plurality of plurality of clustered hard variables centroid values; and
means for determining said plurality of plurality of transaction related hard variables centroid values based on said transaction and said plurality of plurality of clustered hard variables centroid values.

10. The system of claim 2, wherein said GRE subsystem further comprises a procedure to identify a fault of said plurality of faults occurred during said epoch cycle, and said procedure further comprises:
means for obtaining said epoch of said plurality of epochs associated with said epoch cycle;
means for obtaining said plurality of alarms;
means for obtaining said plurality of contexts associated with said plurality of alarms;
means for determining a plurality of detected symptoms;
means for obtaining a fault detector of said plurality of fault detectors based on said epoch;
means for determining a score associated with said fault based on said plurality of contexts, said plurality of detected symptoms, and said fault detector; and
means for making said fault a part of said plurality of identified faults if said score exceeds a pre-defined threshold.

11. The system of claim 10, wherein said subsystem further comprises:
means for obtaining a symptom of said plurality of symptoms;

means for obtaining a plurality of symptom detectors, of said plurality of plurality of symptom detectors, associated with said epoch;

means for obtaining a symptom detector of said plurality of symptom detectors based on said symptom;

means for determining a score based on said context, said alarm, said symptom, and said symptom detector; and means for making said symptom a part of said plurality of detected symptoms if said score exceeds a pre-defined threshold.

12. The system of claim 2, wherein said GRE subsystem further comprises a procedure to localize said plurality of identified faults, said procedure further comprising:

means for obtaining an identified fault of said plurality of identified faults;

means for obtaining a context associated with said identified fault;

means for obtaining a usecase associated with said context;

means for obtaining a transaction associated with said context;

means for obtaining a function associated with said context;

means for determining a plurality of usecase related software components based on said usecase and said plurality of software components;

means for determining a plurality of transaction related software components based on said transaction and said plurality of software components;

means for determining a plurality of function related software components based on said function and said plurality of software components;

means for computing intersection among said plurality of usecase related software components, said plurality of transaction related software components, and said plurality of function related software components, resulting in a plurality of possibly faulty software components; and means for making each of said plurality of possibly faulty software components a part of said plurality of faulty software components.

13. The system of claim 12, wherein said subsystem further comprises a procedure to localize said plurality of identified faults, said procedure further comprising:

means for obtaining an identified fault of said plurality of identified faults;

means for obtaining a context associated with said identified fault;

means for obtaining a usecase associated with said context;

means for obtaining a transaction associated with said context;

means for obtaining a function associated with said context;

means for determining a plurality of usecase related hardware blocks based on said usecase and said plurality of hardware blocks;

means for determining a plurality of transaction related hardware blocks based on said transaction and said plurality of hardware blocks;

means for determining a plurality of function related hardware blocks based on said function and said plurality of hardware blocks;

means for computing intersection among said plurality of usecase related hardware blocks, said plurality of transaction related hardware blocks, and said plurality of function related hardware blocks, resulting in a plurality of possibly faulty hardware blocks; and means for making each of said plurality of possibly faulty hardware blocks a part of said plurality of faulty hardware blocks.

14. The system of claim 2, wherein said SS subsystem comprises a procedure to train a usecase detector of said plurality of usecase detectors, wherein said usecase detector is associated with an epoch of said plurality of epochs to detect a usecase of said plurality of usecases, said procedure comprising:

means for obtaining said plurality of epoch cycles associated with said epoch;

means for obtaining a plurality of plurality of soft variables values associated with said plurality of soft variables during an epoch cycle of said plurality of epoch cycles of said epoch, wherein each plurality of soft variables values of said plurality of plurality of soft variables values is associated with a variable of said plurality of soft variables;

means for clustering each plurality of soft variables values of said plurality of plurality of soft variables values into a pre-defined number of clusters resulting in a plurality of clustered soft variables values of a plurality of plurality of clustered soft variables values;

means for computing centroid of each cluster of a plurality of clustered soil variables values of said plurality of plurality of clustered soft variables values resulting in a plurality of plurality of soft variables centroid values;

means for obtaining a plurality of plurality of hard variables values associated with said plurality of hard variables based on said epoch cycle of said plurality of epoch cycles of said epoch, wherein each plurality of hard variables values of said plurality of plurality of hard variables values is associated with a variable of said plurality of hard variables;

means for clustering each plurality of hard variables values of said plurality of plurality of hard variables values into a pre-defined number of clusters resulting in a plurality of clustered hard variables values of a plurality of plurality of clustered hard variables values;

means for computing centroid of each cluster of a plurality of clustered hard variables values of said plurality of plurality of clustered hard variables values resulting in a plurality of plurality of hard variables centroid values;

means for obtaining a plurality of usecase specific soft variables of the monitor space associated with said usecase based on said plurality of soft variables of the monitor space;

means for obtaining a plurality of usecase specific hard variables of the signal space associated with said usecase based on said plurality of hard variables of the signal space;

means for determining a plurality of plurality of usecase specific soft variables centroid values based on said plurality of plurality of soft variables centroid values and said plurality of usecase specific soft variables;

means for determining a plurality of plurality of usecase specific hard variables centroid values based on said plurality of plurality of hard variables centroid values and said plurality of usecase specific hard variables; and means for updating said usecase detector based on based on said plurality of plurality of usecase specific soft variables centroid values, said plurality of plurality of usecase specific hard variables centroid values, and said usecase.

15. The system of claim 14, wherein said subsystem further comprises a procedure to train a transaction detector of said plurality of transaction detectors, wherein said transaction detector is associated with said epoch, to detect a transaction of said plurality of transactions, said procedure comprising:

means for obtaining a plurality of transaction specific soft variables of the monitor space associated with said transaction based on said plurality of soft variables of the monitor space;

means for obtaining a plurality of transaction specific hard variables of the signal space associated with said transaction based on said plurality of hard variables of the signal space;

means for determining a plurality of plurality of transaction specific soft variables centroid values based on said plurality of plurality of soft variables centroid values and said plurality of transaction specific soft variables;

means for determining a plurality of plurality of transaction specific hard variables centroid values based on said plurality of plurality of hard variable centroid values and said plurality of transaction specific hard variables; and means for updating said transaction detector based on said plurality of plurality of transaction specific soft variables centroid values, said plurality of plurality of transaction specific hard variables centroid values, and said transaction.

16. The system of claim 14, wherein said subsystem further comprises a procedure to train a symptom detector of said plurality of symptom detectors, wherein said symptom detector is associated with said epoch and a symptom of said plurality of symptoms, to detect said symptom, said procedure comprising:

means for setting up hardware and software conditions to observe said symptom with respect to said epoch during execution of said core electronic system;

means for obtaining an alarm of said plurality of alarms generated by said core electronic system during said epoch cycle;

means for obtaining a context of said plurality of contexts based on said alarm; and means for updating said symptom detector based on said context, said alarm, and said symptom.

17. The system of claim 14, wherein said subsystem further comprises a procedure to train a fault detector of said plurality of fault detectors, wherein said fault detector is associated with said epoch, to detect a fault of said plurality of faults, wherein said procedure comprising:

means for setting up hardware and software conditions to observe said fault with respect to said epoch during execution of said core electronic system;

means for obtaining said plurality of alarms generated by said core electronic system during said epoch cycle;

means for obtaining said plurality of contexts;

means for determining a plurality of fault related symptoms based on said plurality of symptom detectors, said plurality of contexts, and said plurality of alarms, wherein each of said plurality of fault related symptoms is a part of said plurality of symptoms; and means for updating said fault detector based on said plurality of contexts, said plurality of fault related symptoms, and said fault.

\* \* \* \* \*